US010979900B2

(12) United States Patent
Iwami et al.

(10) Patent No.: US 10,979,900 B2
(45) Date of Patent: Apr. 13, 2021

(54) INFORMATION PROCESSING DEVICE AND INFORMATION PROCESSING METHOD

(71) Applicant: SONY CORPORATION, Tokyo (JP)

(72) Inventors: Hideki Iwami, Saitama (JP); Tomoya Yamaura, Tokyo (JP); Hideyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 307 days.

(21) Appl. No.: 15/554,863

(22) PCT Filed: Nov. 30, 2015

(86) PCT No.: PCT/JP2015/083526
§ 371 (c)(1),
(2) Date: Aug. 31, 2017

(87) PCT Pub. No.: WO2016/147491
PCT Pub. Date: Sep. 22, 2016

(65) Prior Publication Data
US 2018/0048701 A1 Feb. 15, 2018

(30) Foreign Application Priority Data
Mar. 17, 2015 (JP) .............................. JP2015-053512

(51) Int. Cl.
*H04W 12/04* (2021.01)
*H04W 84/12* (2009.01)
(Continued)

(52) U.S. Cl.
CPC ........... *H04W 12/04* (2013.01); *H04L 63/061* (2013.01); *H04L 67/104* (2013.01); *H04N 5/268* (2013.01);
(Continued)

(58) Field of Classification Search
CPC ..... H04L 63/061; H04L 67/104; H04L 12/18; H04L 12/185; H04L 45/16; H04L 49/201;
(Continued)

(56) References Cited

U.S. PATENT DOCUMENTS

2006/0242457 A1 10/2006 Roy et al.
2008/0005236 A1* 1/2008 Schmieder .............. H04L 65/80
709/204

(Continued)

FOREIGN PATENT DOCUMENTS

CN 1836403 A 9/2006
CN 101262652 A 9/2008
(Continued)

OTHER PUBLICATIONS

International Search Report and Written Opinion of PCT Application No. PCT/JP2015/083526, dated Feb. 16, 2016, 02 pages of English Translation and 08 pages of ISRWO.

(Continued)

*Primary Examiner* — Christopher Biagini
(74) *Attorney, Agent, or Firm* — Chip Law Group

(57) ABSTRACT

To appropriately wirelessly connect information processing devices. An information processing device includes a wireless communication unit and a control unit. The wireless communication unit performs media transmission to another information processing device. Further, the control unit that performs control to exchange information in a device discovery process or a capability checking process in a case where the media transmission is newly performed to the second information processing device during the media transmission to the first information processing device. This information is used for deciding a communication path for performing the media transmission to a first information processing device and a second information processing (Continued)

device or a data transmission format used when the media transmission is performed.

19 Claims, 30 Drawing Sheets

(51) Int. Cl.
  *H04W 8/00* (2009.01)
  *H04W 92/18* (2009.01)
  *H04W 8/22* (2009.01)
  *H04L 29/06* (2006.01)
  *H04L 29/08* (2006.01)
  *H04N 5/268* (2006.01)

(52) U.S. Cl.
  CPC .............. *H04W 8/00* (2013.01); *H04W 8/22* (2013.01); *H04W 84/12* (2013.01); *H04W 92/18* (2013.01)

(58) Field of Classification Search
  CPC ... H04L 65/4069; H04L 65/608; H04N 5/268; H04N 21/234363; H04N 21/4122; H04N 21/436; H04N 21/43615; H04N 21/43637; H04N 21/6405; H04W 12/04; H04W 84/12
  See application file for complete search history.

(56) References Cited

U.S. PATENT DOCUMENTS

| | | | |
|---|---|---|---|
| 2013/0139210 A1 | 5/2013 | Huang et al. | |
| 2013/0141331 A1* | 6/2013 | Shiu | G09G 5/003 345/158 |
| 2014/0016507 A1 | 1/2014 | Han et al. | |
| 2014/0132536 A1 | 5/2014 | Ikenaga et al. | |
| 2014/0330967 A1 | 11/2014 | Goto | |
| 2014/0362849 A1 | 12/2014 | Sheth et al. | |
| 2014/0372620 A1 | 12/2014 | Vedula et al. | |
| 2015/0036735 A1* | 2/2015 | Smadi | H04L 65/605 375/240.02 |
| 2015/0172757 A1* | 6/2015 | Kafle | H04L 67/1044 725/81 |
| 2015/0245393 A1* | 8/2015 | Lee | H04L 67/1046 370/338 |
| 2016/0198198 A1 | 7/2016 | Iwami et al. | |
| 2016/0316353 A1* | 10/2016 | Kawakami | H04L 61/6077 |

FOREIGN PATENT DOCUMENTS

| | | |
|---|---|---|
| CN | 101502156 A | 8/2009 |
| CN | 103392359 A | 11/2013 |
| CN | 103813114 A | 5/2014 |
| CN | 104429155 A | 3/2015 |
| CN | 104956765 A | 9/2015 |
| CN | 105308934 A | 2/2016 |
| CN | 105493508 A | 4/2016 |
| EP | 2873290 A1 | 5/2015 |
| EP | 2950607 A1 | 12/2015 |
| EP | 3011725 A1 | 4/2016 |
| EP | 3043566 A1 | 7/2016 |
| JP | 2008-539609 A | 11/2008 |
| JP | 2012-129898 A | 7/2012 |
| JP | 2014-096074 A | 5/2014 |
| JP | 2014-143635 A | 8/2014 |
| JP | 2015-053565 A | 3/2015 |
| JP | 2015-528249 A | 9/2015 |
| KR | 10-2014-0010343 A | 1/2014 |
| SG | 11201601366P A | 3/2016 |
| TW | 201521474 A | 6/2015 |
| WO | 2006/110404 A2 | 10/2006 |
| WO | 2014/014245 A1 | 1/2014 |
| WO | 2014/115611 A1 | 7/2014 |
| WO | 2014/204193 A1 | 12/2014 |
| WO | 2015/033762 A1 | 3/2015 |
| WO | 2015/033763 A1 | 3/2015 |
| WO | 2015/088700 A1 | 6/2015 |

OTHER PUBLICATIONS

Extended European Search Report of EP Patent Application No. 15885583.3, dated Aug. 8, 2018, 13 pages.
Office Action for JP Patent Application No. 2017-506025, dated Dec. 17, 2019, 04 pages of Office Action and 05 pages of English Translation.
Office Action for CN Patent Application No. 201580077559.7, dated May 8, 2020, 09 pages of Office Action and 15 pages of English Translation.
Office Action for JP Patent Application No. 2017-506025, dated May 19, 2020, 03 pages of Office Action and 02 pages of English Translation.
Office Action for EP Patent Application No. 158855833, dated Jun. 2, 2020, 07 pages.

* cited by examiner

FIG.9

WFD IE FORMAT EXAMPLE

| Field | Size (octets) | Value (Hexadecimal) | Description |
|---|---|---|---|
| Element ID | 1 | DD | IEEE 802.11 vendor specific usage |
| Length | 1 | Variable | Length of the following fields in the IE in octets. The length field is variable and set to 4 plus the total length of WFD subelements. |
| OUI | 3 | 50-6F-9A | WFA Specific OUI |
| OUI Type | 1 | 0A | Identifying the type or version of the WFD IE. Setting to 0x0A indicates WFA WFD v1.0 |
| WFD subelements | Variable | | One or more WFD Subelements appear in the WFD IE |

FIG.10

EXAMPLE OF GENERAL FORMAT OF WFD SUBELEMENT

| Field | Size (octets) | Value (Hexadecimal) | Description |
|---|---|---|---|
| Subelement ID | 1 | | Identifying the type of WFD subelement. The specific value is defined in Table 5-3. |
| Length | 2 | Variable | Length of the following fields in the subelements |
| Subelements body field | Variable | | Subelement specific information fields |

FIG.11

WFD SUBELEMENT ID DEFINITION EXAMPLE

| Subelement ID (Decimal) | Notes |
|---|---|
| 0 | WFD Device Information |
| 1 | Associated BSSID |
| 2 | WFD Audio Formats |
| 3 | WFD Video Formats |
| 4 | WFD 3D Video Formats |
| 5 | WFD Content Protection |
| 6 | Coupled Sink Information |
| 7 | WFD Extended Capability |
| 8 | Local IP Address |
| 9 | WFD Session Information |
| 10 | Alternative MAC Address |
| 11 | New Device Information |
| 12-255 | Reserved |

FIG.12

NEW DEVICE INFORMATION SUBELEMENT EXAMPLE

| Field | Size (octets) | Value | Description |
|---|---|---|---|
| Subelement ID | 1 | 11 | |
| Length | 1 | 3 | Length of the following fields of the subelement. |
| New Device Information | 3 | | |

FIG.13

NEW DEVICE INFORMATION FIELD EXAMPLE

| Field | Size (octets) | Value | Description |
|---|---|---|---|
| 1:0 | 3 | INFRA CONNECTION | [0] WIRELESS USE (1:Connected 0:Non-use)<br>[1] WIRED USE (1:Connected 0:Non-use) |
| 5:2 | | WIRELESS CAPABILITY | [5] TIME DIVISION ACCESS OF SAME FREQUENCY CHANNEL(1:OK 0:NG)<br>[4] TIME DIVISION ACCESS OF DIFFERENT FREQUENCY CHANNEL(1:OK 0:NG)<br>[3] SIMULTANEOUS ACCESS OF SAME FREQUENCY CHANNEL(1:OK 0:NG)<br>[2] SIMULTANEOUS ACCESS OF DIFFERENT FREQUENCY CHANNEL(1:OK 0:NG) |
| 10:8 | | Source Capability | 10 : INFRA USE (1:OK 0:Non-Available)<br>9 : P2P USE (1:OK 0:Non-Available)<br>8 : TDLS USE (1:OK 0:Non-Available) |
| 13:11 | | Sink Capability | 13 : INFRA USE (1:OK 0:Non-Available)<br>12 : P2P USE (1:OK 0:Non-Available)<br>11 : TDLS USE (1:OK 0:Non-Available) |
| 23:14 | | Frequency Channel | CHANNEL NUMBER IS RECORDED IN CASE WHERE WIRELESS USE IS CONNECTED IN [1:0] |

FIG.14

EXAMPLE OF PAYLOAD OF ASP MESSAGE

| Field | Size (octets) | Value | Description |
|---|---|---|---|
| 1:0 | 3 | INFRA CONNECTION | [0] WIRELESS USE (1:Connected 0:Non-use)<br>[1] WIRED USE (1:Connected 0:Non-use) |
| 5:2 |  | WIRELESS CAPABILITY | [5] TIME DIVISION ACCESS OF SAME FREQUENCY CHANNEL(1:OK 0:NG)<br>[4] TIME DIVISION ACCESS OF DIFFERENT FREQUENCY CHANNEL(1:OK 0:NG)<br>[3] SIMULTANEOUS ACCESS OF SAME FREQUENCY CHANNEL(1:OK 0:NG)<br>[2] SIMULTANEOUS ACCESS OF DIFFERENT FREQUENCY CHANNEL(1:OK 0:NG) |
| 10:6 |  | Source Capability | 10 : INFRA USE (1:OK 0:Non-Available)<br>9 : P2P USE (1:OK 0:Non-Available)<br>8 : TDLS USE (1:OK 0:Non-Available) |
| 13:11 |  | Sink Capability | 13 : INFRA USE (1:OK 0:Non-Available)<br>12 : P2P USE (1:OK 0:Non-Available)<br>11 : TDLS USE (1:OK 0:Non-Available) |
| 23:14 |  | Frequency Channel | CHANNEL NUMBER IS RECORDED IN CASE WHERE WIRELESS USE IS CONNECTED IN [1:0] |

EXAMPLE OF NOTIFYING USER OF FACT THAT CONNECTION
WITH COUNTERPART DEVICE IS IMPOSSIBLE

EXAMPLE OF NOTIFYING USER OF SUCCESSFUL CONNECTION WITH COUNTERPART DEVICE

EXAMPLE OF NOTIFYING USER OF CONNECTION OF NEW SINK DEVICE

EXAMPLE OF CASE WHERE SECOND SINK DEVICE IS NOT COMPATIBLE WITH FIRST FORMAT OF FIRST SINK DEVICE AND FIRST SINK DEVICE PERMITS SWITCHING TO SECOND FORMAT OF SECOND SINK DEVICE

EXAMPLE OF CASE WHERE SECOND SINK DEVICE IS NOT COMPATIBLE WITH FIRST FORMAT OF FIRST SINK DEVICE AND FIRST SINK DEVICE DOES NOT PERMIT SWITCHING TO SECOND FORMAT OF SECOND SINK DEVICE

EXAMPLE OF CASE WHERE ONLY ONE
OF FIRST SINK DEVICE AND SECOND SINK DEVICE IS CONNECTABLE

EXAMPLE OF SELECTING, BY USER MANIPULATION, SINK DEVICE TO WHICH IMAGE IS TRANSMITTED

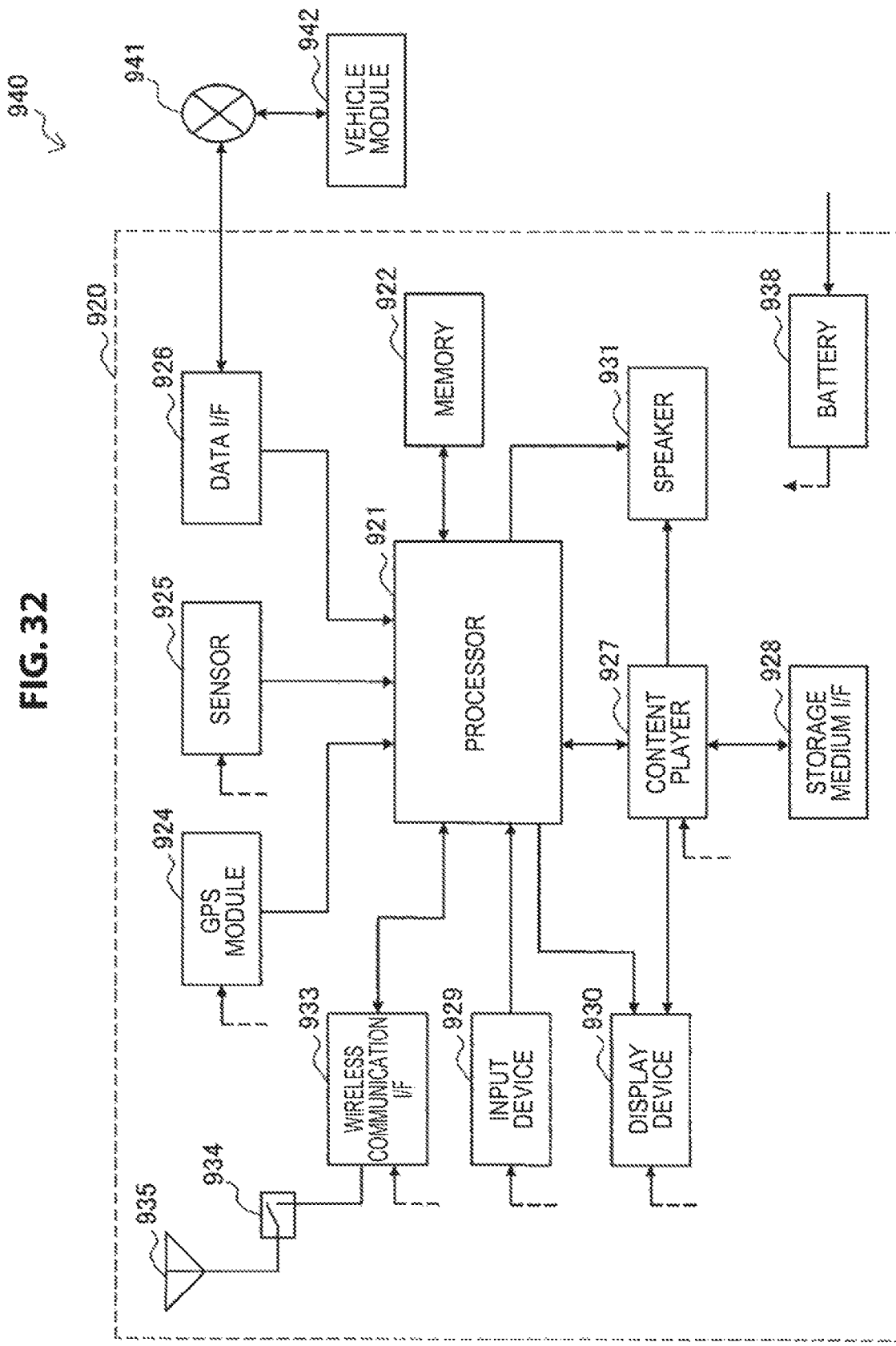

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2015/083526 filed on Nov. 30, 2015, which claims priority benefit of Japanese Patent Application No. JP2015-053512 filed in the Japan Patent Office on Mar. 17, 2015. Each of the above-referenced applications is hereby incorporated herein by reference in its entirety.

TECHNICAL FIELD

The present technology relates to an information processing device. Specifically, the present technology relates to an information processing device and information processing method of interchanging information using wireless communication, and a program causing a computer to perform the method.

BACKGROUND ART

In recent years, an information processing devices performing wireless communication using a wireless local area network (LAN) has been used widely. As such a wireless LAN, a wireless LAN represented by institute of electrical and electronics engineers (IEEE) 802.11 has been used widely, for example.

Moreover, as wireless audio visual (AV) transmission communication, wireless fidelity (Wi-Fi) CERTIFIED Miracast has been proposed, for example (see PTL 1, for example).

CITATION LIST

Patent Literature

Patent Literature 1: JP2014-96074A

DISCLOSURE OF INVENTION

Technical Problem

In the above-described related art, real-time image transmission can be performed between two information processing apparatuses in accordance with the specifications of Wi-Fi CERTIFIED Miracast. For example, an image based on image data transmitted from a source device can be displayed on a display of a sink device.

Here, connection of a plurality of source devices to one sink device may also be conceived. Further, connection of a plurality of sink devices to one source device may also be conceived. Since various connection forms may be conceived in this manner, it is important to appropriately connect each device according to a connection form.

The present technology is devised in view of this situation and aims to appropriately wirelessly connect information processing devices.

Solution to Problem

The present technology is devised to solve the above-described problem, and a first aspect thereof is an information processing device, an information processing method, and a program for causing a computer to execute the method, the information processing device including: a wireless communication unit that performs media transmission to another information processing device; and a control unit that performs control to exchange information for deciding a communication path for performing the media transmission to a first information processing device and a second information processing device or a data transmission format used when the media transmission is performed in a device discovery process or a capability checking process in a case where the media transmission is newly performed to the second information processing device during the media transmission to the first information processing device. Accordingly, the effect of exchanging information for deciding a communication path for media transmission to a first information processing device and a second information processing device or a data transmission format used when the media transmission is performed in the device discovery process or the capability checking process when media transmission to the second information processing device is newly performed during media transmission to the first information processing device is achieved.

Further, according to the first aspect, the control unit may perform control to exchange, as the information, at least one of a type of a data transmission format used by the first information processing device for the media transmission, whether the first information processing device permits switching to the data transmission format usable by the second information processing device, and the number of HDCP encryption keys usable by the information processing device. Accordingly, the effect of exchanging at least one of the type of a data transmission format used by the first information processing device for media transmission, whether the first information processing device permits switching to a data transmission format usable by the second information processing device, and the number of HDCP encryption keys usable by the information processing device is achieved.

Further, according to the first aspect, the control unit may provide, to a user, notification information regarding a connection process for newly performing the media transmission to the second information processing device in the capability checking process. Accordingly, the effect of providing, to a user, notification information regarding a connection process for newly performing media transmission to the second information processing device in the capability checking process is achieved.

Further, according to the first aspect, the control unit may differently manage image information corresponding to a target of the media transmission and the notification information. Accordingly, the effect of differently managing the image information corresponding to a target for media transmission and notification information in the capability checking process is achieved.

Further, according to the first aspect, the control unit may determine whether the media transmission to the second information processing device can be performed on the basis of the exchanged information and may not perform a connection process for the second information processing device in a case where it is determined that the media transmission to the second information processing device cannot be performed. Accordingly, the effect of determining whether media transmission to the second information processing device can be performed on the basis of exchanged information and performing no connection process for the second information processing device when it is determined that media transmission to the second information processing device cannot be performed is achieved.

Further, according to the first aspect, in the case where it is determined that the media transmission to the second information processing device cannot be performed, the control unit may provide notification information for notification of the fact to the user. Accordingly, when it is determined that media transmission to the second information processing device cannot be performed, the effect of providing the notification information for notification of the fact to the user is achieved.

Further, according to the first aspect, in a case where a first data transmission format used by the first information processing device is switched to a second data transmission format usable by the second information processing device in the device discovery process or the capability checking process, the control unit may switch a data transmission format used by the first information processing device to the second data transmission format and then set the second data transmission format as a data transmission format used by the second information processing device. Accordingly, when a first data transmission format used by the first information processing device is switched to a second data transmission format usable by the second information processing device in the device discovery process or the capability checking process, the effect of switching the data transmission format used by the first information processing device to the second data transmission format and then setting the second data transmission format as the data transmission format used by the second information processing device is achieved.

Further, according to the first aspect, the control unit may acquire a wireless communication scheme used for the media transmission to the first information processing device and decide the communication path and the data transmission format on the basis of the acquired wireless communication scheme and the exchanged information. Accordingly, the effect of acquiring a wireless communication scheme used for media transmission to the first information processing device and deciding the communication path and the data transmission format on the basis of the acquired wireless communication scheme and the exchanged information is achieved.

Further, according to the first aspect, in the case where it is determined that the media transmission to the second information processing device cannot be performed, the control unit may provide notification information for notification of the fact to the user. Accordingly, when the first information processing device uses a wireless communication scheme in an infrastructure mode, the effect of setting a wireless communication scheme in a TDLS mode or a P2P mode as wireless communication schemes of the first information processing device and the second information processing device is achieved.

Further, according to the first aspect, the control unit may decide the communication path and the data transmission format on the basis of the exchanged information, at least one of capability of the information processing device regarding an encoding process and the number of processes that can be performed, and at least one of capability of the information processing device regarding HDCP encryption key processing and the number of processes that can be performed. Accordingly, the effect of deciding the communication path and the data transmission format on the basis of the exchanged information, at least one of capability of the information processing device regarding an encoding process and the number of processes thereof that can be performed, and at least one of capability of the information processing device regarding HDCP encryption key processing and the number of processes that can be performed is achieved.

Further, according to the first aspect, the control unit may determine whether the media transmission to the first information processing device and the second information processing device can be performed on the basis of the exchanged information and switch a counterpart device to which the media transmission is performed from the first information processing device to the second information processing device in a case where it is determined that the media transmission to the first information processing device and the second information processing device cannot be performed. Accordingly, the effect of determining whether the media transmission to the first information processing device and the second information processing device can be performed on the basis of the exchanged information and switching a counterpart device for which the media transmission is performed from the first information processing device to the second information processing device when it is determined that the media transmission to the first information processing device and the second information processing device cannot be performed is achieved.

Further, according to the first aspect, in a case where the counterpart device to which the media transmission is performed is switched from the first information processing device to the second information processing device, the control unit may perform a process of disconnecting from the first information processing device after completing a parameter setting process for the second information processing device. Accordingly, when switching the counterpart device for which the media transmission is performed from the first information processing device to the second information processing device, the effect of performing a process of disconnecting from the first information processing device after completing a parameter setting process for the second information processing device is achieved.

Further, according to the first aspect, in a case where the counterpart device to which the media transmission is performed is switched from the first information processing device to the second information processing device, the control unit may provide notification information for notification of the fact to a user. Accordingly, when switching the counterpart device for which the media transmission is performed from the first information processing device to the second information processing device, the effect of providing notification information for notification of the fact to the user is provided.

Further, according to the first aspect, the wireless communication unit may perform the media transmission to the other information processing devices in accordance with wireless fidelity (Wi-Fi) CERTIFIED Miracast specifications. Accordingly, the effect of performing media transmission to another information processing device in accordance with wireless fidelity (Wi-Fi) CERTIFIED Miracast specifications is provided.

Advantageous Effects of Invention

According to the present technology, it is possible to achieve the excellent effect that information processing devices can be appropriately wirelessly connected. Meanwhile, the effects described herein are not necessarily limited and may be effects described in the present disclosure.

BRIEF DESCRIPTION OF DRAWINGS

FIG. 9 is a diagram illustrating an example of a WFD IE format exchanged between devices constituting the communication system 10 according to the first embodiment of the present technology.

FIG. 10 is a diagram illustrating an example of a WFD IE format exchanged between devices constituting the communication system 10 according to the first embodiment of the present technology.

FIG. 11 is a diagram illustrating an example of a WFD IE format exchanged between devices constituting the communication system 10 according to the first embodiment of the present technology.

FIG. 12 is a diagram illustrating an example of a WFD IE format exchanged between devices constituting the communication system 10 according to the first embodiment of the present technology.

FIG. 13 is a diagram illustrating an example of a WFD IE format exchanged between devices constituting the communication system 10 according to the first embodiment of the present technology.

FIG. 14 is a diagram illustrating an example of a new message for an application service platform (ASP) exchanged between devices constituting the communication system 10 according to the first embodiment of the present technology.

FIG. 32 is a block diagram illustrating an example of a schematic configuration of a car navigation device.

MODE(S) FOR CARRYING OUT THE INVENTION

Hereinafter, forms for embodying the present technology (referred to as embodiments hereinafter) will be described. Description will be given in the following order.
1. First Embodiment (example of constructing multi-sink topology)
2. Second embodiment (example of setting or changing higher layer considering wireless communication scheme)
3. Application example

1. First Embodiment

[Example of Configuration of Communication System]

Figure 1:
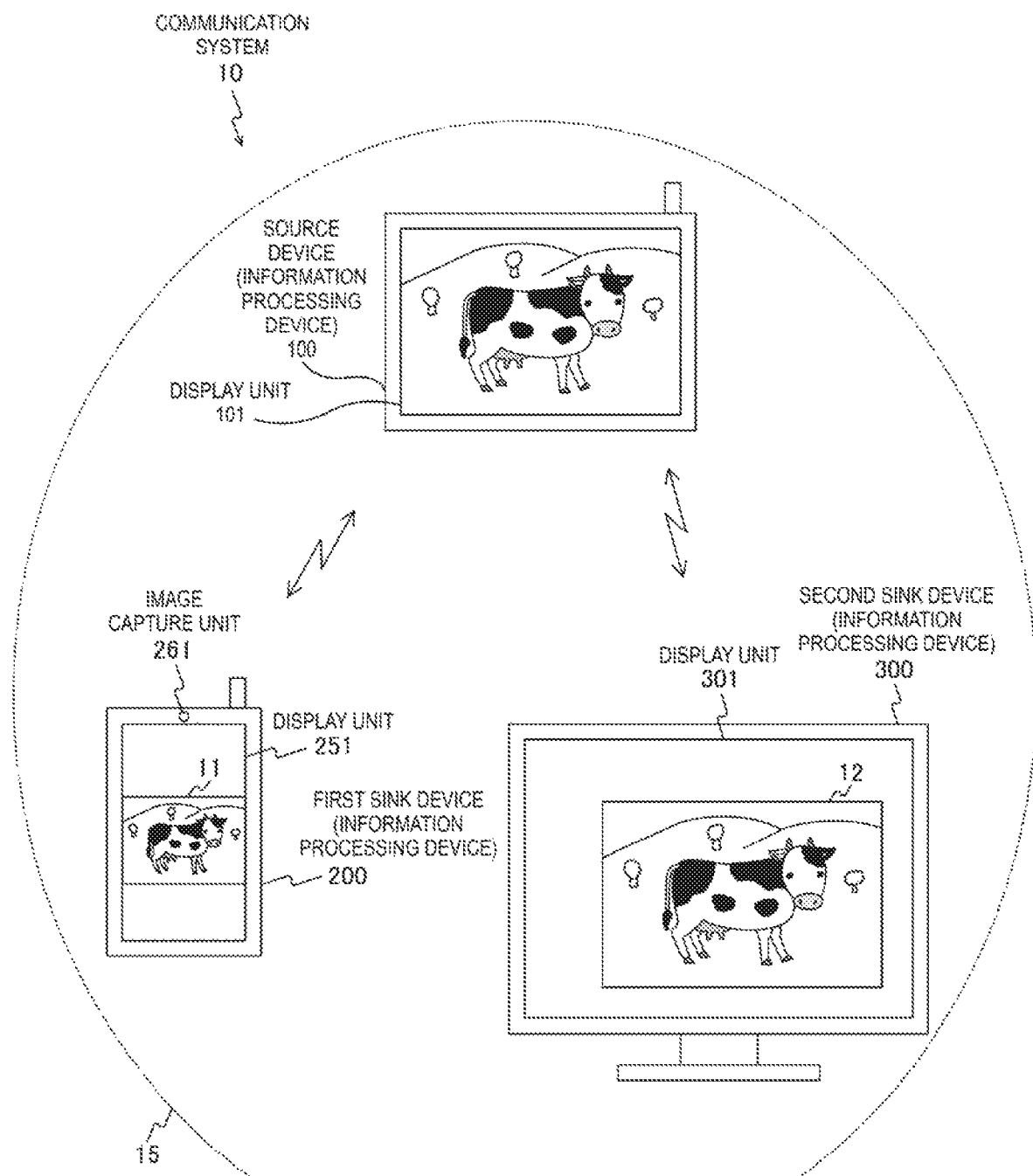
FIG. 1 is a block diagram illustrating a system configuration example of a communication system 10 according to a first embodiment of the present technology.

FIG. 1 is a block diagram illustrating a system configuration example of a communication system 10 according to a first embodiment of the present technology. FIG. 1 illustrates an example of a communication system capable of performing wireless connection in a multi-sink topology environment using peer-to-peer (P2P) direct communication.

The communication system 10 includes a source device (information processing device) 100, a first sink device (information processing device) 200 and a second sink device (information processing device) 300. Further, the communication system 10 is an example of a communication system in which the first sink device 200 and the second sink device 300 receive data (e.g., image data and audio data) transmitted from the source device 100 in FIG. 1.

The source device 100, the first sink device 200, and the second sink device 300 are transmission and reception devices (information processing devices) that have a wireless communication function. The source device 100, the first sink device 200, and the second sink device 300 are, for example, display devices (for example, personal computers) or portable information processing devices (for example, smartphones or tablet terminals) that have a wireless communication function. The source device 100, the first sink device 200, and the second sink device 300 are, for example, wireless communication devices that conform to Institute of Electrical and Electronics Engineers (IEEE) 802.11, 802.15, or 802.16, 3rd Generation Partnership Project (3GPP) specification (for example, Wideband Code Division Multiple Access (W-CDMA)), Global system for Mobile Communications (GSM: registered trademark), Worldwide Interoperability for Microwave Access (WiMAX), WiMAX2, Long Term Evolution (LTE), LTE-A (Advanced), Licensed Assisted Access usin LTE (LAA), or the like. The source device 100, the first sink device 200, and the second sink device 300 can interchange various kinds of information using the wireless communication function.

Here, the first sink device 200 and the second sink device 300 are devices which receive data transmitted from the source device 100. Accordingly, exchange between the source device 100 and the second sink device 300 is equivalent to exchange between the source device 100 and the first sink device 200. Therefore, description of exchange between the source device 100 and the second sink device 300 is omitted and exchange (e.g., a connection method) between the source device 100 and the first sink device 200 will be mainly described as an example in the embodiment of the present technology. In addition, an example of a case where the source device 100 and the first sink device 200 perform wireless communication using a wireless local area network (LAN) will be described in the embodiment of the present technology.

As the wireless LAN, for example, Wi-Fi Infrastructure mode (Infrastructure Mode), Wireless Fidelity (Wi-Fi) Direct, Tunneled Direct Link Setup (TDLS), an ad-hoc network, or a mesh network can be used. As short-range wireless audio visual (AV) transmission communication used in the communication system 10, for example, Wi-Fi Certified Miracast (technical specification title: Wi-Fi Display) can be used. Wi-Fi Certified Miracast is a mirroring technology for transmitting an audio or a display image reproduced with one terminal to another terminal using the technology of Wi-Fi Direct or TDLS and outputting the audio or image data similarly with the other terminal.

In Wi-Fi Certified Miracast, user Input Back Channel (UIBC) is realized on Transmission Control Protocol/Internet Protocol (TCP/IP). UIBC is a technology for transmitting manipulation information of an input device such as a mouse or a keyboard from one terminal to another terminal. Instead of Wi-Fi Certified Miracast, another remote desktop software (for example, Virtual Network Computing (VNC)) may be applied.

Here, in Wi-Fi Certified Miracast, for example, it is established that an image (video) is compressed and decompressed using H.264. For example, in Wi-Fi Certified Miracast, H.264 can be adjusted on a transmission side. An embodiment of the present technology is not limited to H.264, but can also correspond to various codecs such as H.265 (for example, high efficiency video coding (HEVC) and scalable video coding extensions of high efficiency video coding (SHVC)) and Moving Picture Experts Group (MPEG4), Joint Photographic Experts Group (JPEG) 2000. Further, it can also correspond to a line-based codec in which one or more lines are bundled and compressed or two or more lines are divided into 2×2 or more macro blocks to be compressed and decompressed. For example, by obtaining a difference with a previous code amount region of a specific code amount region (such as a picture, a bundle of a plurality of lines, or a macro block), it is possible to correspond to a codec that reduces a transmission rate without performing compression such as DCT or Wavelet. Further, an image (video) may be transmitted or received with non-compression.

Further, the source device 100, for example, may set image data and audio data generated through an imaging operation as a transmission target. Furthermore, the source device 100, for example, may set content (for example, content formed by image data and audio data) stored in a storage unit (for example, a hard disk) as a transmission target. Please note that an electronic device (for example, a PC, a game device, a smartphone, or a tablet terminal) on which a camera is mounted may be used as the source device 100, the first sink device 200, and the second sink device 300. In addition, another electronic device (for example, an imaging device, a game device, a smartphone, or a tablet terminal) that includes a display unit may be used as the source device 100, the first sink device 200, and the second sink device 300. Further, if the source device 100 has a tethering function, the source device 100 may acquire content stored in an internet services provider (IPS) via wireless or wired network and set the content as a transmission target.

For example, image data generated by an imaging operation of the source device 100 is transmitted to the first sink device 200 and an image 11 based on the image data is displayed on a display unit 251 of the first sink device 200.

In FIG. 1, a range in which the source device 100 can perform direct communication via P2P direct connection using wireless communication is indicated as an information conveyance range 15. The information conveyance range 15 is an information conveyance range (a service range) based on the source device 100.

[Configuration Example of Multi-Sink Topology]

Next, a method of constructing a multi-sink topology will be described.

Figure 2:
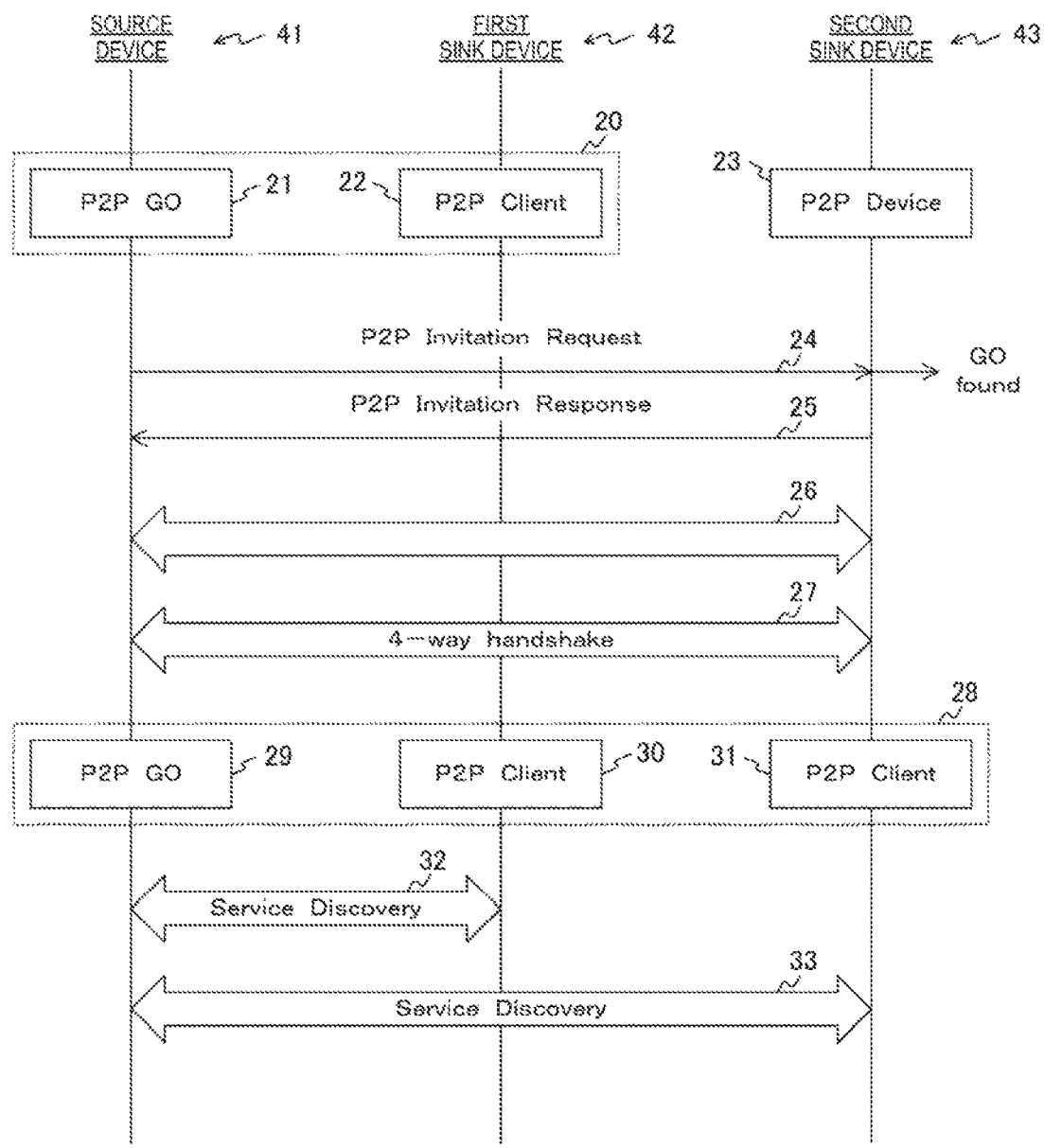
FIG. 2 is a sequence chart illustrating a communication processing example of a source device 41, a sink device 42 and a sink device 43 that are bases of the first embodiment of the present technology.

FIG. 2 is a sequence chart illustrating a communication processing example of a source device 41, a sink device 42 and a sink device 43 that are the basis of the first embodiment of the present technology. Specifically, FIG. 2 illustrates a basic flow from P2P direct connection to construction of a multi-sink topology environment. FIG. 2 shows an example of a case where the sink device 43 is added to a group in an environment in which the source device 41 is connected to the sink device 42 through P2P direct communication.

As illustrated in FIG. 2, a group 20 having the source device 41 as a P2P group owner (GO) 21 and the sink device 42 as a P2P client 22 is assumed to be formed. That is, the source device 41 has been connected to the sink device 42 (P2P client 22) as the P2P GO 21. In addition, the sink device 43 is assumed to be a P2P direct connectable P2P device 23.

First, the source device 41 performs an invitation request process for the sink device 43 (24). Alternatively, the sink device 43 may perform a provision discovery process for the source device 41.

When the invitation request process is performed in this way (24), the sink device 43 performs an invitation response process (25) for the source device 41. Further, execution of Wi-Fi protected setup (26) and 4-way handshaking (authentication procedure) (27) are performed between the source device 41 and the sink device 43.

According to these processes, the source device 41 is connected to the sink device 43 as a new P2P client 31. Accordingly, a group 28 having the source device 41 as a P2P GO 29 and the sink device 42 and the sink device 43 as P2P clients 30 and 31 is formed.

Subsequently, the source device 41 constructs a multi-sink topology by performing service discovery (32 and 33) for the sink device 42 and the sink device 43.

Content transmitted from the source device 41 to the sink device 42 or the sink device 43 and displayed thereon after the topology is constructed in this manner may be the same content (image) or different content (image). For example, an image displayed on the source device 41 may be transmitted as it is to the sink device 42 and content stored in a storage unit of the source device 41 may be transmitted to the sink device 43.

[Configuration Example of Source Device (Information Processing Device)]

Figure 3:
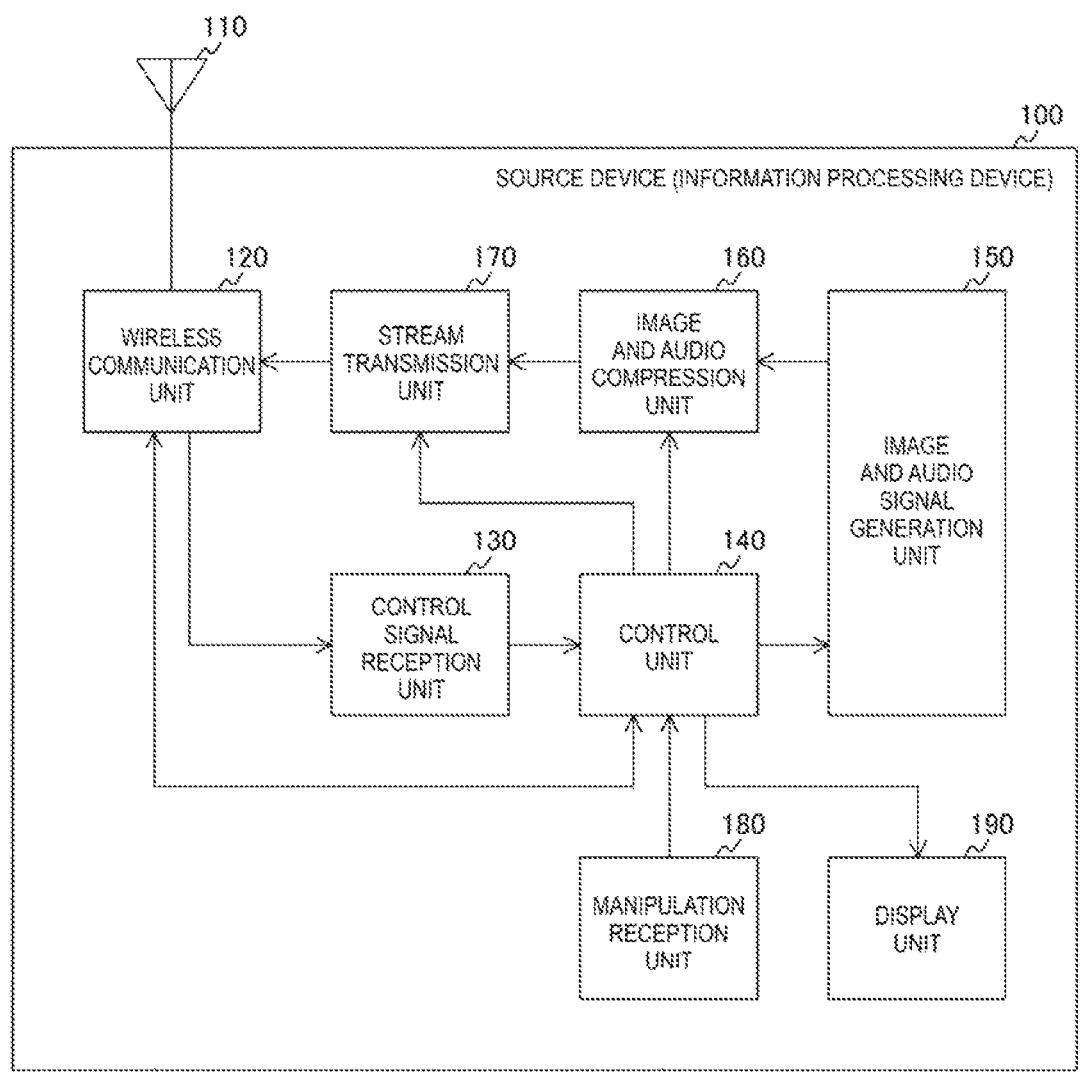
FIG. 3 is a block diagram illustrating a functional configuration example of a source device (an information processing device) 100 according to the first embodiment of the present technology.

FIG. 3 is a block diagram illustrating a functional configuration example of the source device (an information processing device) 100 according to the first embodiment of the present technology.

The source device 100 includes an antenna 110, a wireless communication unit 120, a control signal reception unit 130, a control unit 140, an image and audio signal generation unit 150, an image and audio compression unit 160, a stream transmission unit 170, a manipulation reception unit 180 and a display unit 190.

The wireless communication unit 120 transmits and receives each piece of information (for example, image data and audio data) to and from another information processing device (for example, the first sink device 200) via the antenna 110 using wireless communication under the control of the control unit 140. For example, when an image data transmission process is performed, the image data generated by the image and audio signal generation unit 150 is compressed by the image and audio compression unit 160 and the compressed image data (image stream) is transmitted from the antenna 110 via the wireless communication unit 120.

The wireless communication unit 120 is assumed to be able to transmit and receive each piece of information to and from another information processing device (for example, the first sink device 200) using a plurality of frequency channels. In the first embodiment of the present technology, an example in which the wireless communication unit 120 has a function of transmitting and receiving three kinds of frequency channels, 2.4 GHz, 5 GHz, and 60 GHz simultaneously or only the one selected will be described. In this way, when the source device has the function of transmitting and receiving the plurality of frequency channels, a sink device (for example, the first sink device 200) can control a frequency channel to be used by each source device.

The control signal reception unit 130 acquires a control signal (for example, information interchanged with the first sink device 200) transmitted from another information processing device (for example, the first sink device 200) among the pieces of information received by the wireless communication unit 120. Then the control signal reception unit 130 outputs the acquired control signal to the control unit 140.

The control unit 140 performs control on each piece of information to be transmitted from the source device 100. For example, the control unit 140 performs control on the image and audio signal generation unit 150 and the image and audio compression unit 160 based on the control signal received by the control signal reception unit 130. For example, the control unit 140 performs control such that the number of channels of audio or the resolution of image data which is a transmission target is changed or performs control such that an image region of the image data which is a transmission target is changed. That is, the control unit 140 performs transmission control of a stream which is a transmission target based on the control signal received by the control signal reception unit 130. This transmission control of a stream is, for example, data transmission speed control or scalability transmission rate control.

The control unit 140 may have a function of measuring a radio wave propagation situation (link radio wave propagation situation) when data is transmitted to and received from the sink device using the wireless communication and may transmit a measurement result (radio wave propagation measurement information) to the sink device.

Here, the radio wave propagation measurement information is, for example, information used to determine whether line quality with the sink device is quality with which the image data and the audio data can be transmitted and received. The radio wave propagation measurement information is used, for example, when stream transmission control is performed.

Here, the data transmission speed mainly means an occupancy ratio to a communication line and is assumed to include a meaning of a communication speed or a communication capacity. For example, the resolution is defined as an index of image quality configured to include a component such as an image frame (the number of vertical and horizontal pixels) of the image data, or a bit rate (compression ratio) of the image data. As the index of the quality, the throughput of a stream can be used. The number of channels of audio is assumed to include a meaning of an audio recording and reproducing method such as a monaural (1.0 ch), a stereo (2.0 ch), 5.1 ch, 6.1 ch, 9.1 ch, or high-resolution audio. The number of channels of audio is defined as an index of audio quality configured to include a component such as a bit rate (compression ratio) of audio data or the number of channels. As the index of the audio quality, the throughput of a stream can be used.

The control unit 140 performs control such that a state unstable in the data rate control is improved. For example, the control unit 140 comprehends system performance information of a sink device (for example, the first sink device 200) by interchanging information with the sink device. Here, the system performance information is, for example, performance information regarding the system of the sink device. For example, the system performance information is a usable frequency channel, a resolution, Transmission Control Protocol (TCP), and User Datagram Protocol (UDP). The system performance information is, for example, information indicating each of correspondence of an encryption method, correspondence of standard definition (SD)/high definition (HD)/4K, and correspondence of a low power consumption mode. For example, the control unit 140 can select a method for the stream transmission control to further improve the entire system stability of the communication system 10 in accordance with whether the sink device corresponds to the lower power consumption mode.

For example, the control unit 140 is assumed to insert information regarding whether the source device 100 is a mobile device during interchange of information with the first sink device 200. For example, capability information regarding the source device 100 can include information regarding whether the source device 100 is a mobile device. When it is comprehended that the source device 100 is the mobile device, the first sink device 200 can determine that it is not necessary to operate the source device 100 on the basis of association with other connected information processing devices. In this way, when it is determined that it is not necessary to operate the source device 100, the source device 100 receives a transmission stop command from the first sink device 200. When the control unit 140 comprehends the transmission stop command, the control unit 140 can be powered down the function of each of the image and audio signal generation unit 150, the image and audio compression unit 160, and the stream transmission unit 170 for a given time. The control unit 140 can transition the wireless communication unit 120 to intermittent reception (which is a mode in which the wireless communication unit 120 rises up periodically so that the wireless communication unit 120 can receive a command from the first sink device 200 and the device is powered down in other cases).

The image and audio signal generation unit 150 generates data (image data and audio data) which is an output target under the control of the control unit 140 and outputs the generated data to the image and audio compression unit 160. For example, the image and audio signal generation unit 150 includes an imaging unit (not illustrated) and an audio acquisition unit (not illustrated). The imaging unit (for example, a lens, an image sensor, or a signal processing circuit) images a subject and generates an image (image data). The audio acquisition unit (for example, a microphone) acquires a surrounding audio when the image data is generated. The data generated in this way is a transmission target to be transmitted to another information processing device (for example, the first sink device 200).

The image and audio compression unit 160 compresses (encodes) the data (the image data and the audio data) generated by the image and audio signal generation unit 150 under the control of the control unit 140. Then, the image and audio compression unit 160 outputs the compressed data (the image data and the audio data) to the stream transmission unit 170. The image and audio compression unit 160 may be realized by performing the encoding by software or may be realized by performing the encoding by hardware. The image and audio compression unit 160 is assumed to function as a codec, but is assumed to be able to handle an uncompressed image or audio. Further, the image and audio compression unit 160 can also function as a scalable codec. Here, the scalable codec means, for example, a codec which can be applied freely according to the resolution of a reception side information processing device (sink device), a network environment, or the like.

The stream transmission unit 170 performs a transmission process of transmitting the data (the image data and the audio data) compressed by the image and audio compression unit 160 as a stream from the antenna 110 via the wireless communication unit 120 under the control of the control unit 140.

A manipulation reception unit 180 is a manipulation reception unit that receives a manipulation input performed by a user and is, for example, a keyboard, a mouse, a game pad, a touch panel, a camera, or a microphone. The manipulation reception unit 180 and the display unit 190 can be integrally configured using a touch panel capable of performing a manipulation input when the user touches or approaches a display surface with his or her finger.

A display unit 190 is, for example, a display unit that displays an image generated by the image and audio signal generation unit 150. As the display unit 190, various types of display panels can be used. For example, an electro-luminescence (EL) or crystal light-emitting diode (LED) display or a liquid crystal display (LCD) can be used.

The source device 100 can include an audio output unit or the like in addition to the above-described units, but these units are not illustrated in FIG. 3. The example in which the source device 100 generates the image data and the audio data which are the transmission targets has been described. However, the source device 100 may acquire image data and audio data which are transmission targets from an external device. For example, the source device 100 may acquire image data and audio data which are transmission targets from a web camera equipped with a microphone. The source device 100 may set content (for example, content formed by image data and audio data) stored in a storage device (for example, a hard disk) as a transmission target irrespective of the inside or outside of the source device 100. In this case, the content stored in the storage device is also assumed to be compressed content. In this case, when the compressed content is compressed in accordance with an encoding scheme defined in a standard adopted in the communication system 10, the compressed content may be transmitted without being decrypted (decoded).

An audio output unit (not illustrated) of the source device 100 is, for example, an audio output unit (for example, a speaker) that outputs an audio generated by the image and audio signal generation unit 150. An image can be output from both of a source device and a sink device, but an audio is preferably output from only one of the transmission device and the reception device.

[Configuration Example of Sink Device (Information Processing Device)]

Figure 4:
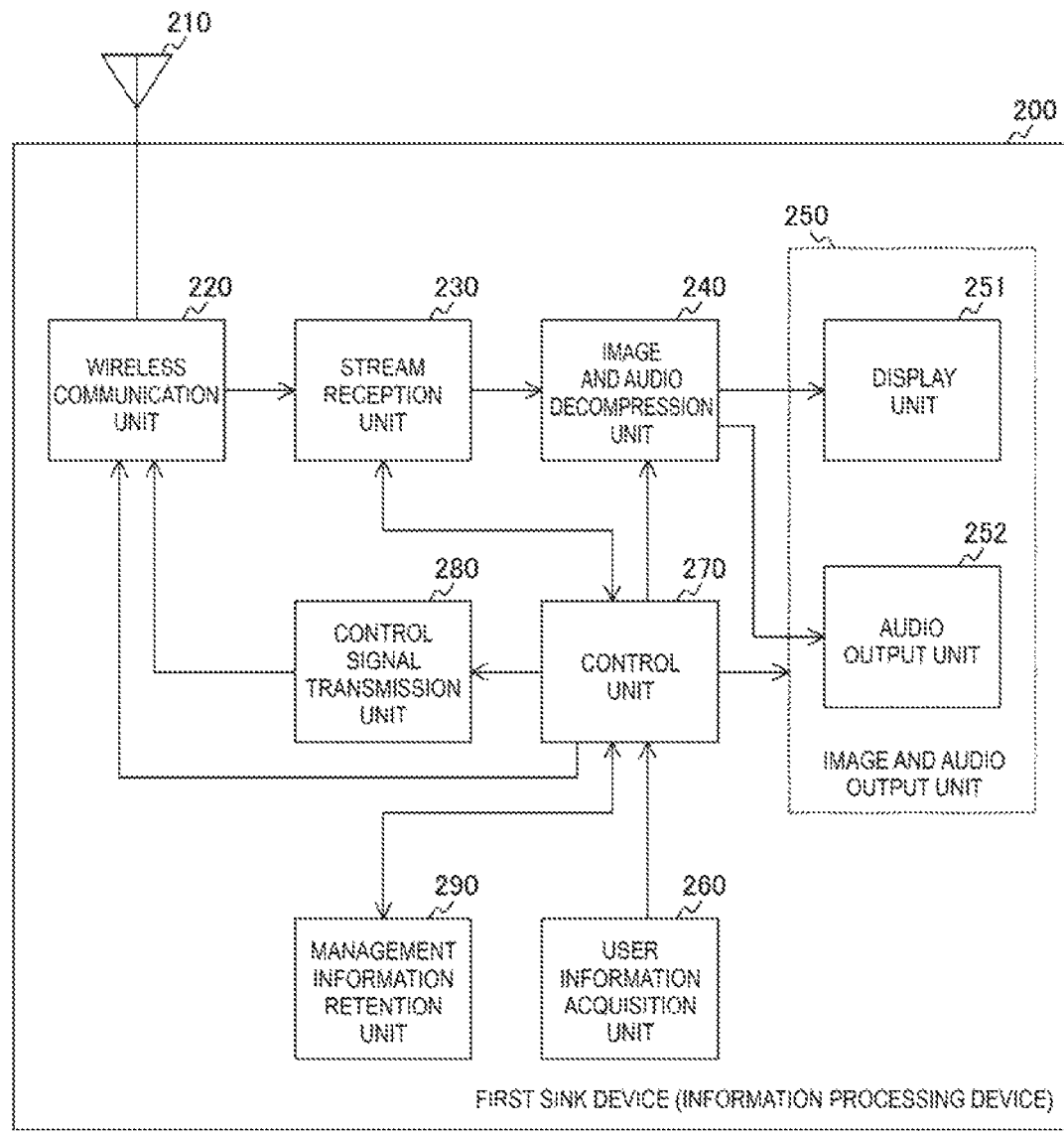
FIG. 4 is a block diagram illustrating a functional configuration example of a first sink device (an information processing device) 200 according to the first embodiment of the present technology.

FIG. 4 is a block diagram illustrating a functional configuration example of the first sink device (the information processing device) 200 according to the first embodiment of the present technology. Meanwhile, a functional configuration of the second sink device 300 (functional configuration related to wireless communication) is substantially similar to that of the first sink device 200 and thus description thereof is omitted here.

The first sink device 200 includes an antenna 210, a wireless communication unit 220, a stream reception unit 230, an image and audio decompression unit 240, an image and audio output unit 250, a user information acquisition unit 260, a control unit 270, a control signal transmission unit 280, and a management information retention unit 290.

The wireless communication unit 220 transmits and receives each piece of information (for example, image data and audio data) to and from another information processing device (for example, the sink device 100) via the antenna 210 using wireless communication under the control of the control unit 270. For example, when an image data reception process is performed, the image data received by the antenna 210 is decompressed (decoded) by the image and audio decompression unit 240 via the wireless communication unit 220 and the stream reception unit 230. Then, the decompressed image data is supplied to the image and audio output unit 250 and an image corresponding to the decompressed image data is output from the image and audio output unit 250. That is, the image corresponding to the decompressed image data is displayed on a display unit 251.

The wireless communication unit 220 is assumed to be able to transmit and receive each piece of information to and from another information processing device (for example, the source device 100) using a plurality of frequency channels. In the first embodiment of the present technology, an example in which the wireless communication unit 220 has a function of transmitting and receiving three kinds of frequency channels, 2.4 GHz, 5 GHz, and 60 GHz simultaneously or only the one selected will be described. That is, the wireless communication unit 220 can perform communication using a first frequency band and communication using a second frequency band of a higher data transmission speed than the first frequency band. The control unit 270 controls a frequency channel to be used among a plurality of frequency channels in wireless communication with each source device. Further, the control unit 140 of the source device 100 may control which one of the plurality of frequency channels will be used for wireless communication with each sink device.

Link between the source device 100 and the first sink device 200, and link between the first source 100 and the second sink device 300 may be established with the same frequency channel or may be established with different frequency channels.

In the first embodiment of the present technology, an example in which the wireless communication unit 220 has the function of transmitting and receiving three kinds of frequency channels, 2.4 GHz, 5 GHz, and 60 GHz will be described, but an embodiment of the present technology is not limited thereto. For example, the wireless communication unit 220 may have a function of transmitting and receiving other frequency channels, two frequency channels, four or more frequency channels.

The stream reception unit 230 receives streams (for example, an image stream and an audio stream) and interchange information with each source device among the pieces of information received by the wireless communication unit 220 under the control of the control unit 270. Then, the stream reception unit 230 outputs the received command information to the control unit 270 and outputs the received streams to the image and audio decompression unit 240 and the control unit 270.

Here, the interchange information with each source device is information transmitted from a source device (for example, the source device 100) and includes, for example, a request for acquiring system performance information of the first sink device 200. The system performance information is, for example, information indicating a usable frequency channel, a resolution, TCP, and UDP or each of correspondence of an encryption method, correspondence of SD/HD/4K, and correspondence of a low power consumption mode.

The stream reception unit 230 has a function of measuring a radio wave propagation situation (link radio wave propagation situation) when data is transmitted to and received from a sink device using the wireless communication. The stream reception unit 230 outputs a measurement result (radio wave propagation measurement information) to the control unit 270.

The image and audio decompression unit 240 decompresses (decodes) the streams (image data and the audio data) transmitted from another information processing device (for example, the source device 100) under the control of the control unit 270. Then, the image and audio decompression unit 240 outputs the decompressed data (the image data and the audio data) to the image and audio output unit 250. The image and audio decompression unit 240 may be realized by performing the decoding by software or may be realized by performing the decoding by hardware. The image and audio decompression unit 240 is assumed to function as a codec, but is assumed to be able to handle an uncompressed image or audio. Further, the image and audio decompression unit 240 can also function as a scalable codec.

The image and audio output unit 250 includes a display unit 251 and an audio output unit 252.

The display unit 251 is a display unit that displays each image based on the image data decompressed by the image and audio decompression unit 240. As the display unit 251, for example, a display panel such as an organic EL panel, a crystal LED display, an LCD panel can be used. As the display unit 251, a touch panel capable of performing a manipulation input when a user touches or approaches a display surface with his or her finger may be used.

The audio output unit 252 is an audio output unit (for example, a speaker) that outputs various audios (an audio and the like related to an image displayed on the display unit 251) based on the audio data decompressed by the image and audio decompression unit 240. Here, as an audio output method, for example, a method of reproducing only an audio of a source device allocated to a middle channel (a main image) from a speaker and reproducing no audio of a source device allocated to a peripheral channel (a sub-image) can be used. As another audio output method, for example, a method of setting the volume of an audio of a source device allocated to the middle channel as a main and lowering the volume of an audio of a source device allocated to the peripheral channel and reproducing the audio can be used. Other audio output methods may be used.

The user information acquisition unit 260 acquires information regarding a user (user information) and outputs the acquired user information to the control unit 270. For example, the user information acquisition unit 260 can acquire the user information by receiving an input from a manipulation reception unit (a keyboard, a mouse, a remote controller, a game pad, or a touch panel) for which the user can directly set a display method. The manipulation reception unit is, for example, a manipulation member that designates any region in an image displayed on the display unit 251. For example, the user information acquisition unit 260 can acquire the user information by receiving an input from a device which can comprehend a user's intention, such as a camera, a microphone, or any of various sensors (for example, gyro sensors and sensors detecting human bodies).

For example, the user information acquisition unit 260 acquires the user information generated through a user motion when information based on the stream received from another information processing device (for example, the source device 100) using the wireless communication is output from the image and audio output unit 250. The user information is, for example, user information generated through a user motion related to an image displayed on the display unit 251. For example, the user information is information generated on the basis of a user manipulation related to the image displayed on the display unit 251.

For example, the user information acquisition unit 360 can acquire image data generated by an imaging unit (omitted) attached to the display unit and generate user information. In addition, for example, the user information acquisition unit 260 may acquire information (for example, positional information or identification information) acquired by an external device (for example, each sensor or a wearable device) and generate user information.

The control unit 270 causes the management information retention unit 290 to retain each piece of information acquired by the stream reception unit 230 and manages each source device on the basis of management information retained the management information retention unit 290. The control unit 270 performs the stream transmission control so that stability is improved for streams transmitted from a plurality of source devices in the entire system.

For example, the control unit 270 performs the stream transmission control on the basis of the user information acquired by the user information acquisition unit 260 and the management information retained in the management information retention unit 290. Specifically, the control unit 270 generates a control signal for each source device to perform the stream transmission control (for example, the data transmission speed control and the scalability transmission rate control) on the basis of the management information retained in the management information retention unit 290. Then, the control unit 270 outputs the generated control signal to the control signal transmission unit 280. For example, the control unit 270 changes the resolution of an image displayed on the display unit 251 on the basis of the user information and the management information and generates a control signal to request a transmission rate equivalent to the resolution from each source device. For example, the control unit 270 generates a control signal to decide a display region of an image on the display unit 251 on the basis of the user information and the management information. For example, the control unit 270 generates a control signal to decide the size of an image on the display unit 251 on the basis of the user information and the management information.

The control unit 270 performs control such that a frequency channel and a resolution to be used are set on the basis of the user information and the management information. For example, the control unit 270 sets a frequency channel to be used for each source device in the plurality of frequency channels of the wireless communication unit 220. When the power consumption mode is different from each frequency channel, the control unit 270 comprehends each mode and sets the frequency channel for caring the power consumption of a mobile device. That is, the control unit 270 can separately set a first power consumption mode related to the first frequency band and a second power consumption mode related to the second frequency band of a higher data transmission speed than the first frequency band.

The control signal transmission unit 280 performs a transmission process of transmitting the control signal output from the control unit 270 to another wireless communication device via the wireless communication unit 220 and the antenna 210.

[Communication Example of Interchange Using Wi-Fi Certified Miracast Specification Command]

Figure 5:
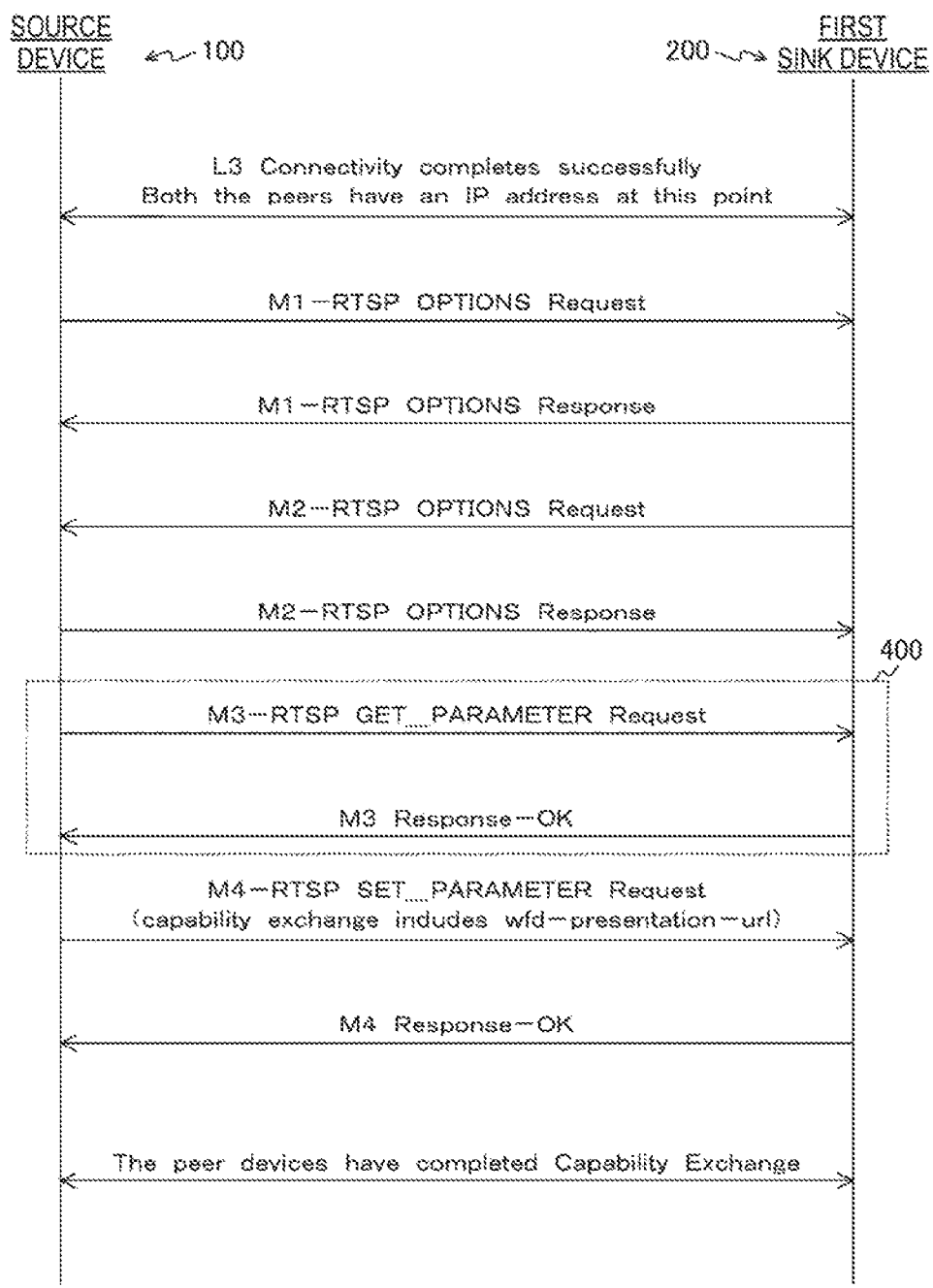
FIG. 5 is a sequence chart illustrating a communication process example between the source device 100 and the first sink device 200 according to the first embodiment of the present technology.

FIG. 5 is a sequence chart illustrating a communication process example between the source device 100 and the first sink device 200 according to the first embodiment of the present technology. FIG. 5 illustrates a communication example with exchange using the RTSP protocol.

For example, as shown in a dotted-line rectangle 400 of FIG. 5, an "RTSP M3 request" (RTSP GET_PARAMETER request) message transmitted from the source device 100 to the first sink device 200 and an "RTSP M3 response" (RTSP GET_PARAMETER response) message transmitted from the first sink device 200 to the source device 100 in response to the message may be used.

Further, appropriate transmission from the source device 100 to the first sink device may be performed. For example, exchange between the "RTSP M3 request" (RTSP GET_PARAMETER request) message and the "RTSP M3 response" (RTSP GET_PARAMETER response) message may be omitted and management information may be included in a message transmitted from the source device 100 to the first sink device 200 and may be transmitted from the source device 100 to the first sink device 200 such that the first sink device 200 selects information and retains the selected information in the management information retention unit 190 (shown in FIG. 4). Furthermore, when content protection setup is performed, link protection setup may be performed after M3 response and then communication may be performed while securing secrecy with respect to M4 or higher messages.

Here, information received by the source device 100 from the first sink device 200 as an RTSP M3 response may be the following information (1) to (11).
(1) Audio format(s) supported by the WFD Sink
(2) Video format(s) support by the WFD Sink
(3) 3D formats supported by the WFD Sink
(4) The HDCP system 2.0/2.1/2.2 support/control port
(5) Available EDID information of display attached to the WFD Sink
(6) Coupled WFD Sink information
(7) RTP port(s) the WFD Sink(s) listen on
(8) Supports I2C commands and port number
(9) UIBC capability supported
(10) WFD Source uses this parameter to obtain the connector type currently active on the WFD sink
(11) Indicate the support for standby and resume control using RTSP Meanwhile, although a connection sequence of the source device 100 and the second sink device 300 illustrated in FIG. 1 is described in FIG. 5, the same connection sequence is performed as a connection sequence of the source device 100 and the second sink device 300.

[Operation Example for Source Device]

Figure 6:
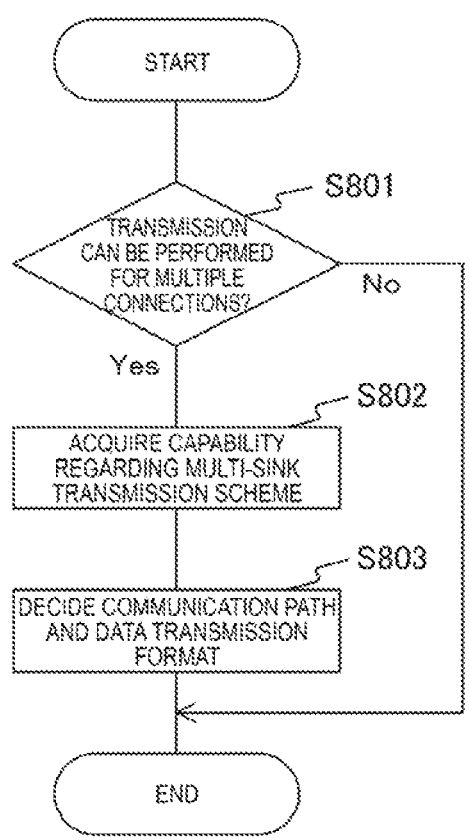
FIG. 6 is a flowchart illustrating an example of a processing procedure of a multi-sink connection process of the source device 100 according to the first embodiment of the present technology.

FIG. 6 is a flowchart illustrating an example of a processing procedure of a multi-sink connection process by the source device 100 according to the first embodiment of the present technology.

FIG. 6 illustrates an example of basic operations from P2P direct connection to construction of a multi-sink topology environment in an environment using P2P direct connection.

First, the control unit 140 of the source device 100 determines whether transmission can be performed for a plurality of connections when detecting the presence of a sink device added to a group (step S801). When a plurality of sink devices have been connected, the control unit 140 determines whether the number of connections can be further increased and transmission can be performed (step S801). When transmission cannot be performed for a plurality of connections (step S801), the operation of the multi-sink connection process is terminated.

When transmission can be performed for a plurality of connections (step S801), the control unit 140 exchanges information about multi-sink transmission scheme capability with sink devices (step S802).

Subsequently, the control unit 140 decides a communication path (e.g., the number of paths) and a data transmission format for transmitting media data to a sink device that is a connection target (step S803). Here, the media data is data corresponding to a target for transmission from the source device to the sink device and, for example, is at least one of image data, audio data and control data. Further, the control unit 140 may decide one of an infra (infrastructure) mode, a TDLS mode and a P2P mode for the communication path on the basis of contents included in an information element (IE) exchanged with the sink device, for example. In addition, the control unit 140 may decide a data transmission format used in the communication path on the basis of the contents included in the information element (IE) exchanged with the sink device, for example. Meanwhile, the details of decision described here are an example and other communication paths and other data transmission formats may be decided upon.

[Communication Example When Multi-Sink Topology Environment is Constructed]

Figure 7:
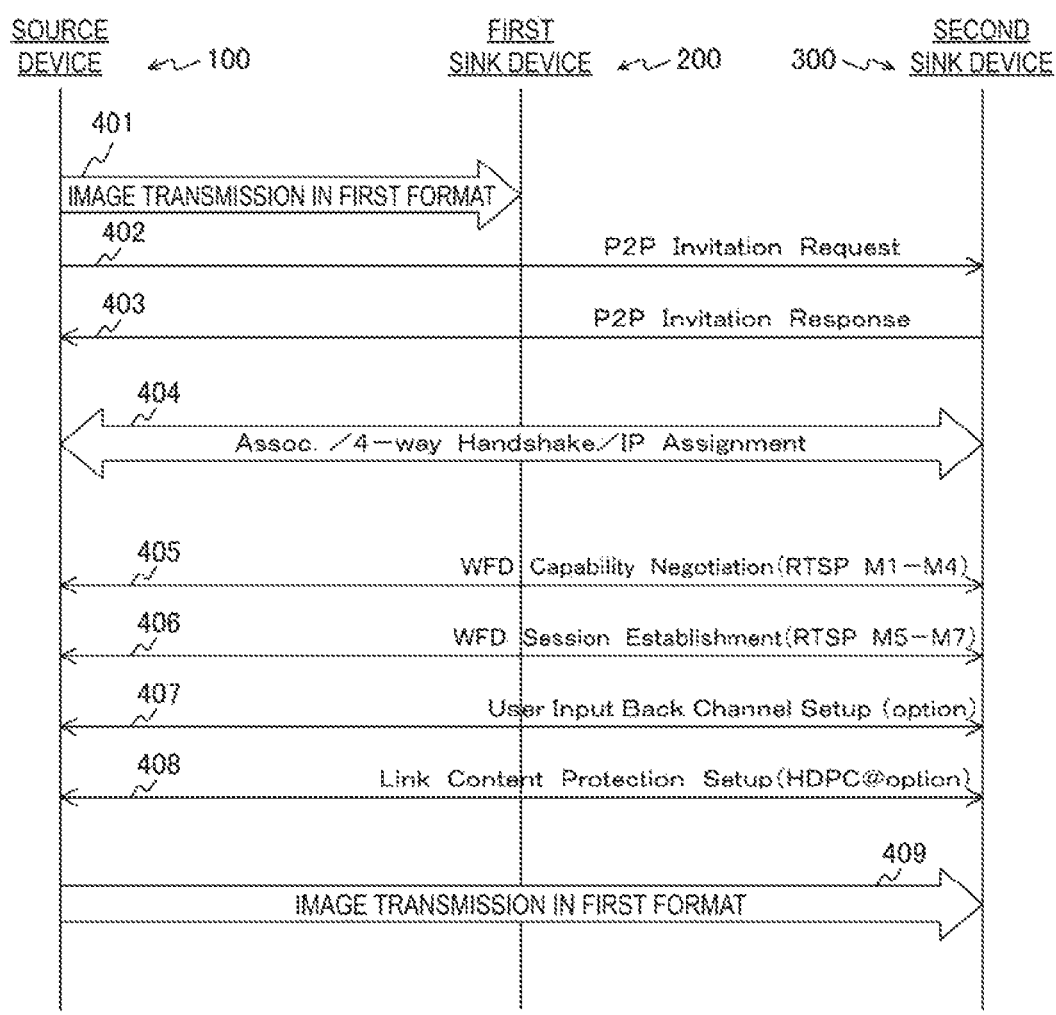
FIG. 7 is a sequence chart illustrating a communication process example between devices constituting the communication system 10 according to the first embodiment of the present technology.

FIG. 7 is a sequence chart illustrating an example of a communication process between devices constituting the communication system 10 according to the first embodiment of the present technology.

FIG. 7 illustrates a basic flow from P2P direct connection to construction of a multi-sink topology environment in an environment using P2P direct connection represented by Wi-Fi CERTIFIED Miracast.

In addition, FIG. 7 illustrates an example of a case where the second sink device 300 is added to a group in an environment in which the source device 100 is connected to the first sink device 200 through P2P direct communication.

Meanwhile, processes (402 and 403) shown in FIG. 7 correspond to the process (step S801) shown in FIG. 6. In addition, a process (404) shown in FIG. 7 corresponds to the process (step S802) shown in FIG. 6. Further, processes (405 and 406) shown in FIG. 7 correspond to the process (step S803) shown in FIG. 6.

In the example illustrated in FIG. 7, the flow of the process of the source device 100 differs from that of P2P direct connection. Accordingly, description will be given on the basis of the differences hereinafter.

The source device 100 is assumed to have been connected to a P2P client (first sink device 200) as a GO (401). Further, the source device 100 is assumed to perform image transmission using a first format as a transmission format that can be used by the first sink device 200 (401).

In this case, when the second sink device 300 is added to the group, the source device 100 performs an invitation request process for the second sink device 300 (402). Further, the second sink device 300 may perform a provision discovery process for the source device 100. However, an example in which the source device 100 performs the invitation request process is described here.

When the source device 100 performs the invitation request process for the second sink device 300 (402), the second sink device 300 performs an invitation response process for the source device 100 (403). In this case, the source device 100 is connected to the new second sink device 300 as well as the first sink device 200 that is being connected thereto and thus notifies the second sink device 300 that the number of simultaneously connected devices is two or more through device information or service information.

It is assumed that this notification method can be performed through exchange of at least one piece of the following information (a) to (d).
(a) P2P information element (IE)
(b) WFD information element (IE)
(c) Application service platform (ASP) (e.g., new format in ASP format command)
(d) Control in universal plug and play (UPnP) standard Further, according to the invitation response process (403), the source device 100 is connected to the second sink device 300 as a new P2P client and performs an association process (404). The association process is a group formation process, for example, a 4-way handshaking process, an IP assignment process and the like.

In addition, the source device 100 and the second sink device 300 perform service discovery for each other (405). With reference to information recognized through this process, a multi-sink topology having the source device 100 as a source device and the first sink device 200 and the second sink device 300 as sink devices is constructed (406 to 408).

For example, the source device 100 may decide generation of two data paths (for transmission of the first sink device 200 and the second sink device 300) in order to perform stabilized data transmission for each P2P direct line. Then, the source device 100 transmits media data (image data and audio data) using the two data paths (409).

In this manner, the multi-sink topology is constructed. After the construction, content transmitted from the source device 100 to the first sink device 200 or the second sink device 300 and displayed thereon may be the same content (image) or different content (image). For example, an image displayed on the source device 100 may be transmitted as it is to the first sink device 200 and content stored in the storage unit of the source device 100 may be transmitted to the second sink device 300. In addition, only image data or only audio data may be transmitted from the source device 100 to the first sink device 200 or the second sink device 300.

Here, as capability information exchanged using the aforementioned device information or service information, the following information (A) to (C) may be exchanged (e.g., 405 shown in FIG. 7). This information is exchanged as information transmitted by a source device to a sink device or information received by a source device from a sink device.
(A) Type of data transmission format used by sink device for media transmission (e.g., decoding capability of sink device)

(B) Whether to permit switching to data transmission format usable by newly added sink device (e.g., presence or absence of a function that is normally executed even when change of settings such as resolution, picture quality or sound quality, image stop and play or audio stop and play is performed; in addition, when the timing at which this information is received is when capability negotiation is performed whether this is possible during image transmission or audio transmission)

(C) The number of encryption keys of a high-bandwidth digital content protection (HDCP) system which can be used by a source device (e.g., presence or absence of a function of the source device for managing a plurality of encryption keys when the source device needs to use HDCP)

The source device 100 recognizes a group to share and generates a minimum number of data paths in order to generate image data or audio data on the basis of conditions (e.g., capability and presence or absence of a function) specified by the information acquired in this manner.

[Operation Example for Source Device]

Figure 8:
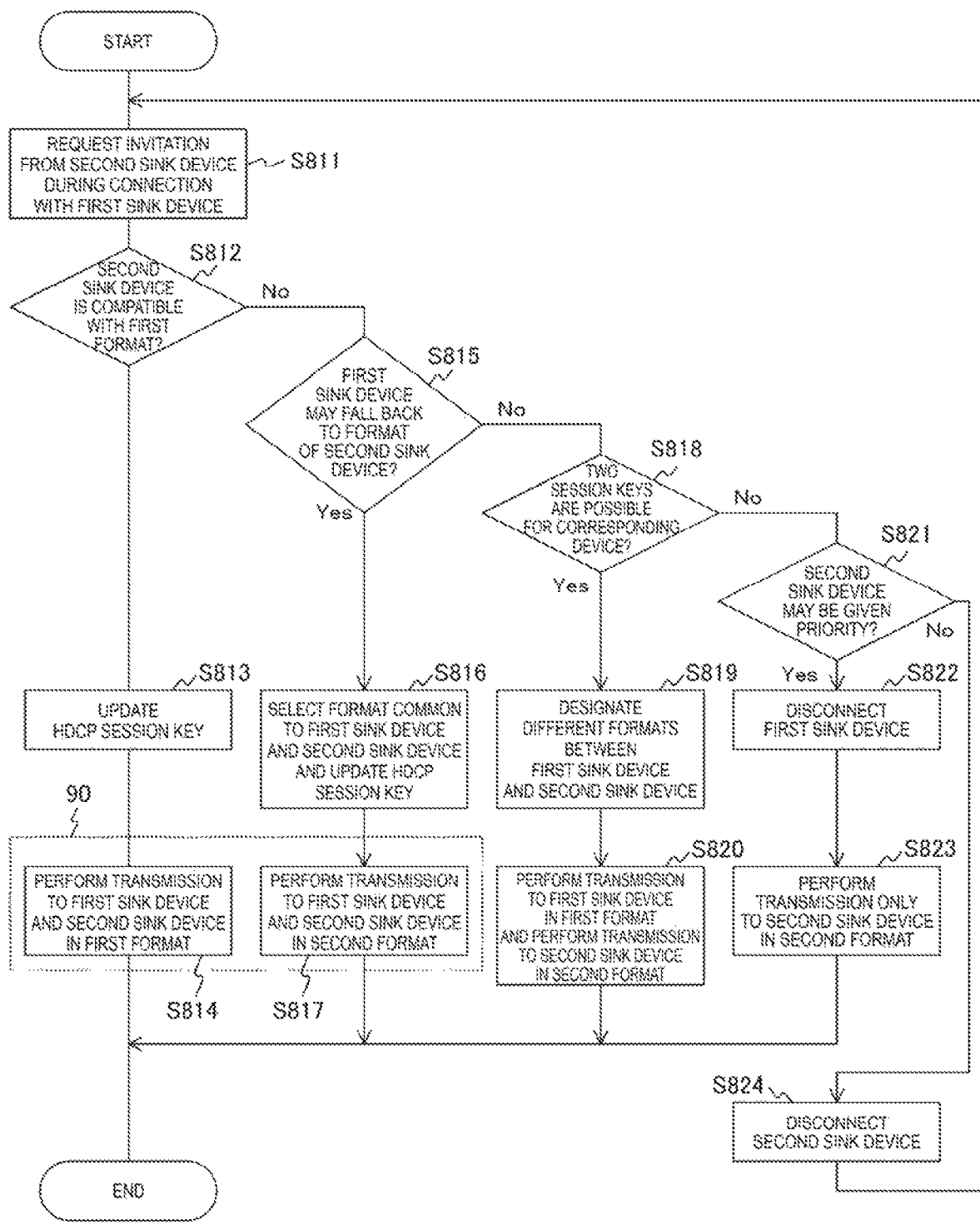
FIG. 8 is a flowchart illustrating an example of a processing procedure of a multi-sink connection process of the source device 100 according to the first embodiment of the present technology.

FIG. 8 is a flowchart illustrating an example of a processing procedure of a multi-sink connection process by the source device 100 according to the first embodiment of the present technology. FIG. 8 illustrates an example of a multi-sink connection process for generating a minimum number of data paths in a multi-sink topology. Specifically, FIG. 8 illustrates an example of a multi-sink connection process of the source device 100 when the second sink device 300 is newly connected in an environment in which the source device 100 is connected to the first sink device 200.

First, the control unit 140 of the source device 100 transmits an invitation request packet from the second sink device 300 during connection to the first sink device 200 (step S811). Accordingly, the source device 100 notifies the second sink device 300 of invitation of connection to the source device 100.

Subsequently, the control unit 140 of the source device 100 checks whether the second sink device 300 is compatible with the first format (step S812). Here, the first format is assumed to be an image transmission format used by the first sink device 200 that is being connected to the source device 100.

For example, the control unit 140 of the source device 100 may check whether the second sink device 300 is compatible with the first format using one of the aforementioned (a) to (d) or a plurality of pieces of this information.

When the second sink device 300 is compatible with the first format (step S812), the control unit 140 updates an HDCP session key (step S813). Further, update of the HDCP session key is performed when the HDCP is needed.

Subsequently, the control unit 140 transmits content to the first sink device 200 and the second sink device in the first format (step S814).

When the second sink device 300 is not compatible with the first format (step S814), the control unit 140 checks whether the first sink device 200 permits various types of switching (or fallback) at the request of another device (step S815). For example, the switching includes switching of resolution, switching of an image compression scheme, switching of picture quality, image on/off, switching of sound quality, switching of an audio compression scheme, audio on/off, etc.

For example, the source device 100 may perform the checking in advance through capability negotiation when connected to the first sink device 200. In addition, the source device 100 may perform the checking whenever a new sink device is connected, for example.

Furthermore, when the first sink device 200 and the second sink device 300 have different performances, for example, it may be desirable not to permit various types of switching (or fallback). For example, a case where the first sink device 200 is a device corresponding to 4K resolution whereas the second sink device 300 is a device corresponding to high definition (HD) is assumed. In this case, there may be a user who does not want to decrease the resolution of the first sink device 200 to HD when the source device 100 transmits an image corresponding to 4K resolution. Accordingly, the control unit 140 may check whether various types of switching (or fallback) are permitted on the basis of capabilities and environments of the first sink device 200 and the second sink device 300, and the like (step S815).

When the first sink device 200 permits various types of switching (or fallback) (step S815), the control unit 140 selects a common format (second format) with which both the first sink device 200 and the second sink device 300 can be compatible (step S816). When HDCP is needed, the control unit 140 updates an HDCP session key (step S816).

Subsequently, the control unit 140 transmits content to the first sink device 200 and the second sink device 300 in the second format (step S817).

Meanwhile, packets transmitted in this way (dotted-line rectangle 90) may be transmitted through one of multicast and unicast or both thereof even when they are appropriately changed.

When the first sink device 200 does not permit various types of switching (or fallback) (step S815), the control unit 140 checks whether transmission to the first sink device 200 and the second sink device 300 can be performed in different formats (step S818).

Here, when transmission to the first sink device 200 and the second sink device 300 is performed in different formats, it is necessary to generate different pieces of media data (e.g., image data, audio data and control data) corresponding to the number of sink devices. Accordingly, the control unit 140 of the source device 100 determines whether the devices therefor have specific capabilities. For example, the control unit 140 determines whether there is capability of compressing media data corresponding to the number of sink devices and whether there is capability of managing a plurality of data paths (also including checking whether a process such as session encryption and a transmission speed satisfy required performances). Further, when media data that is a transmission target is premium content, whether encryption of a plurality of pieces of media data can be performed is checked.

When transmission to the first sink device 200 and the second sink device 300 can be performed in different formats (step S818), the control unit 140 performs a process of designating different formats between the first sink device 200 and the second sink device 300 (step S819). For example, the first format may be designated for the first sink device 200 and the second format may be designated for the second sink device 300.

Subsequently, the control unit 140 transmits content to the first sink device 200 and the second sink device 300 using different formats (step S820). For example, the control unit 140 may perform transmission to the first sink device 200 using the first format and may perform transmission to the second sink device 300 using the second format (step S820).

When transmission to the first sink device 200 and the second sink device 300 can be performed in different formats (step S818), transmission may be performed to only one of the first sink device 200 and the second sink device 300. Accordingly, the control unit 140 decides a sink device that becomes a connection target (step S821).

For example, the control unit 140 may decide a sink device that is a connection target on the basis of priority levels of sink devices (step S821). As the priority levels, intent values of sink devices may be used, for example. Further, priority level setting information similar to intent values may be newly generated and exchanged. Furthermore, a sink device corresponding to a connection target may be decided, for example, on the basis of the type of content corresponding to a transmission target and a combination of a source device and a sink device. When content corresponding to a transmission target is a movie, for example, a sink device corresponding to a connection target can be decided upon using sizes of display units of sink devices as priority levels (sink devices have increasing priority levels as sizes thereof increase).

When it is determined that connection to the second sink device 300 is given priority (step S821), the control unit 140 performs a disconnection process for disconnection from the first sink device 200 (step S822). Subsequently, the control unit 140 initiates connection to the second sink device 300 and performs transmission to the second sink device 300 using the second format (step S823).

Further, when it is determined that connection to the first sink device 200 is given priority (step S821), the control unit 140 performs a disconnection process for disconnection from the second sink device 300 (step S824). That is, the disconnection process is performed because the source device 100 is connected to the second sink device 300 through a radio layer according to the process of connecting the source device 100 and the second sink device 300. Meanwhile, steps S811 to S824 correspond to an example of control in an information processing method and control executed by a computer disclosed in the claims.

In this manner, the control unit 140 of the source device 100 may newly perform media transmission to the second sink device 300 while performing media transmission to the first sink device 200. Here, media transmission is real-time image transmission and real-time audio transmission performed between other devices according to Wi-Fi CERTIFIED Miracast specifications, for example. Further, when the second sink device 300 is newly added, the control unit 140 of the source device 100 performs exchange of information (e.g., at least one of the aforementioned (A) to (C)) in a device discovery process (e.g., device discovery, service discovery) or a capability checking process (e.g., capability negotiation). In addition, the control unit 140 of the source device 100 decides at least one of a communication path for performing media transmission to the first sink device 200 and the second sink device 300 and a data transmission format used when media transmission is performed on the basis of the information.

For example, the control unit 140 of the source device 100 may decide the communication path or the data transmission format on the basis of exchanged information and at least one of the capability of the source device 100 regarding an encoding process and the number of processes that can be performed. In addition, when encryption according to HDCP is required, for example, the control unit 140 of the source device 100 may decide the communication path or the data transmission format on the basis of exchanged information, at least one of capability of the source device 100 regarding an encoding process and the number of processes that can be performed and at least one of capability regarding an HDCP encryption key process of the source device 100 and the number of processes that can be performed.

Further, the control unit 140 of the source device 100 may determine whether media transmission to the first sink device 200 and the second sink device 300 can be performed on the basis of the exchanged information. When it is determined that media transmission to the first sink device 200 and the second sink device 300 cannot be performed, the control unit 140 of the source device 100 may switch a counterpart device from the first sink device 200 to the second sink device 300.

Here, an example of encapsulating a WFD IE in payload parts of a probe request and a probe response and an example of a method of controlling controllable device discovery or service discovery will be described as the aforementioned checking method.

FIGS. 9 to 13 are diagrams illustrating an example of a WFD IE format exchanged between devices constituting the communication system 10 according to the first embodiment of the present technology.

FIG. 14 is a diagram illustrating an example of a new message for an application service platform (ASP) exchanged between devices constituting the communication system 10 according to the first embodiment of the present technology.

The WFD IE shown in FIGS. 9 to 13 may be exchanged through P2P connection between devices constituting the communication system 10. Further, the WFD IE shown in FIGS. 9 to 13 may be exchanged via an access point (e.g., an access point 500 illustrated in FIGS. 18a and 18b) between devices constituting the communication system 10. Here, an example in which the WFD IE is exchanged via an access point will be described. For example, the source device 100 transmits a probe request to the second sink device 300 via an access point and searches for a P2P connectable device.

For example, when the second sink device 300 is a P2P connectable device, it is possible to detect a frequency channel used for P2P connection by receiving a probe response via the access point. Here, description will be given on the premise that the probe response can be received on the assumption that the second sink device 300 is a P2P connectable device.

According to the aforementioned process, the source device 100 recognizes a frequency channel for P2P connection to the second sink device 300 and establishes P2P connection.

After establishment of P2P connection, the source device 100 establishes a link of TCT connection or RTSP connection to the second sink device and then exchanges at least one of the aforementioned (a) to (d) with the second sink device 300.

For example, a method of encapsulating a WFD IE in payload parts of the probe request and the probe response and exchanging the same will be described.

A format example using the WFD ID of the aforementioned (b) is shown in FIGS. 9 to 13. FIGS. 9 to 11 show a format previously allocated in Miracast Release 1. Here, new bits are allocated to subelement ID (11) shown in FIG. 11. Specifically, a new field corresponding to subelement ID (11) is shown in FIGS. 12 and 13.

In FIG. 13, "5:0" of a new device information field is information used for the second sink device to determine an optimal frequency channel in P2P connection.

In a sequence process using one of the aforementioned (a) to (c), the source device 100 may determine an optimal frequency channel in P2P connection to the second sink device 300 by recognizing each piece of information. For example, in the case of accessing the second sink device 300 using a TDLS scheme, associated frequency information (a field of "23:14" shown in FIG. 13) between an access point and the second sink device 300 may be used. Further, concurrent information (a field of "5:2" shown in FIG. 13) of a wireless line of the second sink device 300 may be used, for example. For example, this concurrent information is information representing whether connection forms such as time division access of the same frequency channel, time division access of a different frequency channel, simultaneous access of the same frequency channel and simultaneous access of a different frequency channel are possible (the field of "5:2" shown in FIG. 13). Further, terminal capability (a field of "13:8" shown in FIG. 13) as a wireless function may be used, for example.

Here, a concurrent function will be described. The concurrent function refers to a function by which, for example, a source device can construct a concurrent session in one or more sink devices. In addition, the concurrent function refers to a function by which, for example, a sink device can construct a concurrent session in one or more source devices.

Furthermore, the concurrent function refers to a function by which, for example, all P2P devices can construct concurrent sessions with two or more source devices in a Wi-Fi infra mode on an IP network when connected to the same IP subnet in the Wi-Fi infra mode. Moreover, the concurrent function refers to a function by which, for example, all P2P devices can construct concurrent sessions with two or more sink devices in the Wi-Fi infra mode on an IP network when connected to the same IP subnet in the Wi-Fi infra mode.

Further, the concurrent function refers to a function by which, for example, a sink device can construct a concurrent session in P2P connection with two or more source devices on the same channel. In addition, the concurrent function refers to a function by which, for example, a source device can construct a concurrent session in P2P connection with two or more sink devices on the same channel.

Furthermore, the concurrent function refers to a function by which, for example, a sink device notifies information such as a maximum number of connections of supported sink devices and a remaining number of concurrent session connections that can be performed. In addition, the concurrent function refers to a function by which, for example, a source device notifies information such as a maximum number of connections of supported source devices and a remaining number of concurrent session connections that can be performed.

Further, the concurrent function is defined to be able to notify the number of sink devices of a concurrent session which can be simultaneously used. In addition, the concurrent function is defined to be able to notify the number of source devices of a concurrent session which can be simultaneously used, for example.

Furthermore, there is a case where an access point and the second sink device 300 are connected by wire or a connector, such as an Ethernet (registered trademark) cable, a universal serial bus (USB) cable and a connector. In this case, the second sink device 300 notifies the source device 100 of the fact that connection to the access point is wired connection ("1:0" shown in FIG. 13) and whether the second sink device 300 includes a radio channel for P2P connection. Accordingly, the source device 100 can determine an optimal frequency channel. For example, when the second sink device 300 corresponds to only a wired line, the second sink device 300 is connected to the access point without switching to P2P connection. On the other hand, when the second sink device 300 corresponds to a wireless line, it is possible to select one of supported frequency channels and connect the second sink device 300 through the selected frequency channel.

Although an example of encapsulating a WFD IE in the payload parts of the probe request and the probe response has been described, the present technology is not limited thereto.

For example, when a display service of Wi-Fi direct services is used, service capability information may be exchanged between devices through an ASP based message. Specifically, a text string in hexadecimal obtained by dividing information included in a WFD IE into 4 bits is transmitted and received. Further, the information included in the WFD IE is not limited to the current specifications. For example, service capability information shown in FIG. 14 may be included in a payload.

Furthermore, although FIG. 8 illustrates an example in which the source device 100 determines whether to disconnect from the second sink device 300 connected once on the basis of four determination criteria (steps S812, S815, S818 and S821 shown in FIG. 8), the present technology is not limited thereto. For example, if the source device 100 can determine whether to perform connection to the second sink device 300 at the initial determination time, the source device 100 may not perform unnecessary connection. Accordingly, this example is illustrated in FIG. 15.

[Operation Example for Source Device]

Figure 15:
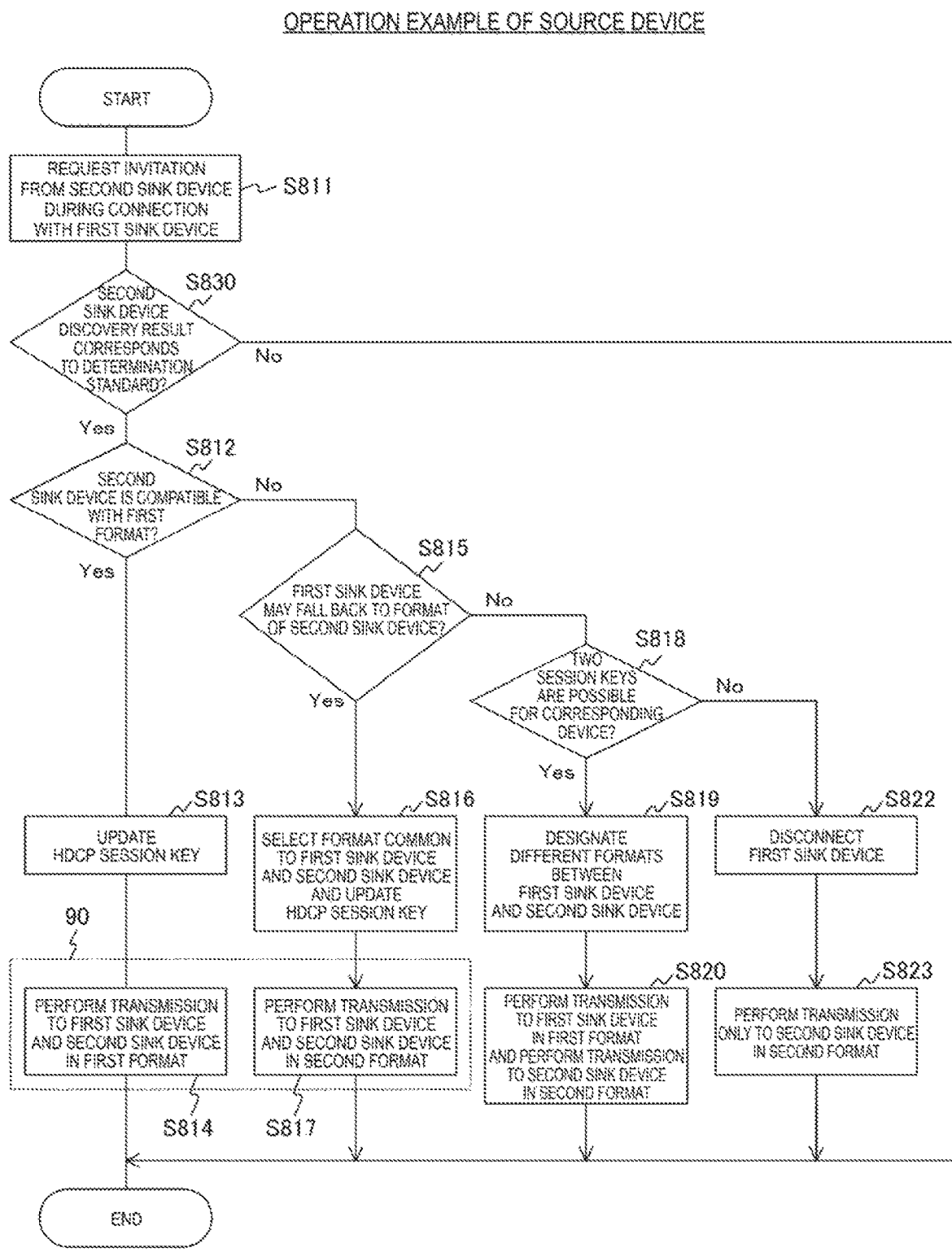
FIG. 15 is a flowchart illustrating an example of a processing procedure of a multi-sink connection process of the source device 100 according to the first embodiment of the present technology.

FIG. 15 is a flowchart illustrating an example of a processing procedure of a multi-sink connection process by the source device 100 according to the first embodiment of the present technology. Meanwhile, FIG. 15 is a modification example of FIG. 8, and thus symbols the same as those in FIG. 8 are used to denote processing procedures the same as those in FIG. 8 and description thereof is partly omitted.

The control unit 140 of the source device 100 transmits an invitation request packet to the second sink device 300 (step S811). Then, the control unit 140 determines whether the four determination criteria (steps S812, S815, S818 and S821 shown in FIG. 8) are satisfied through information notification before connection to the second sink device 300 (step S830).

When any of the four determination criteria (step S830) is satisfied, the procedure proceeds to step S812. On the other hand, when any of the four determination criteria (step S830) is not satisfied, the operation of the multi-sink connection process is terminated.

In this manner, it is possible to perform the process (step S830) of determining whether the four determination criteria are satisfied according to information notification before connection to the second sink device in advance, to thereby prevent execution of an unnecessary connection process and disconnection process such as exchanging information after connection to the source device 100 once and disconnection as a result because there is no corresponding process.

Here, a method of exchanging a beacon or a probe request message including information such as a P2P IE and a WFD IE, for example, may be used as a method by which the source device 100 recognizes a capability of the second sink device 300 before connection.

In this way, the control unit 140 of the source device 100 can determine whether media transmission to the second sink device 300 can be performed on the basis of exchanged information. In addition, the control unit 140 of the source device 100 does not perform a process of connecting to the second sink device 300 when it is determined that media transmission to the second sink device 300 cannot be performed. Accordingly, the second sink device 300 can determine whether connection is possible before connection without performing an unnecessary connection process and disconnection process. Furthermore, determination based on the aforementioned four determination criteria (steps S812, S815, S818 and S821 shown in FIG. 8) and exchange of information with regard thereto may be performed at a new sink device entry timing. Moreover, determination based on the aforementioned four determination criteria (steps S812, S815, S818 and S821 shown in FIG. 8) and exchange of information with regard thereto may be performed through a checking operation using any message in messaging illustrated in FIG. 5. For example, exchange of the information about the determination may be performed in advance using messages shown in the dotted-line rectangle 400 of FIG. 5.

Figure 16A:
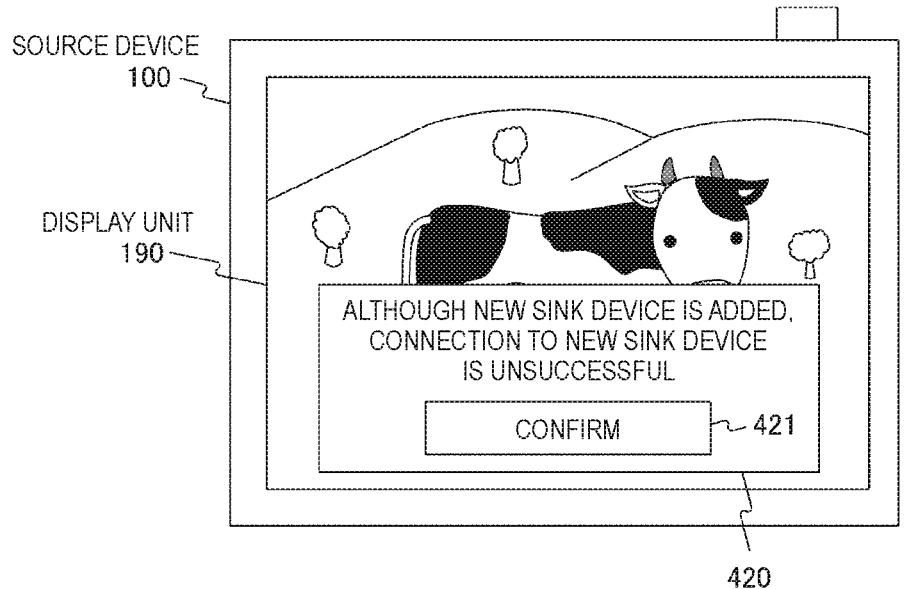
FIGS. 16a and 16b are diagrams illustrating an example of notification screens displayed on the source device 100 and a second sink device 300 according to the first embodiment of the present technology.
Figure 16B:
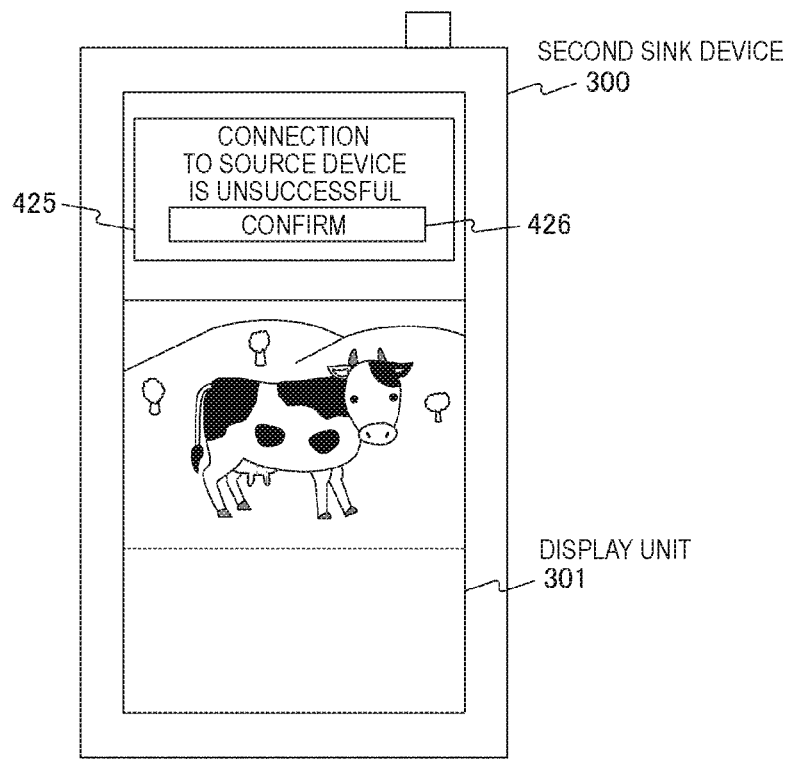
Figure 17A:
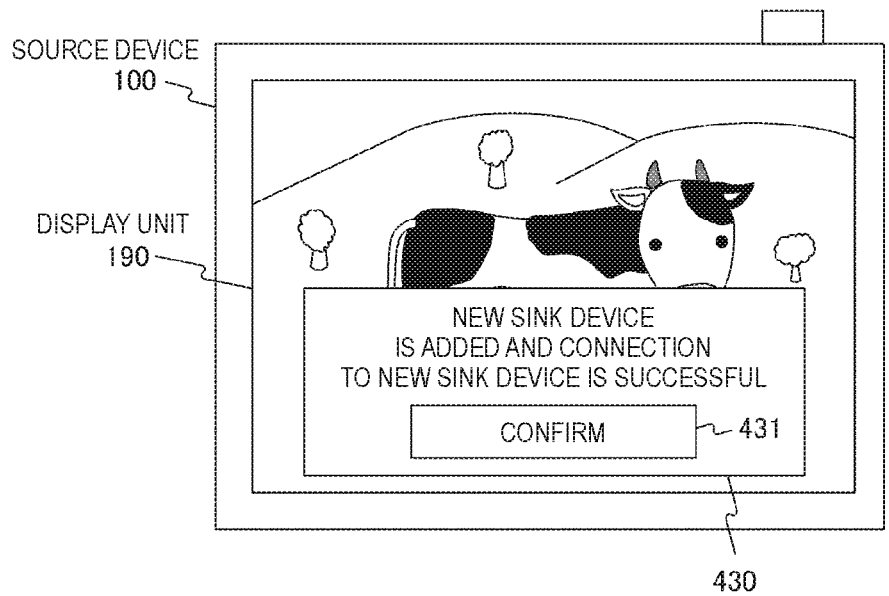
FIGS. 17a and 17b are diagrams illustrating an example of notification screens displayed on the source device 100 and a second sink device 300 according to the first embodiment of the present technology.
Figure 17B:
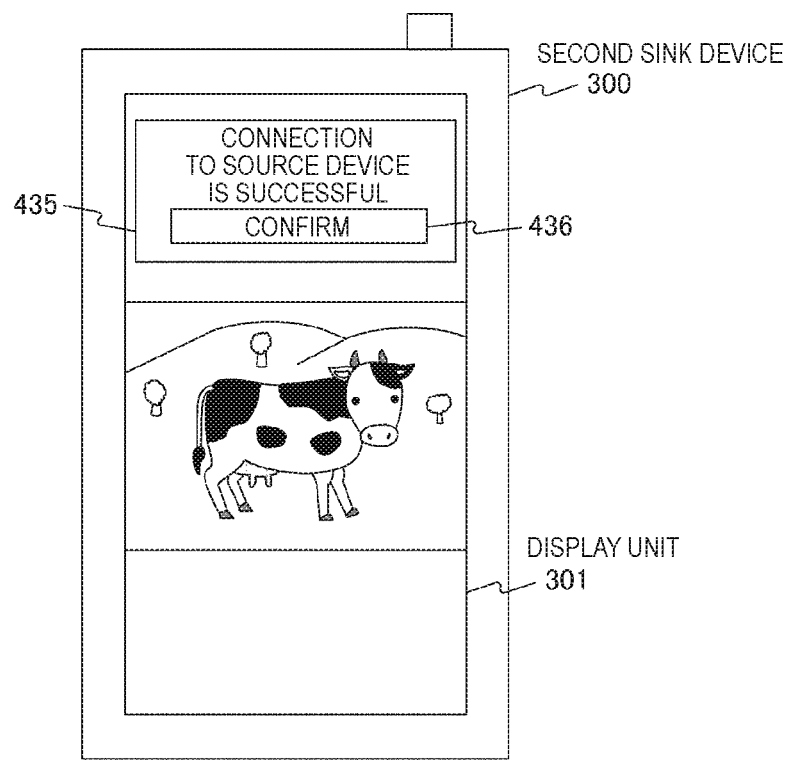

Here, it may be assumed that the second sink device 300 cannot be connected to the source device 100 as described above. In this case, it is desirable that the source device 100 or the second sink device 300 notify the user of the fact that connection to the counterpart device cannot be achieved through a notification means such as a pop-up screen. An example of such notification is shown in FIGS. 16*a* and 16*b*. Further, even when the second sink device 300 can be connected to the source device 100, it may be possible to notify the user of the fact using a notification means such as a pop-up screen. An example of such notification is shown in FIGS. 17*a* and 17*b*.

[Example of notifying user of fact that connection to counterpart device is impossible]

FIGS. 16*a* and 16*b* are diagrams illustrating an example of notification screens displayed on the source device 100 and the second sink device 300 according to the first embodiment of the present technology.

FIG. 16*a* shows a notification screen 420 displayed on the display unit 190 of the source device 100. In addition, FIG. 16*b* shows a notification screen 425 displayed on a display unit 301 of the second sink device 300. These notification screens 420 and 425 may be displayed as pop-up screens, for example. Furthermore, a user may delete the notification screens 420 and 425 by pressing confirmation buttons 421 and 426 after confirmation of the notification screens 420 and 425. Further, a manipulation screen for re-connection may be displayed or a screen indicating the cause of connection failure may be displayed after the confirmation buttons 421 and 426 are pressed.

In this manner, when it is determined that media transmission cannot be performed to the second sink device 300, the control unit 140 of the source device 100 can provide notification information (e.g., the notification screens 420 and 425) to the user to notify the user of the fact. Further, the notification information may be transmitted through, for example, one of the following methods (N1) to (N3) or an appropriate optimal method may be selected as a method for transmitting the notification information.

(N1) Transmission method of encoding a result obtained by superposing notification information (e.g., the notification screens 420 and 425) on a source image (e.g., an image transmitted from a source device to a sink device in accordance with Wi-Fi CERTIFIED Miracast specification) and transmitting the encoded result (N2) Transmission method of separately encoding a source image and notification information (e.g., the source image may be transmitted as a moving image and the notification information may be transmitted as a still image) and transmitting the ended result.

(N3) Transmission method of transmitting a source image and notification information as control data (e.g., transmission can be performed using HyperText Transfer Protocol (HTTP), Extensible Markup Language (XML) or Web Socket.)

[Example of notifying user of successful connection to counterpart device]

FIGS. 17*a* and 17*b* are diagrams illustrating an example of notification screens displayed on the source device 100 and the second sink device 300 according to the first embodiment of the present technology.

FIG. 17*a* shows a notification screen 430 displayed on the display unit 190 of the source device 100. In addition, FIG. 17*b* shows a notification screen 435 displayed on a display unit 301 of the second sink device 300. These notification screens 430 and 435 may be displayed as pop-up screens, for example. Furthermore, a user may delete the notification screens 430 and 435 by pressing confirmation buttons 431 and 436 after confirmation of the notification screens 430 and 435.

In this manner, the control unit 140 of the source device 100 can provide, to the user, notification information (e.g., the notification screens shown in FIGS. 16*a*, 16*b*, 17*a*, and 17*b*) regarding a connection process for newly performing media transmission to the second sink device in the capability checking process. Accordingly, it is possible to notify the user of topology change.

In addition, the control unit 140 of the source device 100 may manage pop-ups (e.g., notification screens shown in FIGS. 16*a*, 16*b*, 17*a*, and 17*b*) separately from an image or audio transmitted to the first sink device 200. In this case, the control unit 140 of the source device 100 may transmit information for displaying a pop-up to the first sink device 200 or may not transmit the information on the basis of user settings or a predetermined rule.

In this manner, the control unit 140 of the source device 100 may differently manage image information (e.g., images of a cow shown in FIGS. 16*a*, 16*b*, 17*a* and 17*b*) corresponding to a target for media transmission and notification information (e.g., the notification screens shown in FIGS. 16*a*, 16*b*, 17*a*, and 17*b*) in the capability checking process. Accordingly, it is possible to prevent display of a pop-up that is not related to the first sink device 200 during connection and to provide normal services even in medical equipment and onboard equipment which require a real-time property.

Furthermore, the present technology is not limited thereto. For example, although FIGS. 7, 8 and 15 illustrate examples in which the source device 100 transmits the invitation request packet to the second sink device 300, the present technology is not limited thereto. For example, connection may be requested by transmitting a provision request packet from the second sink device 300 to the source device 100.

Furthermore, although examples in which there are two sink devices have been described in the first embodiment of the present technology, the number of devices is not limited. Moreover, it may be possible to output a message indicating notification as a sound instead of or along with display of notification screens (e.g., the notification screens shown in FIGS. 16*a*, 16*b*, 17*a*, and 17*b*) as notification to a user. Further, notification to a user may be performed using notification through vibration or other notification means.

2. Second Embodiment

The second embodiment of the present technology describes an example of setting or changing a higher layer considering a wireless communication scheme. Specifically, parameters such as an image and audio may be flexibly set according to data link layer (second layer, layer 2) processing such as multicast or unicast. Accordingly, it is possible to improve transmission efficiency according to a used frequency channel, band and transmission method (multicast or unicast).

The configuration of an information processing device according to the second embodiment of the present technology is almost the same as the source device 100, the first sink device 200 and the second sink device 300 illustrated in FIG. 1 and the like. Accordingly, symbols the same as those in the first embodiment of the present technology are used to denote parts the same as those in the second embodiment of the present technology and description thereof is partly omitted.

[Example of Acquisition of Wireless Communication Scheme]

Here, description will be given with reference to FIG. 7. For example, the source device 100 recognizes a protocol of a lower layer connected to the first sink device 200 and the second sink device 300 in the example illustrated in FIG. 7. For example, the protocol of the lower layer may be acquired through exchange of at least one piece of information of the aforementioned information (a) to (d). According to this process, the source device 100 may recognize a wireless communication scheme for transmission in accordance with a multi-sink topology.

[Data transmission example when infra (infrastructure) mode is set]

Figure 18A:
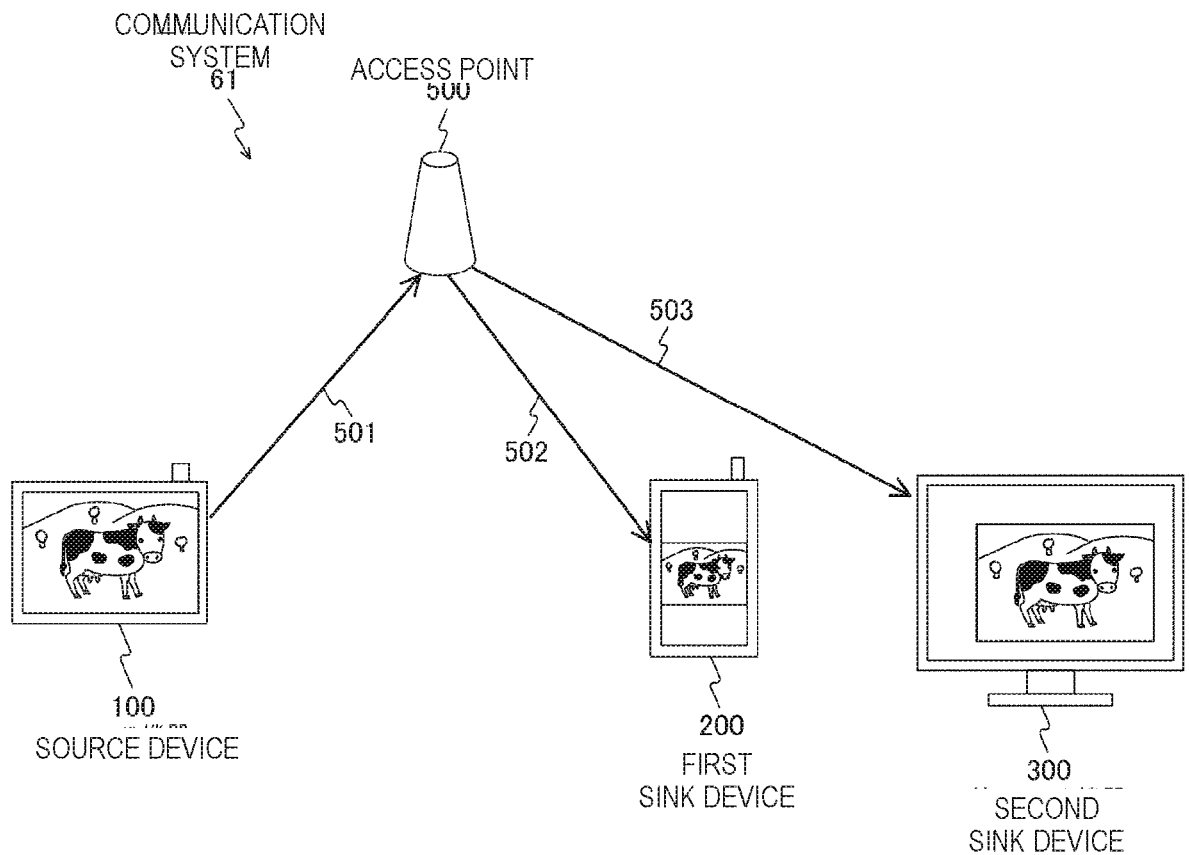
FIGS. 18a and 18b are diagrams schematically illustrating a relationship between information exchanged between devices constituting a communication system 61 and a wireless communication scheme according to a second embodiment of the present technology.
Figure 18B:
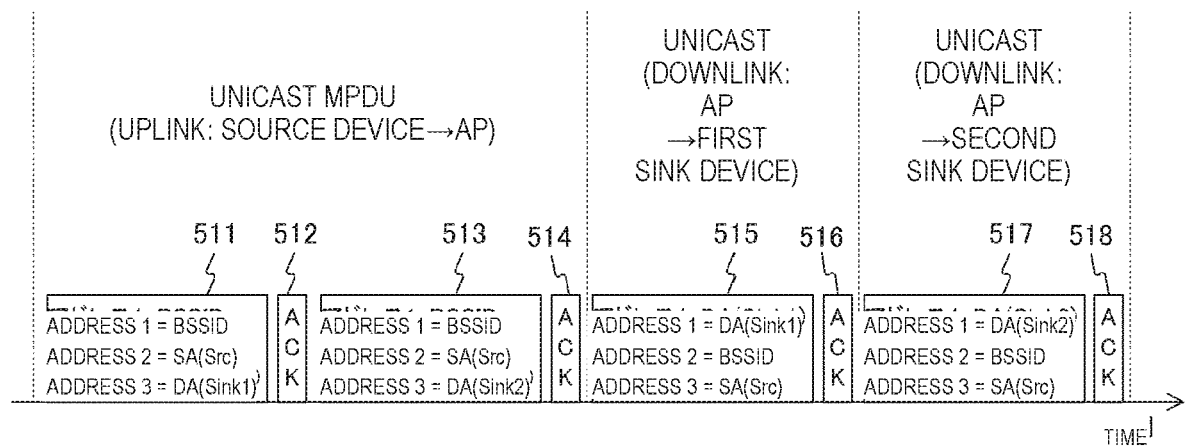

FIGS. 18a and 18b are schematic diagrams illustrating a relationship between information exchanged between devices constituting a communication system 61 and a wireless communication scheme according to the second embodiment of the present technology.

An access point 500 is an access point of a wireless LAN (e.g., Wi-Fi). For example, the access point 500 has a function of the infra mode of the IEEE 802.11 standard. In addition, the access point 500 is connected to one or more information processing devices (e.g., a source device and a sink device).

Furthermore, the access point 500 may be connected to other information processing devices (e.g., a server) via a wired line (e.g., Ethernet (registered trademark)). For example, the access point 500 may be connected to other information processing devices via a network.

The second embodiment of the present technology illustrates an example in which the access point 500 is connected to the source device 100, the first sink device 200 and the second sink device 300 using a wireless LAN (e.g., a wireless LAN corresponding to IEEE 802.11a/b/g/n/ac/ad).

FIG. 18a illustrates a configuration example of the communication system 61 in which the source device 100 is connected to the sink devices (the first sink device 200 and the second sink device 300) via the access point 500. That is, an example of a case where the infra mode is set in each device is shown.

FIG. 18b schematically illustrates packets 511 to 518 exchanged between the source device 100 and sink devices (the first sink device 200 and the second sink device 300) via the access point 500 in chronological order.

In the example illustrated in FIG. 18a, data destined for the first sink device 200 and the second sink device 300 is exchanged through data transmission 501 between the source device 100 and the access point 500. Specifically, the packets 511 and 513 and ACK 512 and 514 shown in FIG. 18b are exchanged between the source device 100 and the access point 500.

Meanwhile, contents of the configuration of a MAC header using the packet format of IEEE 802.11 are represented in rectangles indicating the packets 511 and 513. Specifically, contents of addresses 1 to 3 in the MAC header are schematically represented in rectangles indicating the packets 511 and 513. Further, the source device 100 is represented as Src, the first sink device 200 is represented as Sink1 and the second sink device 300 is represented as Sink2 in the packets 511 and 513. Further, the same applies to packets 515, 517, 523 and 525 described hereinafter.

Specifically, the packet 511 transmitted from the source device 100 to the access point 500 is a packet destined for the first sink device 200 from the source device 100. In addition, the packet 513 transmitted from the source device 100 to the access point 500 is a packet destined for the second sink device 300 from the source device 100. These packets 511 and 513 are aggregated and transmitted as one packet, for example.

When the access point 500 receives the packet 511, the access point 500 checks whether the packet has no error and then transmits the block ACK 512 to the source device 100.

Subsequently, the access point 500 checks the address of the packet 511 and transmits the packet 511 to the first sink device 200. The first sink device 200 checks whether the received packet 515 has no error and then transmits a block ACK (or single ACK) 516 to the access point 500.

In addition, the access point 500 performs exchange of the packets 517 and 518 for the second sink device 300 in the same manner.

Further, the packets 511 and 513 and ACK 512 and 514 shown in FIG. 18b are exchanged between the access point 500 and the sink devices (the first sink device 200 and the second sink device 300) in the example illustrated in FIG. 18a.

For example, when the source device 100 transmits different pieces of media data (image data or audio data) to the first sink device 200 and the second sink device 300, there is no unnecessary process. However, when the source device 100 transmits the same media data to the first sink device 200 and the second sink device 300, the same media data is transmitted twice despite radio propagation characteristics of the source device 100 and the access point 500 being the same.

In this case, performing data transmission (501) between the source device 100 and the access point 500 as a one-time transmission of data as relay data and converting the same into multicast in the access point 500 may be conceived. For example, transmission of data from the access point 500 to the first sink device 200 through multicast and transmission of data from the access point 500 to the second sink device 300 through multicast may be conceived. In addition, it is considered to copy data in the access point 500, transmit data from the access point 500 to the first sink device 200 through unicast and transmit data from the access point 500 to the second sink device 300, for example. It is possible to effectively use radio bands by performing data transmission in this way.

[Data transmission example when P2P mode is set]

Figure 19A:
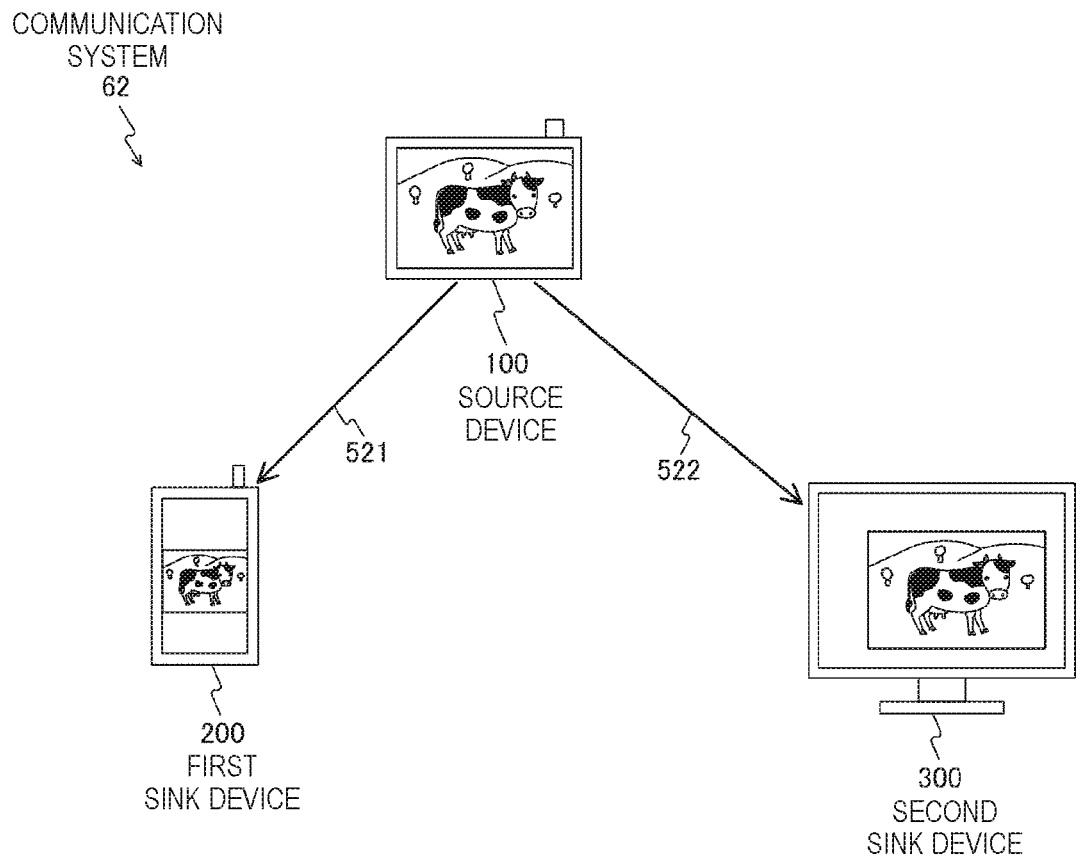
FIGS. 19a and 19b are diagrams schematically illustrating a relationship between information exchanged between devices constituting a communication system 62 and a wireless communication scheme according to a second embodiment of the present technology.
Figure 19B:
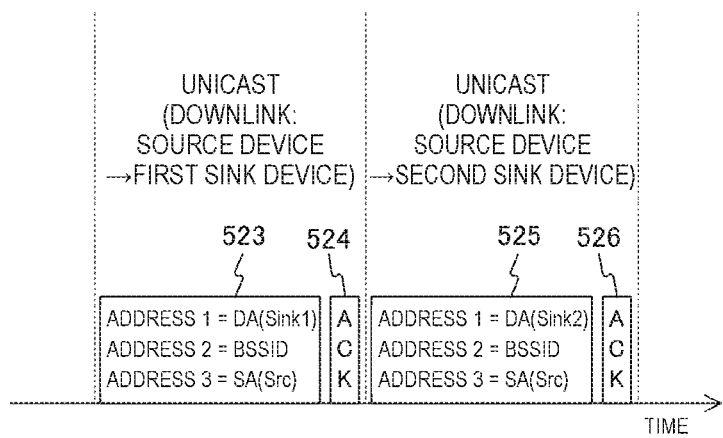

FIGS. 19a and 19b are schematic diagrams illustrating a relationship between information exchanged between devices constituting a communication system 62 and a wireless communication scheme according to the second embodiment of the present technology. FIGS. 19a and 19b shows an example using a wireless communication scheme of Wi-Fi P2P in which communication is performed between a source device and sink devices without passing through an access point.

FIG. 19a shows a configuration example of the communication system 62 in which the source device 100 and sink devices (the first sink device 200 and the second sink device 300) are directly P2P connected. That is, an example of a case where the P2P mode is set in each device is illustrated.

FIG. 19b schematically illustrates packets 523 to 526 exchanged between the source device 100 and sink devices (the first sink device 200 and the second sink device 300) in chronological order.

In the example illustrated in FIG. 19a, data for the first sink device 200 and the second sink device 300 is exchanged through data transmission (521) between the source device 100 and the access point 500. Specifically, the packets 523 and 525 and ACK 524 and 526 shown in FIG. 19b are exchanged between the source device 100 and the access point 500.

In the example of FIG. 19a, the packet 523 transmitted from the source device 100 to the first sink device 200 is a unicast packet. In addition, the source device 100 transmits the block ACK packet (or ACK packet) 524 for the unicast packet 523 to the source device 100.

Furthermore, the source device 100 exchanges the packets 525 and 526 with the second sink device 300 in the same manner.

[Data Transmission Example When TDLS Mode is Set]

Figure 20:
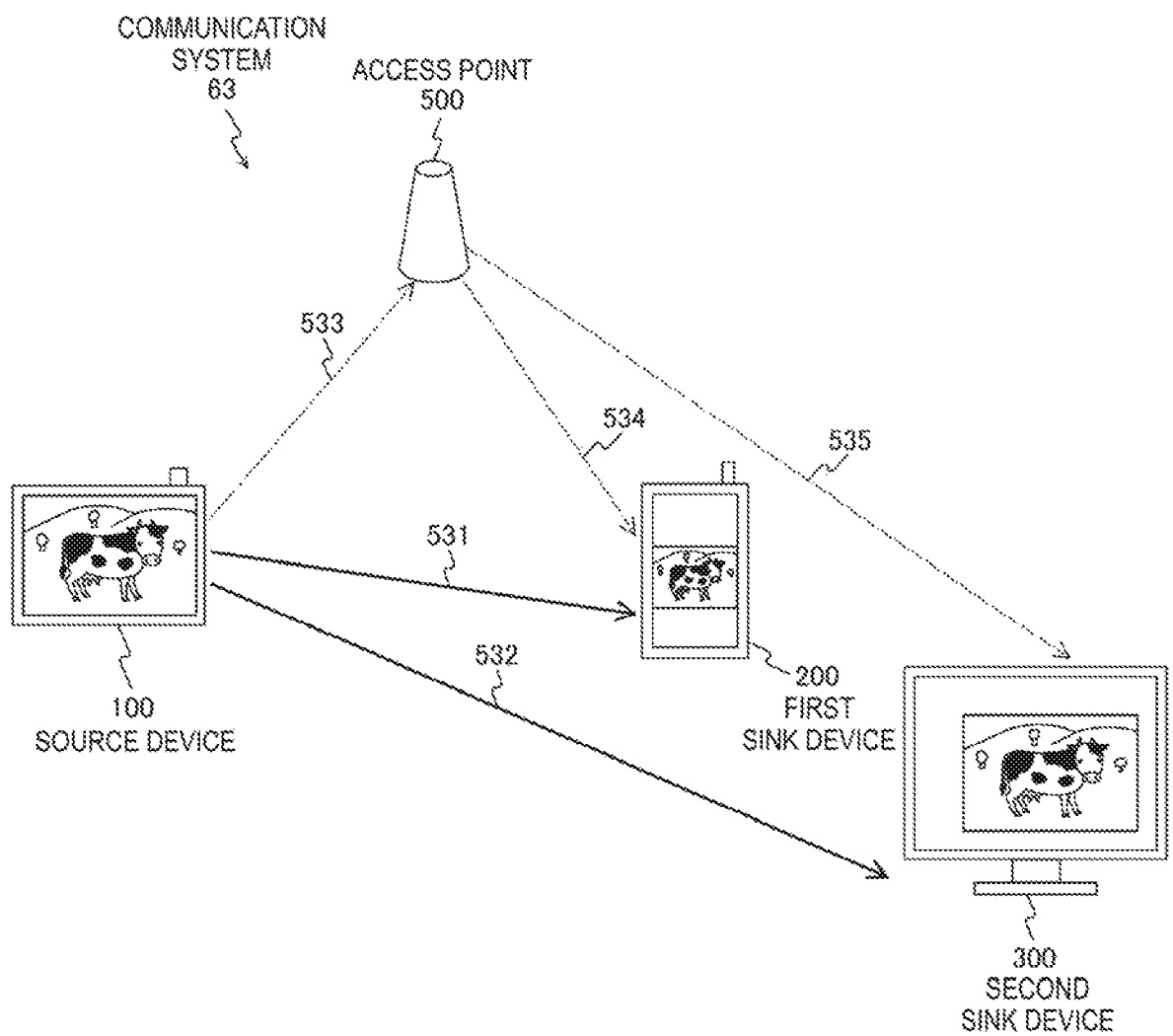
FIG. 20 is a diagram schematically illustrating a relationship between information exchanged between devices constituting a communication system 63 and a wireless communication scheme according to a second embodiment of the present technology.

FIG. 20 is a schematic diagram illustrating a relationship between information exchanged between devices constituting a communication system 63 and a wireless communication scheme according to the second embodiment of the present technology.

FIG. 20 shows an example of a case where all of the source device 100, the first sink device 200, the second sink device 300 and the access point 500 correspond to TDLS. Accordingly, image data or audio data can be directly transmitted and received without passing through the access point 500 and control data such as setting information of the devices can be transmitted and received via the access point 500 in the example illustrated in FIG. 20. That is, an example of a case where the TDLS mode is set in each device is illustrated.

As illustrated in FIGS. 18a, 18b, 19a, 19b and 20, wireless packet amounts are different for different wireless communication schemes. For example, the wireless communication scheme illustrated in FIGS. 18a and 18b has a lower wireless transmission efficiency than that of the wireless communication scheme illustrated in FIGS. 19a and 19b when the same data is transmitted.

Accordingly, when all devices correspond to TDLS as in the example illustrated in FIG. 20, for example, setting is changed such that image data or audio data can be directly transmitted and received without passing through the access point 500. In this case, however, only control data such as terminal setting information of the devices may be transmitted and received via the access point 500.

In this way, wireless band utilization efficiency with respect to media transmission in the example illustrated in FIG. 20 becomes equivalent to that in the example illustrated in FIGS. 19a and 19b and direct transmission can be performed between a source device and a sink device.

In this manner, it is possible to set or change the number of paths of image data or audio data in accordance with a wireless communication scheme and transmitted and received data (e.g., the packets 511 to 518 and 523 to 526 shown in FIGS. 18a, 18b, 19a and 19b). That is, it is possible to set or change the number of paths of image data or audio data depending on each environment.

Figure 21:
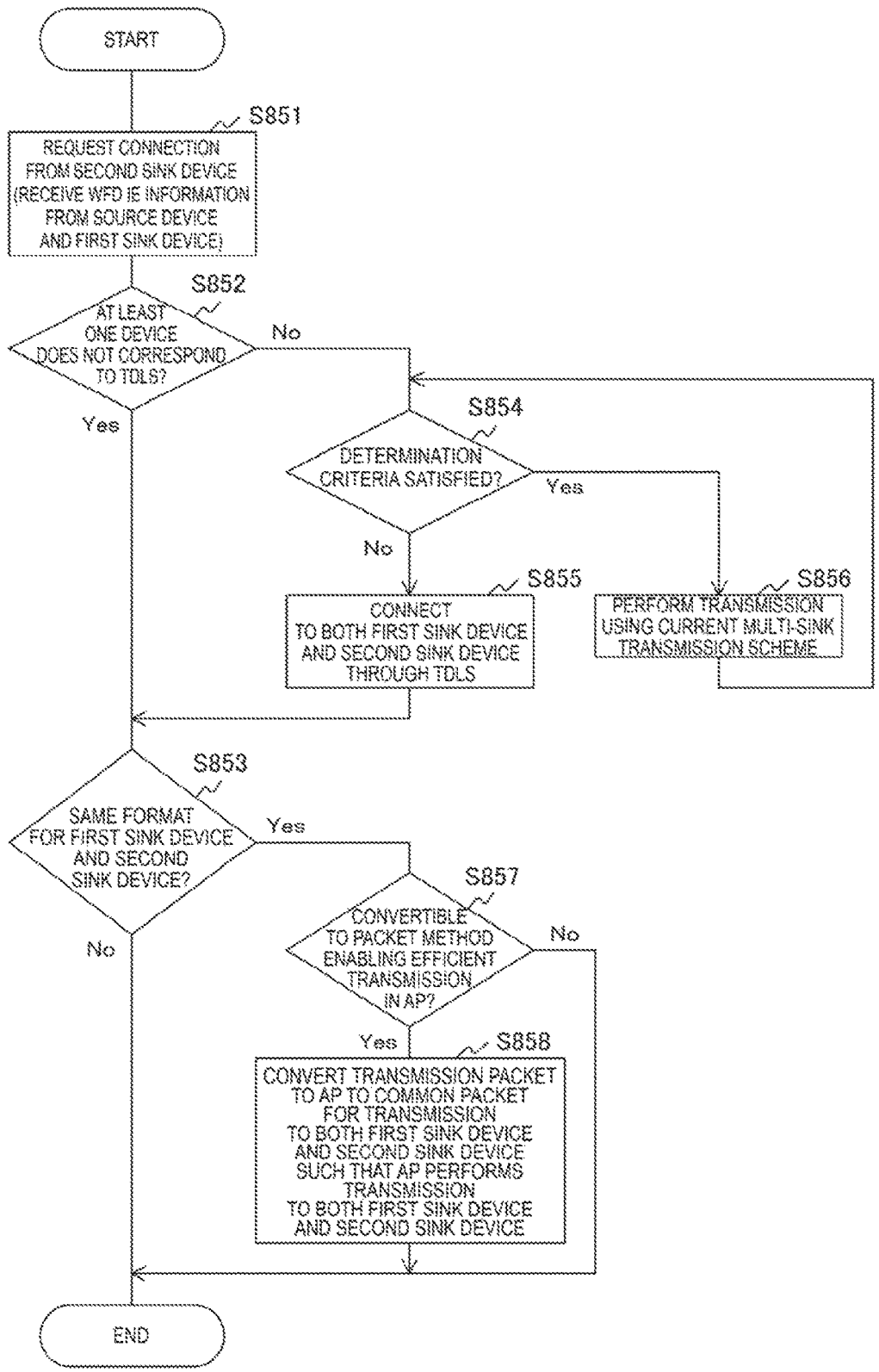
FIG. 21 is a flowchart illustrating an example of a processing procedure of a wireless communication scheme switching process of the source device 100 according to the second embodiment of the present technology.

Hence, an example of switching wireless communication schemes is illustrated in FIG. 21. FIG. 21 illustrates an example of using WFD IE information.

[Operation Example for Source Device]

FIG. 21 is a flowchart illustrating an example of a processing procedure of a wireless communication scheme switching process by the source device 100 according to the second embodiment of the present technology.

First, the control unit 140 of the source device 100 requests connection from the second sink device 300 (step S851). In this case, the control unit 140 receives WFD IE information from the first sink device 200 being connected.

Although FIG. 21 illustrates an example in which the source device 100 requests connection from the second sink device 300, the second sink device 300 may request connection from the source device 100. In this case, the second sink device 300 may request connection from the source device 100 via an access point using the infra mode. In addition, the second sink device 300 may directly request connection from the source device 100. Further, in the second embodiment of the present technology, an environment in which the source device 100 is connected to the first sink device 200 via the access point 500 using the infra mode is described as an example.

The control unit 140 determines whether all devices constituting a group to which the source device 100 belongs do not correspond to TDLS (step S852). When at least one of the devices does not correspond to TDLS (step S852), the control unit 140 determines whether to perform transmission to the first sink device 200 and the second sink device 300 in the same format (step S853).

When different media are transmitted to the first sink device 200 and the second sink device 300 according to addresses (for example, when at least one of image data and audio data is different according to addresses) or when at least one of image data and audio data is transmitted in a different format (step S853), the operation of the wireless communication scheme switching process is terminated.

When the same media are transmitted to the first sink device 200 and the second sink device 300 irrespective of addresses (e.g., when image data and audio data are identical irrespective of addresses) and when image data and audio data are transmitted in the same format (step S853), the control unit 140 determines whether the access point 500 can be switched to a packet transmission scheme capable of achieving efficient transmission (step S857).

For example, it is assumed that the source device 100 transmits the same data (image data or audio data) to the first sink device 200 and the second sink device 300 in the example illustrated in FIG. 18a. In this case, the source device 100 may handle the packet 511 shown in FIG. 18b as a single protocol data unit (PDU) as a shared packet of two sink devices as in a multicast operation instead of a packet having two PDUs aggregated for sink devices. In addition, the source device 100 transmits the shared packet to the access point 500. Further, the access point 500 copies the shared packet and transmits the same to the first sink device 200 and the second sink device 300.

When this packet transmission scheme is used, the access point 500 transmits a multicast packet to the first sink device 200 and the second sink device 300, and thus wireless band utilization efficiency can be further improved.

Accordingly, the control unit 140 can determine whether the access point 500 can use the packet transmission scheme (step S857), for example.

When the access point 500 can be switched to the packet transmission scheme capable of achieving efficient transmission (step S857), the control unit 140 converts a packet transmitted to the access point 500 to a common packet for transmission to each sink device (step S858). That is, the control unit 140 converts the packet transmitted to the access point 500 to a common packet for transmission to the first sink device 200 and the second sink device 300 (step S858). The common transmission packet is transmitted from the access point 500 to the first sink device 200 and the second sink device 300. In this case, the access point 500 may transmit the transmission packet through multicast or multiple-unicast.

When all devices correspond to TDLS (step S852), the control unit 140 determines whether determination criteria are satisfied (step S854). For example, the control unit 140 may use whether a delay time with respect to transmission satisfies Wi-Fi CERTIFIED Miracast standards as a determination criterion.

Although an example in which whether a delay time with respect to transmission satisfies Wi-Fi CERTIFIED Miracast standards is used as a determination criterion has been described here, the present technology is not limited thereto.

For example, the control unit 140 may use whether media transmission stability can be improved by switching the infra mode to the TDLS mode or the P2P mode as a determination criterion.

Further, other pieces of information, for example, may be used as determination criteria. For example, transmission quality, service quality and device quality may be used as determination criteria.

The transmission quality may be, for example, a transmission band, a transmission error frequency, a stability, a delay time, a throughput, a transmission situation (e.g., RSSI value), frame omission, a signal-to-interference ratio (SIR), a signal-to-interference noise ratio (SINR) and a received signal strength indicator (RSSI).

The device quality is, for example, the resolution and the audio quality, the kinds of image and audio codecs, presence of absence of a 3 D function, presence or absence of the content protection, the display size of a display device, topology information, a usable protocol, setting information (port information or the like) of the protocol, connection interface information (the type of connector or the like), horizontal synchronization and vertical synchronization positions, performance priority request information of a source device, a mode control table response to whether to correspond to the low power consumption mode, a maximum transmission throughput or a receivable maximum throughput of wireless transmission, central processing unit (CPU) power, a battery remaining quantity, and power supply information.

In this way, it is possible to use at least one of the aforementioned pieces of information as determination criteria for being capable of improving media transmission stability by switching the infra mode to the TDLS mode or the P2P mode.

For example, when the determination criteria are not satisfied (when media transmission stability cannot be improved) (step S854), the control unit 140 switches to TDLS connection to a device corresponding to TDLS and performs media transmission through TDLS connection (step S855).

Further, when the determination criteria are satisfied (when media transmission stability can be improved) (step S854), the control unit 140 continuously performs a transmission process using the current multi-sink transmission scheme (step S856).

Meanwhile, it will be assumed that the likelihood of improvement of media transmission stability decreases in response to increase in the number of sink devices connected to the source device. Accordingly, it will be assumed that the likelihood of proceeding to step S855 increases in response to increase in the number of sink devices connected to the source device.

In this way, the control unit 140 of the source device can acquire a wireless communication scheme used for image transmission to the first sink device 200 and decide a communication path and a data transmission format on the basis of the wireless communication scheme and the aforementioned exchanged information.

For example, a case where the first sink device 200 uses a wireless communication scheme of the infra mode may be assumed. In this case, the control unit 140 of the source device 100 may set a wireless communication scheme in the TDLS mode or the P2P mode as a wireless communication scheme of the first sink device 200 and the second sink device 300.

Although an example of switching the infra mode to the TDLS mode has been described in FIG. 21, the present technology is not limited thereto. For example, when one of a mode before switching and a mode after switching is selected among the infra mode, TDLS mode and P2P mode, the selected mode is assumed to be able to correspond to the aforementioned example.

In this way, when a new sink device is connected to form a multi-sink topology, whether the connection is infrastructure connection, or TDLS connection or direct connection is recognized. Accordingly, the source device 100 can appropriately select or change packet transmission depending on the topology.

Here, the source device 100 may recognize the protocol of the lower layer connected to the first sink device 200 and the second sink device 300 as described above. For example, it is possible to recognize the protocol of the lower layer through a notification method according to exchange of at least one of protocols in P2P IE, ASP (e.g., a new format in an ASP format command) and UPnP standards in addition to a WFD IE.

According to these processes, the source device 100 can recognize a wireless communication scheme for transmission according to the multi-sink topology. Although an example of encapsulating a WFD IE in the payload parts of the probe request and the probe response and the like in this manner has been described in the second embodiment of the present technology, the present technology is not limited thereto.

When the display service of Wi-Fi direct services is used, for example, service capability information may be exchanged between devices through a module called ASP.

Specifically, a text string in hexadecimal obtained by dividing information included in a WFD IE into 4 bits is transmitted and received. Further, the information included in the WFD IE is not limited to the current specifications. For example, service capability information shown in FIG. 14 may be included in a payload.

Further, a device connected in the Wi-Fi infrastructure mode, for example, may discover only a device connected to the same IP subnet (e.g., a device having the Wi-Fi CERTIFIED Miracast specifications). In addition, a device connected in the Wi-Fi infrastructure mode may regard, for example, a device having a concurrent function as a device that performs concurrent processing of the same channel in P2P.

[Example of notifying user of new sink device]

Figure 22A:
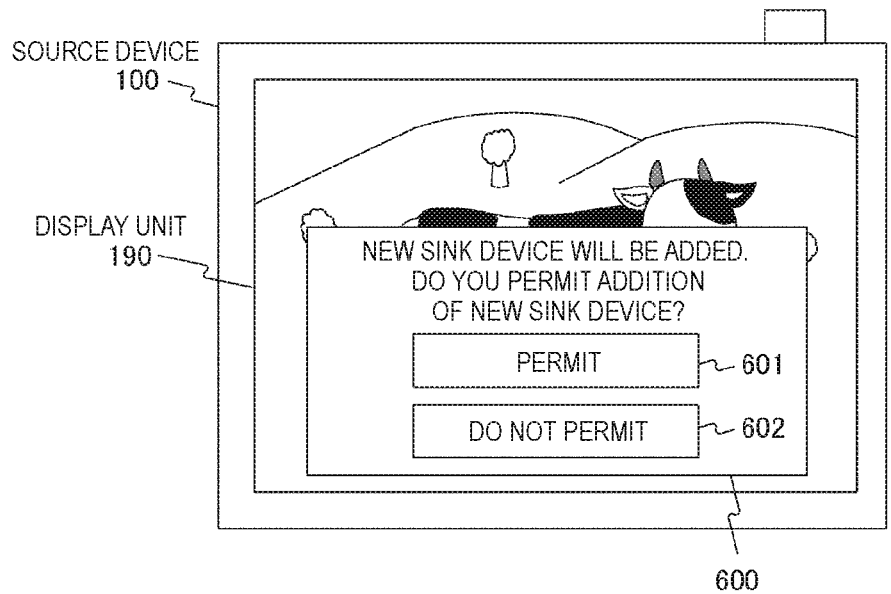
FIGS. 22a and 22b are diagrams illustrating an example of notification screens displayed on the source device 100 and the first sink device 200 according to the second embodiment of the present technology.
Figure 22B:
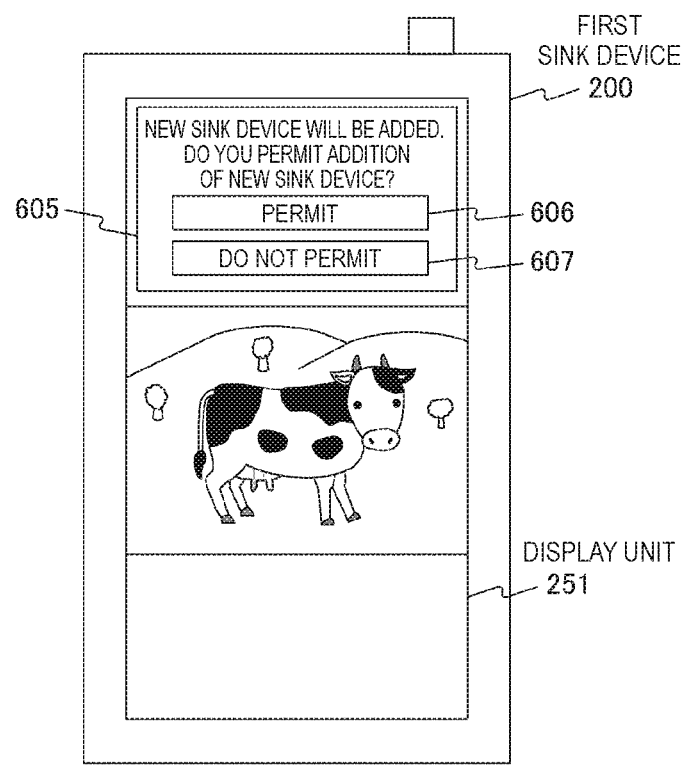

FIGS. 22a and 22b are diagrams illustrating an example of notification screens displayed on the source device 100 and the first sink device 200 according to the second embodiment of the present technology.

FIG. 22a shows a notification screen 600 displayed on the display unit 190 of the source device 100. In addition, FIG. 22b shows a notification screen 605 displayed on the display unit 251 of the first sink device 200. These notification screens 600 and 605 may be displayed as, for example, pop-up screens.

Here, when the second sink device 300 is connected to the source device 100 in each process described above, it is desirable that the source device 100 display a connection request from the second sink device 300 through a pop-up screen or the like to notify the user of the connection request.

However, a display screen displayed by the source device 100 may be transmitted as it is to the first sink device 200 which has already been connected as an image. Accordingly, the control unit 140 of the source device 100 switches control of the display unit 190 on the basis of user settings or a predetermined rule.

For example, when a connection request is received from another device in a situation in which the source device 100 is connected to the first sink device 200, the control unit 140 of the source device 100 may display, on the display unit 190, the notification screen 600 through which the user determines whether to connect to the other device. Accordingly, the user can recognize reception of the connection request from the other device by checking the notification screen 600.

In addition, the control unit 140 of the source device 100 may accept a user manipulation using manipulation buttons 601 and 602 on the notification screen 600. Then, the control unit 140 of the source device 100 may perform control regarding connection of the other device on the basis of the user manipulation using the manipulation buttons 601 and 602.

Furthermore, the control unit 140 of the source device 100 may display the notification screen 605 on the display unit 251 of the connected first sink device 200, for example. Accordingly, users of the source device 100 and the first sink device 200 can share the fact that the connection request has been received from the other device by checking the notification screens 600 and 605.

In addition, the control unit 140 of the source device 100 may accept a user manipulation using manipulation buttons 606 and 607 on the notification screen 605. Then, the control unit 140 of the source device 100 may perform control regarding connection of the other device on the basis of the user manipulation using the manipulation buttons 606 and 607.

Furthermore, the control unit 140 of the source device 100 may manage pop-ups (the notification screens 600 and 605) separately from an image or audio transmitted to the first sink device 200, as described above. In this case, the control unit 140 of the source device 100 may or may not perform transmission to the first sink device 200 on the basis of user settings or a predetermined rule.

For example, in the case of a source device displaying information that requires instantaneous response and needs to be manipulated, such as a game device and an onboard monitor, a pop-up may not be displayed. Accordingly, the control unit 140 of the source device 100 may cause a pop-up (the notification screen 600) not to be displayed on the basis of user settings or a predetermined rule.

Moreover, when a connection request is transmitted from the source device 100 to the second sink device 300, a user interface necessary for the connection request may be set such that transmission to the first sink device 200 to which transmission is being performed is not performed.

[Processing Example of Reducing Load of Source Device]

Next, a processing example for reducing a load of the source device 100 will be described.

[First processing example]

Figure 23A:
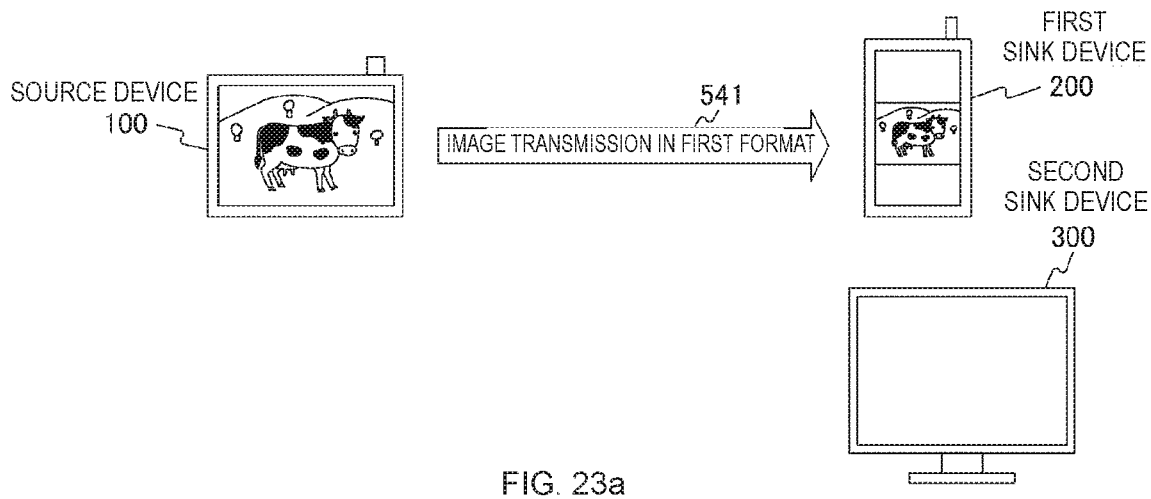
FIGS. 23a, 23b and 23c are diagrams illustrating, in chronology order, relationships between information exchanged between the source device 100 and the first and second sink devices 200 and 300 and an image displayed on the devices according to the second embodiment of the present technology.
Figure 23B:
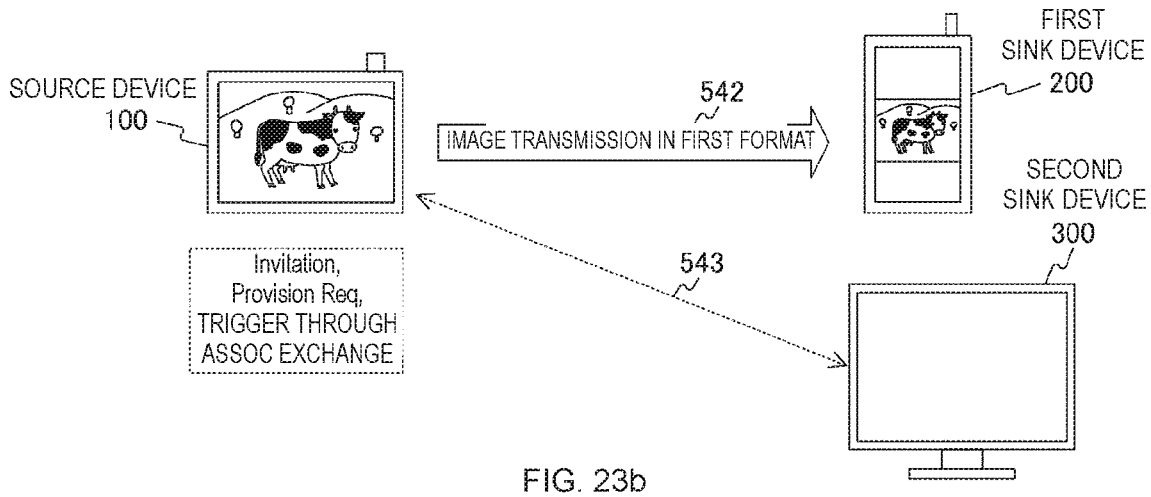
Figure 23C:
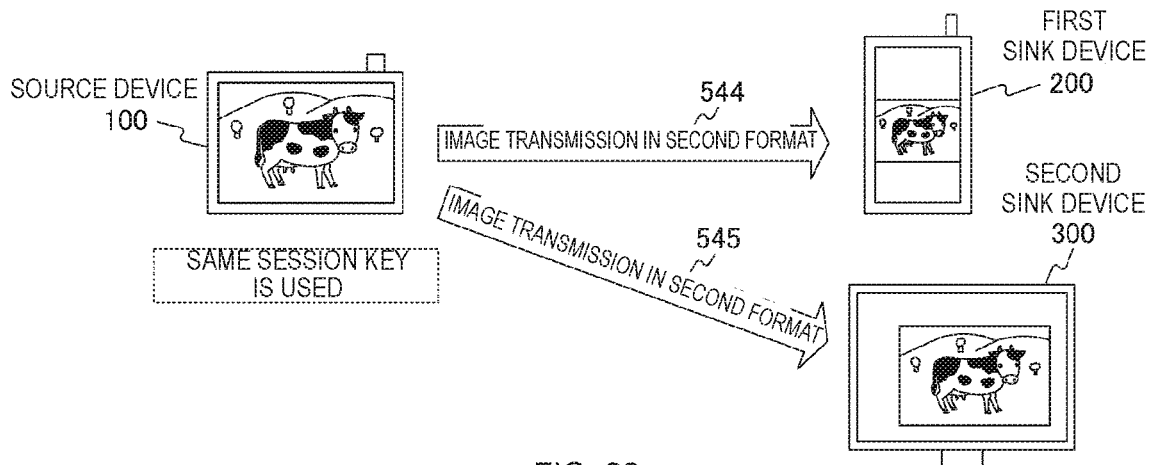

FIGS. 23a, 23b and 23c are diagrams illustrating, in chronological order, a relationship between information exchanged between the source device 100 and the first and second sink devices 200 and 300 and images displayed on the devices according to the second embodiment of the present technology. Further, the information exchanged between the devices will be described in detail with reference to FIG. 24.

Figure 24:
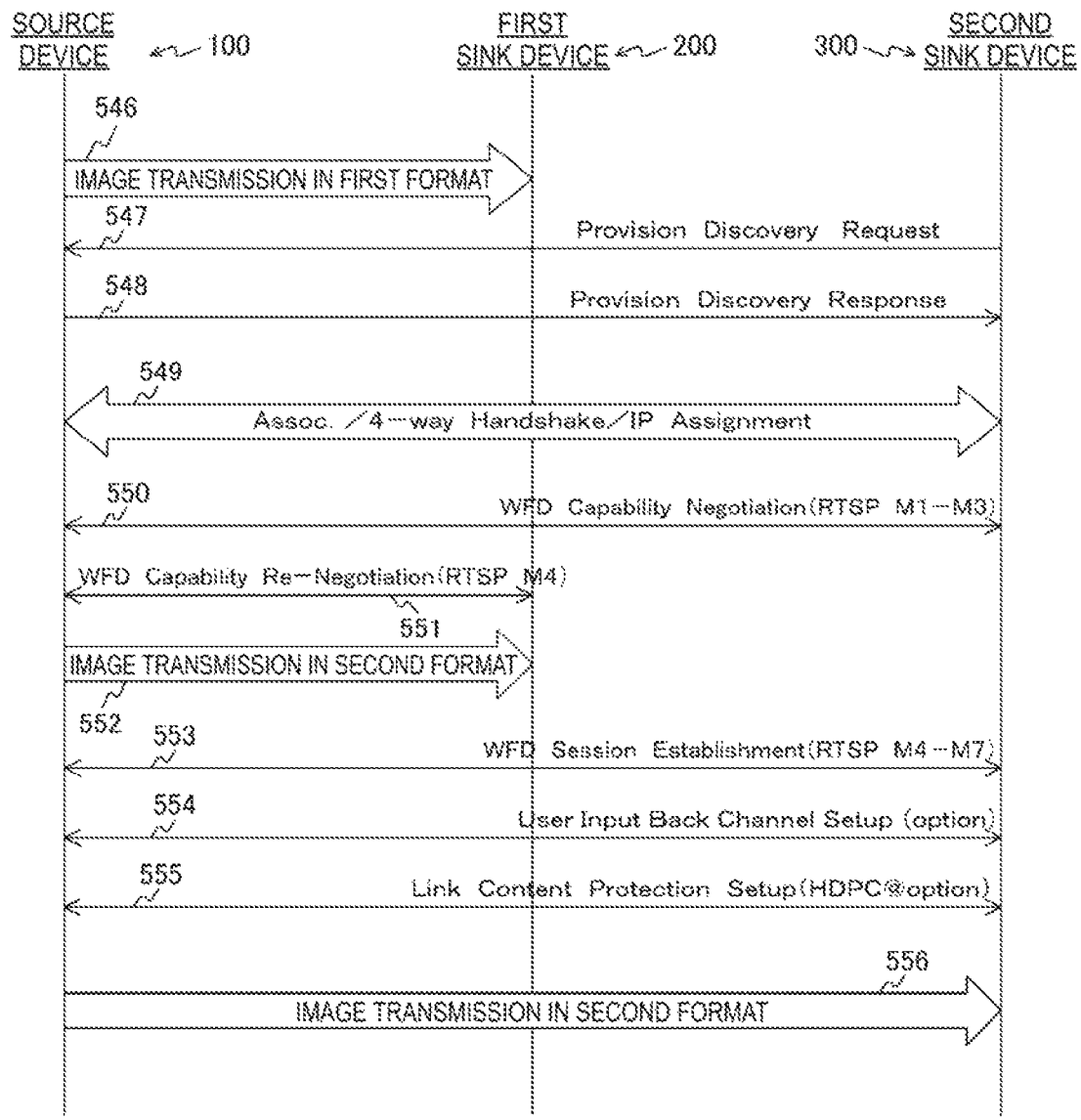
FIG. 24 is a sequence chart illustrating a communication process example of the source device 100, the first sink device 200 and the second sink device 300 according to the second embodiment of the present technology.

FIG. 24 is a sequence chart illustrating a communication processing example of the source device 100, the first sink device 200 and the second sink device 300 according to the second embodiment of the present technology.

FIGS. 23a, 23b, 23c and 24 illustrate an example of a case where the second sink device 300 is not compatible with the first format used for exchange with the first sink device, and the first sink device 200 permits change to the second format with which the second sink device 300 is compatible.

FIG. 23a shows an example of a case where the source device 100 transmits image data 541 to the first sink device 200 using the first format (corresponding to 546 shown in FIG. 24).

FIG. 23b shows an example of a case where the source device 100 transmits image data 542 to the first sink device 200 using the first format and simultaneously exchanges information with the second sink device 300 (corresponding to 547 to 551 shown in FIG. 24).

FIG. 23c shows an example of a case where the source device 100 transmits image data 544 and 545 to the first sink device 200 and the second sink device 300 using the second format (corresponding to 552 to 556 shown in FIG. 24).

In the example shown in FIG. 24, processes up to a process of exchanging Capability Negotiation between the source device 100 and the second sink device 300 (547 to 550) are almost the same as those in the example shown in FIG. 7.

According to these processes, the source device 100 can recognize that the second sink device 300 is not compatible with the first format used for exchange with the first sink device 200. In addition, the source device 100 can recognize that the first sink device 200 permits switching (or fallback) to the second format with which the second sink device 300 is compatible.

Here, it is assumed that the source device 100 transmits the same data to the first sink device 200 and the second sink device 300. In this case, the source device 100 may execute a data compression function (image or audio encoder) once by changing parameters of the first sink device 200 before setting transmission parameters for the second sink device 200. Here, changing of parameters means switching (or fallback) of resolution, picture quality, image On/Off, sound quality, audio On/Off and the like, for example.

Accordingly, the source device 100 initiates a capability re-negotiation process for the first sink device 200 before setting transmission parameters (transmitting Get_Parameter) for the second sink device 300 (551).

In addition, the source device 100 transmits image data to the first sink device 200 in the second format after the capability re-negotiation process (551) (552). Subsequently, the source device 100 exchanges information with the second sink device 300 (553 to 555) and transmits image data to the second sink device 300 in the second format (556).

In this way, the control unit 140 of the source device 100 may switch the first format used by the first sink device 200 to the second format which can be used by the second sink device 300 in the device discovery process or the capability checking process. In this case, the control unit 140 of the source device 100 switches the data transmission format used by the first sink device 200 to the second format and then sets the second format as a data transmission format used by the second sink device 300.

In this way, when the format of the already connected first sink device 200 is adapted to the format of the newly added second sink device 300, the format of the first sink device 200 may be changed in advance. Accordingly, a load of the source device 200 can be reduced. That is, the source device 100 need not use an unnecessary process for switching and can efficiently use hardware assets. Furthermore, the source device 100 can appropriately perform switching even in an environment in which the source device 100 includes AV encoders corresponding to only 1 channel.

Further, the present technology is not limited thereto. For example, data streams after encoding of premium content encoded with a single code may be transmitted to a different sink device when the aforementioned parameter change is performed.

[Second processing example]

Figure 25A:
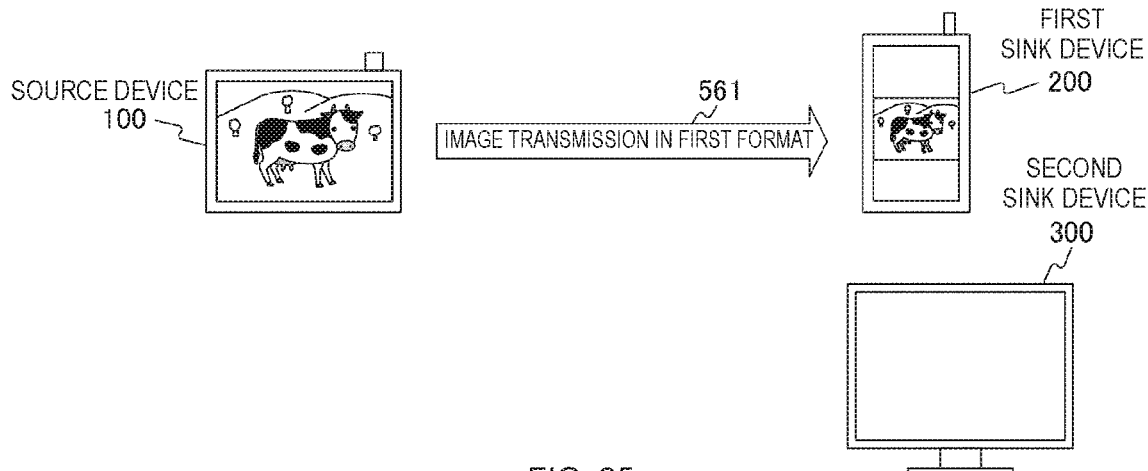
FIGS. 25a, 25b and 25c are diagrams illustrating, in chronology order, relationships between information exchanged between the source device 100 and the first and second sink devices 200 and 300 and an image displayed on the devices according to the second embodiment of the present technology.
Figure 25B:
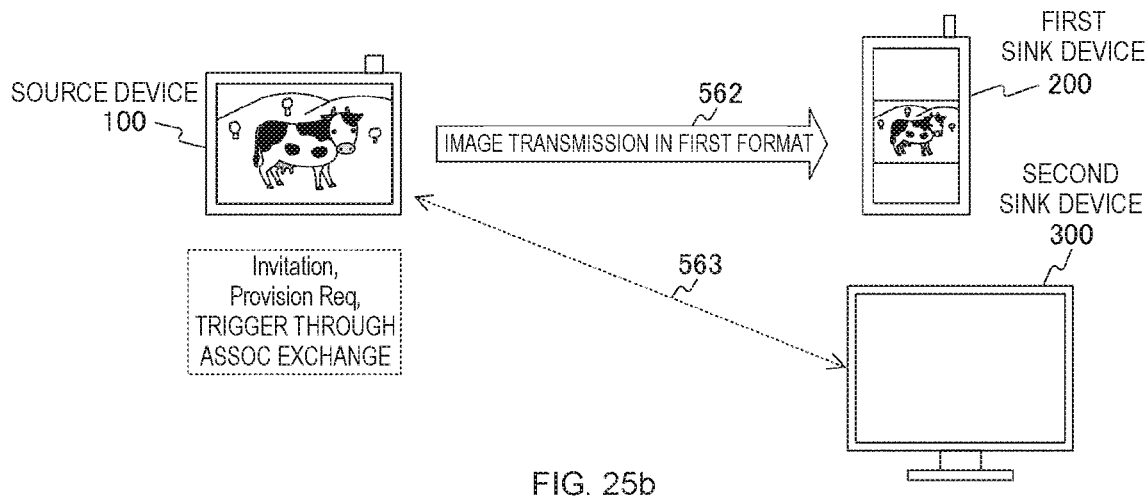
Figure 25C:
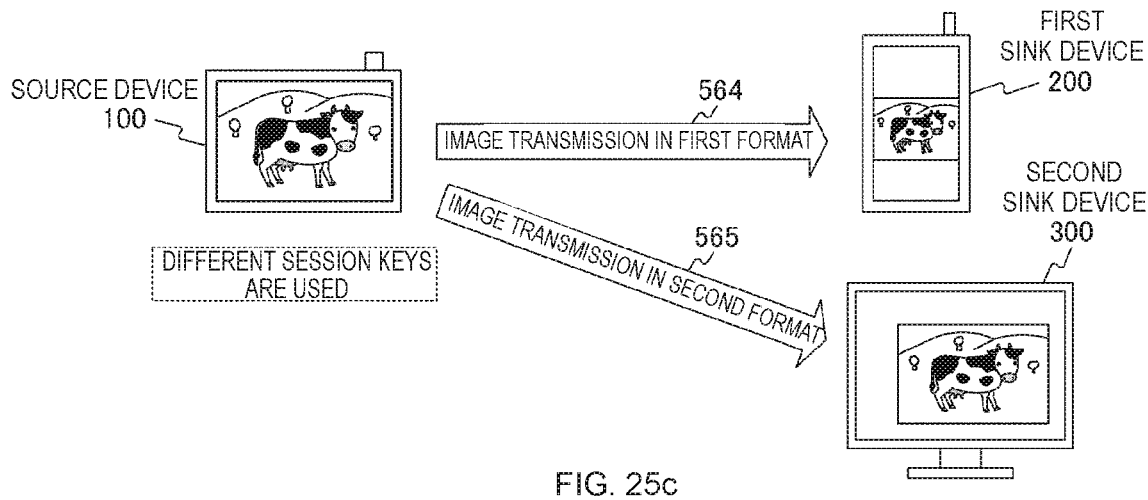

FIGS. 25*a*, 25*b* and 25*c* are diagrams illustrating, in chronological order, a relationship between information exchanged between the sourced device 100 and the first and second sink devices 200 and 300 and images displayed on the devices according to the second embodiment of the present technology. Further, information exchanged between devices will be described in detail with reference to FIG. 26.

Figure 26:
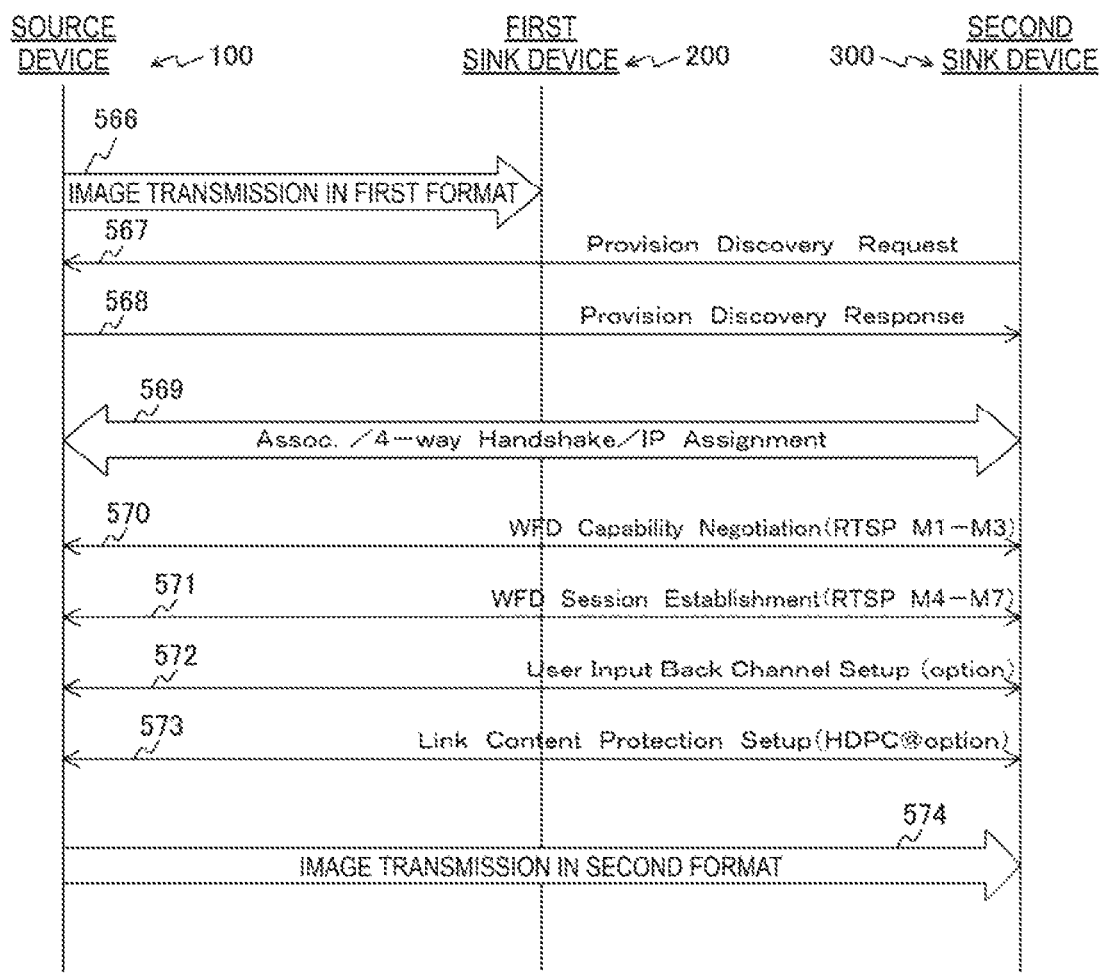
FIG. 26 is a sequence chart illustrating a communication process example of the source device 100, the first sink device 200 and the second sink device 300 according to the second embodiment of the present technology.

FIG. 26 is a sequence chart illustrating a communication processing example of the source device 100, the first sink device 200 and the second sink device 300 according to the second embodiment of the present technology.

FIGS. 25*a*, 25*b*, 25*c* and 26 illustrate an example of a case where the second sink device 300 is not compatible with the first format used for exchange with the first ink device 200 and the first sink device 200 does not permit switching to the second format with which the second sink device 300 is compatible.

FIG. 25*a* illustrates an example of a case where the source device 100 transmits image data 561 to the first sink device 200 using the first format (corresponding to 566 shown in FIG. 26).

FIG. 25*b* illustrates an example of a case where the source device 100 transmits image data 562 to the first sink device 200 using the first format and simultaneously performs information exchanges 563 with the second sink device 300 (corresponding to 567 to 573 shown in FIG. 26).

FIG. 25*c* illustrates an example of a case where the source device 100 transmits image data 564 to the first sink device 200 using the first format and transmits image data 565 to the second sink device 300 using the second format (corresponding to 574 shown in FIG. 26).

In the example shown in FIG. 26, processes up to a process of exchanging Capability Negotiation between the source device 100 and the second sink device 300 (567 to 569) are almost the same as those in the example shown in FIG. 7.

According to these processes, the source device 100 can recognize that the second sink device 300 is not compatible with the first format used for exchange with the first sink device 200. In addition, the source device 100 can recognize that the first sink device 200 does not permit switching (or fallback) to the second format with which the second sink device 300 is compatible. Accordingly, the source device 100 can recognize that it is necessary to perform image transmission to the first sink device 200 and the second sink device 300 in different formats.

In this manner, the source device 100 needs to set different formats between the first sink device 200 and the second sink device 300. Accordingly, an example in which the source device 100 sets different formats between the first sink device 100 and the second sink device 300 will be described.

For example, the source device 100 may perform image transmission to the first sink device 200. Accordingly, the source device 100 excludes the first format that is being used for image transmission to the first sink device 200 from Capability received from the second sink device 300 and transmits a Set_Parameter command to the second sink device 300 when Capability Negotiation (570) is performed between the source device 100 and the second sink device 300 (571).

In addition, for example, the source device 100 notifies the second sink device 300 of information about the first format between the source device 100 and the first sink device 200 before transmitting a capability negotiation command to the second sink device 300 (570). As the notification method, for example, a notification method of including P2P IE or WFD IE information in a response command to a beacon from the source device 100 or a probe request from the second sink device 300 and transmitting the response command including the information may be used. Accordingly, the second sink device 300 can recognize the information about the first format between the source device 100 and the first sink device 200.

[Third processing example]

Figure 27A:
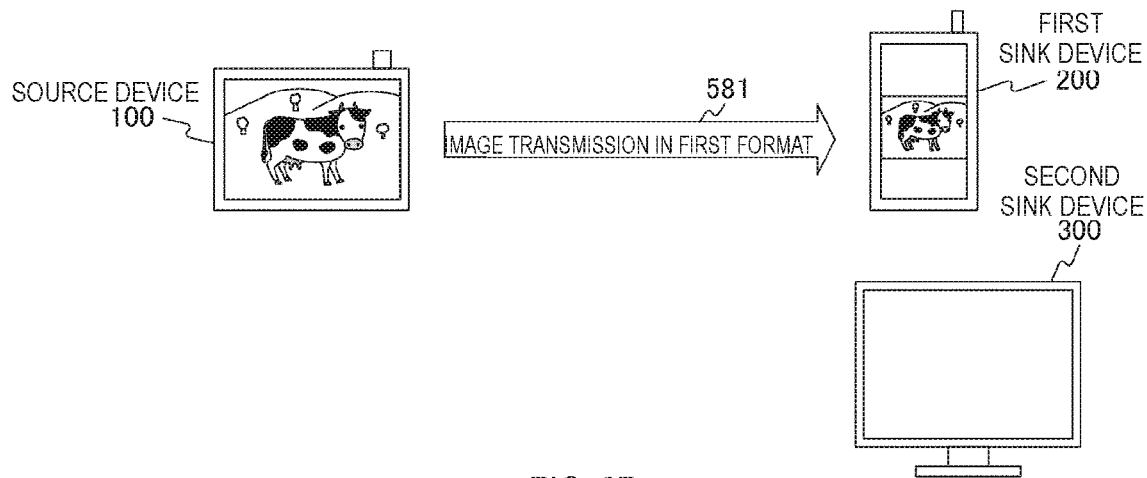
FIGS. 27a, 27b and 27c are diagrams illustrating, in chronology order, relationships between information exchanged between the source device 100 and the first and second sink devices 200 and 300 and an image displayed on the devices according to the second embodiment of the present technology.
Figure 27B:
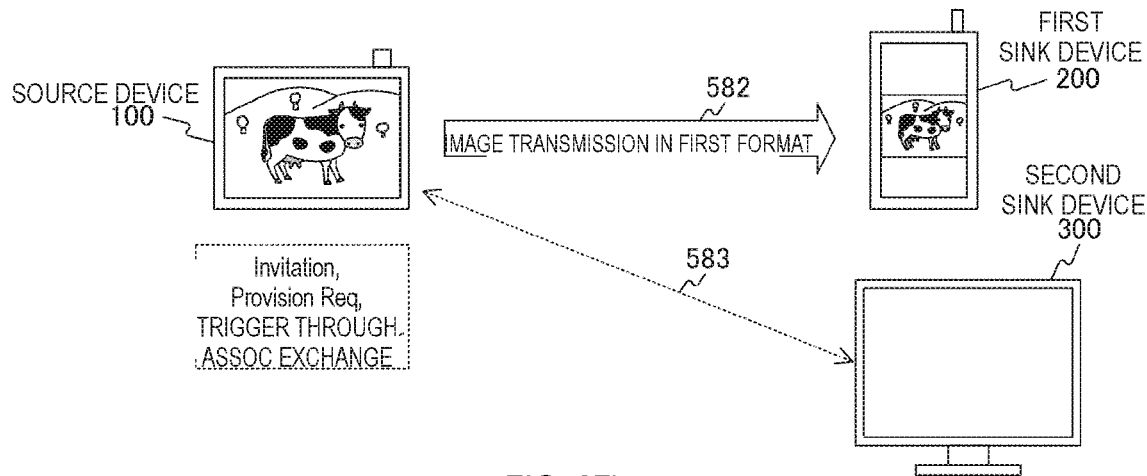
Figure 27C:
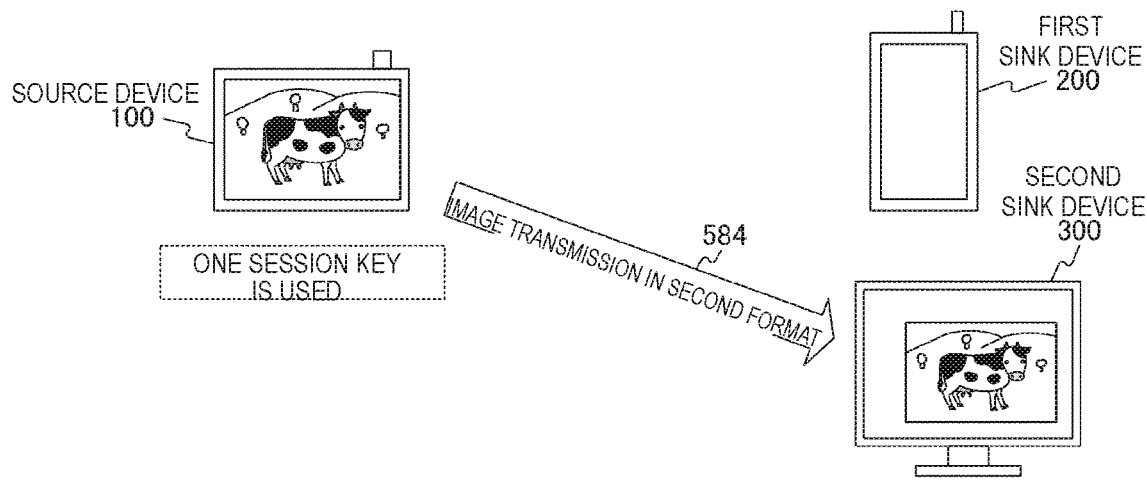

FIGS. 27*a*, 27*b* and 27*c* are diagrams illustrating, in chronological order, a relationship between information exchanged between the source device 100 and the first and second sink devices 200 and 300 and images displayed on the devices according to the second embodiment of the present technology. Further, information exchanged between devices will be described in detail with reference to FIG. 28.

Figure 28:
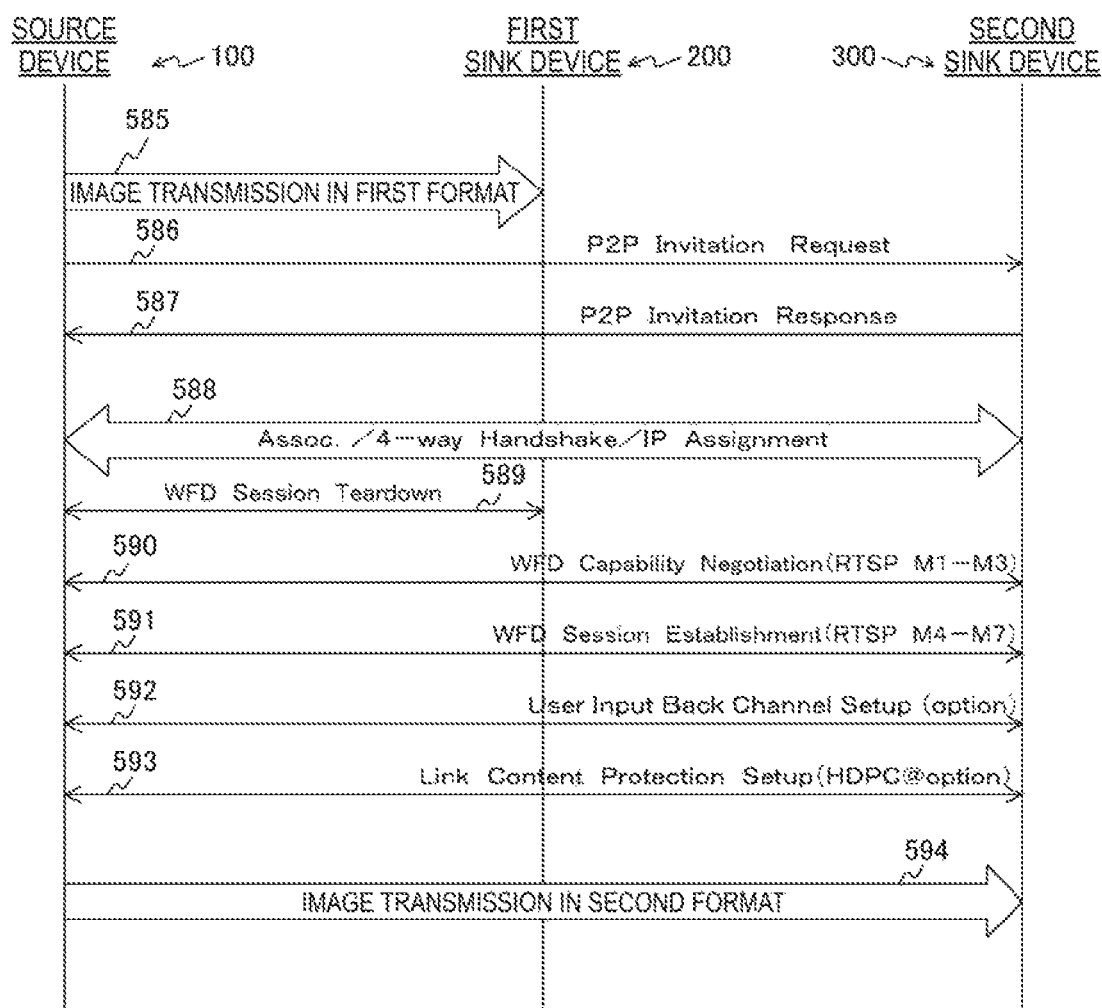
FIG. 28 is a sequence chart illustrating a communication process example of the source device 100, the first sink device 200 and the second sink device 300 according to the second embodiment of the present technology.
Figure 29:
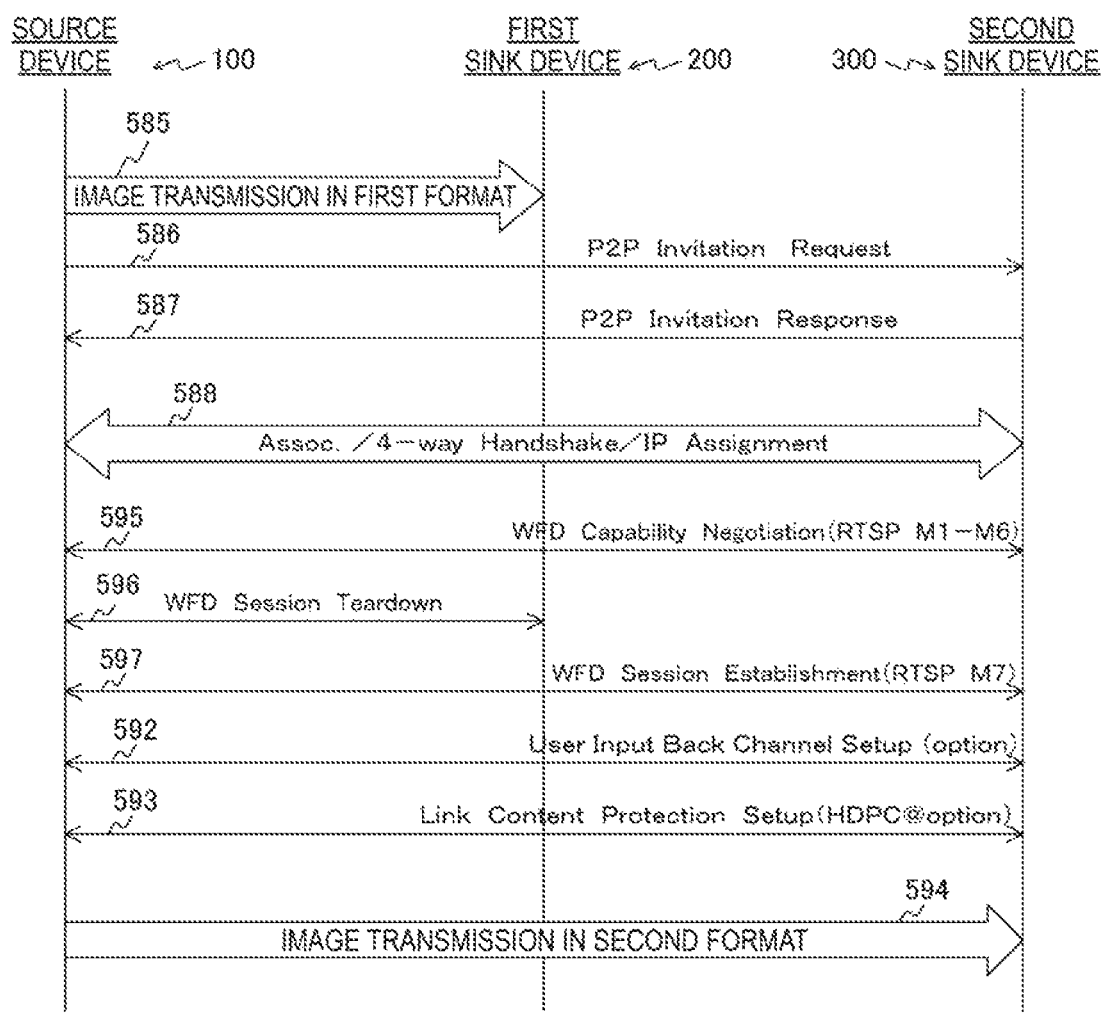
FIG. 29 is a sequence chart illustrating a communication process example of the source device 100, the first sink device 200 and the second sink device 300 according to the second embodiment of the present technology.

FIGS. 28 and 29 are sequence charts illustrating communication processing examples of the source device 100, the first sink device 200 and the second sink device 300 according to the second embodiment of the present technology. Meanwhile, FIG. 29 shows a modification example of FIG. 28 and thus the same symbols are attached to common parts in FIGS. 28 and 29.

FIGS. 27*a*, 27*b*, 27*c*, 28 and 29 illustrate an example of a case where the source device 100 is connectable to only one of the first sink device 200 and the second sink device 300.

FIG. 27*a* illustrates an example of a case where the source device 100 transmits image data 581 to the first sink device 200 using the first format (corresponding to 585 shown in FIG. 28).

FIG. 27*b* illustrates an example of a case where the source device 100 transmits image data 582 to the first sink device 200 using the first format and simultaneously performs information exchanges 583 with the second sink device 300 (corresponding to 586 to 593 shown in FIG. 28).

FIG. 27c illustrates an example of a case where the source device 100 transmits image data 584 to the second sink device 300 using the second format (corresponding to 594 shown in FIG. 28).

In FIG. 28, processes up to a process of exchanging Assoc./4-way Handshake/IP Assignment between the source device 100 and the second sink device 300 (586 to 588) are almost the same as those in the example shown in FIG. 7.

Here, the source device 100 is connectable to only one of the first sink device 200 and the second sink device 300. In this example, the source device 100 is disconnected from the first sink device 200 and performs image transmission to the second sink device 300.

The source device 100 exchanges a TearDown command with the first sink device 200 in order to perform a process of disconnecting from the first sink device 200 (589). According to this exchange, the source device 100 terminates disconnection from the first sink device 200. After termination of the disconnection, the source device 100 performs parameter setting (Set_Parameter command) in order to initiate a process of connecting to the second sink device 300 (590 and 591).

Further, the source device 100 does not initiate transmission of media data (image or sound) at the time when parameter setting (Set_Parameter command) is performed. Accordingly, the source device 100 may perform exchange (595) of a parameter setting (Set_Parameter) command with the second sink device 300 before performing exchange (596) of the TearDown command with the first sink device 200, as illustrated in FIG. 29.

According to exchange illustrated in FIG. 29, it is possible to perform a process of disconnecting from the first sink device 200 after parameter setting for the second sink device 300 has been securely performed. Accordingly, the source device 100 can be prevented from being in a state in which the source device 100 cannot be connected to the second sink device 300 although disconnected from the first sink device 200.

In this manner, the control unit 140 of the source device 100 may perform the process of disconnecting from the first sink device 200 after termination of the parameter setting process for the second sink device 300 when the counterpart device of image transmission switches from the first sink device 200 to the second sink device 300. In this way, a switching time can be reduced by establishing connection to the second sink device 300 and then disconnecting the first sink device 200.

[Example of selecting, by user manipulation, sink device to which image is transmitted]

Figure 30A:
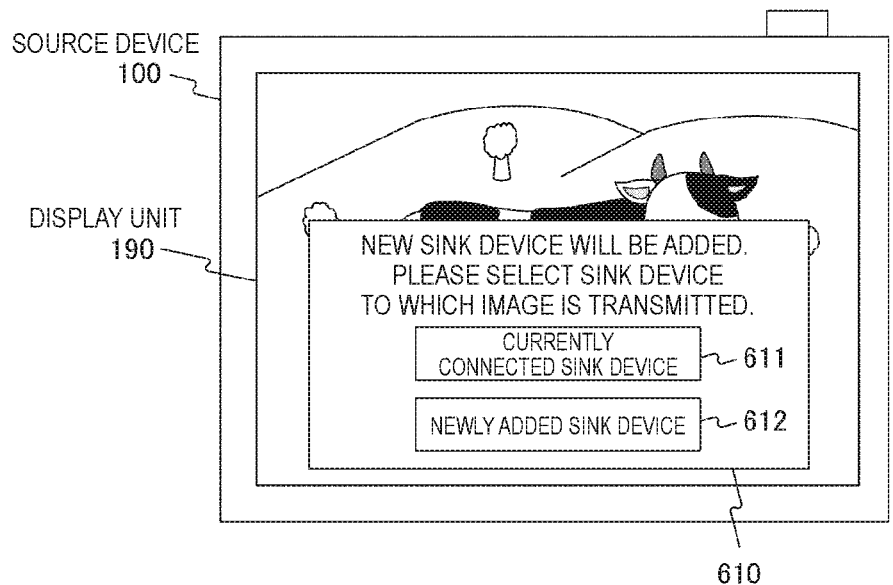
FIGS. 30a and 30b are diagrams illustrating an example of selection screens displayed on the source device 100 and the first sink device 200 according to the second embodiment of the present technology.
Figure 30B:
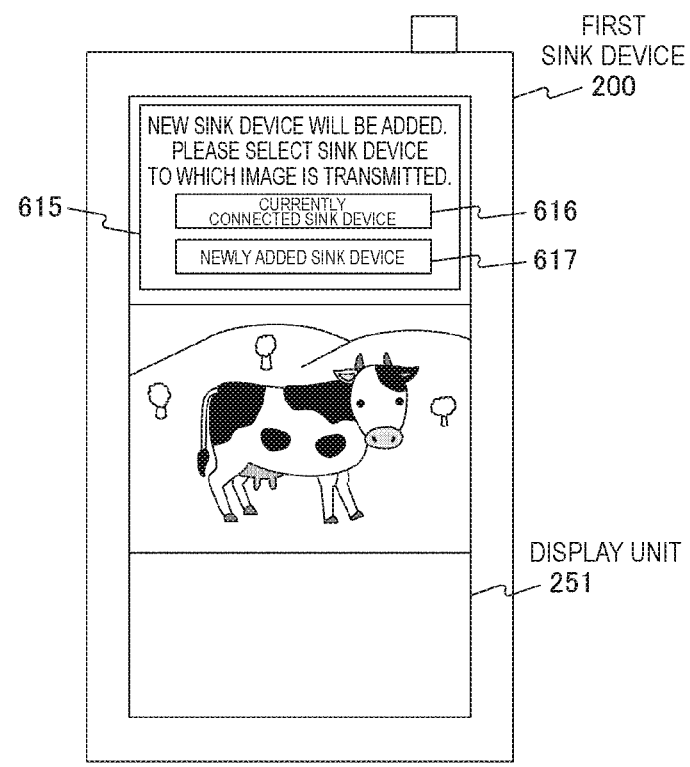

FIGS. 30a and 30b are diagrams illustrating an example of selection screens displayed on the source device 100 and the first sink device 200 according to the second embodiment of the present technology.

FIG. 30a shows a selection screen 610 displayed on the display unit 190 of the source device 100. FIG. 30b shows a selection screen 615 displayed on the display unit 251 of the first sink device 200. These selection screens 610 and 615 may be displayed as pop-up screens, for example.

In this way, when the counterpart device of image transmission is switched from the first sink device 200 to the second sink device 300, the control unit 140 of the source device 100 may provide, to a user, notification information (e.g., the selection screens 610 and 615) for notifying the user of the fact. Then, the user can select a desired sink device on the basis of the notification information. Accordingly, it is possible to initiate connection in accordance with the intention of the user.

In the example illustrated in FIGS. 27a, 27b, 27c, 28 and 29, the source device 100 is disconnected from the first sink device 200 and performs image transmission to the second sink device 300. Here, the sink device to which images are transmitted may be selected by user manipulation. When the user intends to connect to both the first sink device 200 and the second sink device 300, if a message indicating that only one sink device has been connected contrary to the intention of the user is output, the user may feel discomported. Accordingly, the reason why the other sink device cannot be connected may be displayed. When the user understands the cause in this manner, the user can handle the situation smoothly and rapidly even if the user does not understand the topology.

For example, the source device 100 may pop-up display the selection screen 610, as shown in FIG. 30a, before exchanging the TearDown command with the first sink device 200 or before parameter setting for the second sink device 300.

The selection screen 610 is a screen through which the user who manipulates the source device 100 selects a sink device to which data will be transmitted.

Further, the control unit 140 of the source device 100 may transmit the selection screen 610 displayed on the display unit 190 to the first sink device 200 and cause the selection screen 615 to be displayed on the display unit 251 of the first sink device 200. In this case, the user who manipulates the first sink device 200 may manipulate the selection screen 615 to facilitate selection of the source device 100 using UIBC from the first sink device 200 and manipulate the source device 100.

Further, the source device 100 may display occurrence of switching (or fallback) of resolution, picture quality, image On/Off, sound quality, audio On/Off and the like through a pop-up when transmission to a sink device is switched. In addition, the source device 100 may display the fact on the display unit of a disconnected sink device through a pop-up.

In this way, the second embodiment of the present technology can reduce a switching time when connected sink devices are switched.

Here, a connection topology having a multicast connection form in which a plurality of information processing devices for reception are present is assumed, for example. In this connection topology, a source device represented by a server recognizes the reception capability of each sink device and takes the lead in setup in many cases. Further, there is a connection form having an environment in which a sink device requests a resolution from a source device and the source device performs transmission irrespective of a network band. As a technology related to this connection form, for example, MPEG-DASH (Dynamic Adaptive Streaming over HTTP) is proposed.

Meanwhile, in a protocol of a lower layer, particularly, wireless communication, there is a likelihood of a high error rate and thus the likelihood that multicast communication is used increases as the number of sink devices increases. Multicast communication is the best-effort for sink devices and is greatly affected by an environment. Here, the IEEE 802.11aa standard provides wireless communication efficiency. Further, in the future, it will be important to handle a plurality of sink devices (multi-sink topology) in P2P direct connection represented by Wi-Fi CERTIFIED Miracast.

For example, it may be assumed that the Capability of a newly added device regarding an image or audio does not match a media transmission which is in service in terms of a format in the multi-sink topology. In this case, the newly added device requires a new processing procedure different from the Capability Negotiation so far.

Further, in an environment in which the infra mode, the TDLS mode, the P2P mode and the like are present as wireless communication schemes, for example, it is important how a media transmission topology for transmission of an image, sound or the like and packet generation and transmission with high efficiency is made.

Further, it is important to fulfil both of using the device performance of a source device efficiently and having media transmission quality in the multi-sink topology, for example.

For this, it is possible to realize a setting method for maximizing system performance even in a situation in which newly added devices have various image or sound capabilities in the multi-sink topology in embodiments of the present technology.

Furthermore, even in an environment in which there are various wireless communication schemes such as the infra mode, the TDLS mode and the P2P mode, it is possible to set or change a media transmission topology for transmission of an image, sound or the like and packet generation in accordance with a situation and to perform transmission with high efficiency. That is, it is possible to appropriately perform change of settings or communication scheme switching to solve inefficiency of wireless transmission in construction of the multi-sink topology.

Moreover, it is possible to appropriately notify a user of setting change or communication scheme switching by displaying a notification screen when setting change or communication scheme switching is performed.

Further, it is possible to realize a processing method for meeting both efficient use of device performance of a source device and media transmission quality in the multi-sink topology. That is, it is possible to appropriately wirelessly connect information processing devices (a source device and a sink device) in embodiments of the present technology.

Further, it is possible to notify the type of a media transmission format that is being used, for example, when a sink device is added.

Further, it may be assumed that the image or sound capability of a newly added device does not match a media transmission that is in service in terms of a format in the multi-sink topology, for example. In this case, the newly added device can acquire new information for connection, different from Capability Negotiation so far. In addition, it is possible to change a format received by a sink device that is being connected to a source device and exchange Set_Parameter (M4 command) of a newly added sink device, for example.

Furthermore, the source device 100, the first sink device 200 and the second sink device 300 in embodiments of the present technology can be applied to devices used in various fields. For example, the devices can be applied to devices used in a car (e.g., a car navigation device and a smartphone). For example, it is possible to provide the source device 100 to a front seat of a car and provide the first sink device 200 and the second sink device to a back seat of the car. In addition, a user on the back seat can enjoy images and sound from the source device 100 using the first sink device 200 and the second sink device 300. Further, the devices are applicable to, for example, an education field. For example, a teacher may use the source device 100 in a classroom and students may use the first sink device 200 and the second sink device 300. Further, a student who attends a lecture can connect a sink device carried by himself or herself to the source device 100 whenever entering the classroom to use images and sound from the source device 100. Accordingly, it is possible to use the devices to improve academic ability of each student.

<3. Application Examples>

The technology of the present disclosure can be applied to various products. For example, the source device (information processing device) 100, the first sink device (information processing device) 200, and the second sink device (information p@rocessing device) 300 may be realized as a mobile terminal such as a smartphone, a tablet-type personal computer (PC), a notebook PC, a portable game terminal, or a digital camera, a fixed-type terminal such as a television receiver set, a printer, a digital scanner, or a network storage, or an in-vehicle terminal such as a car navigation device. In addition, the source device (information processing device) 100, the first sink device (information processing device) 200, and the second sink device (information p@rocessing device) 300 may be realized as a terminal which performs machine-to-machine (M2M) communication (which is also referred to as a machine-type communication (MTC) terminal) such as a smart meter, a vending machine, a remote monitoring device, or a point-of-sale (POS) terminal. Furthermore, the source device (information processing device) 100, the first sink device (information processing device) 200, and the second sink device (information processing device) 300 may be a wireless communication module (for example, an integrated circuit module configured in one die) mounted in these terminals.

[3-1. First Application Example]

Figure 31:
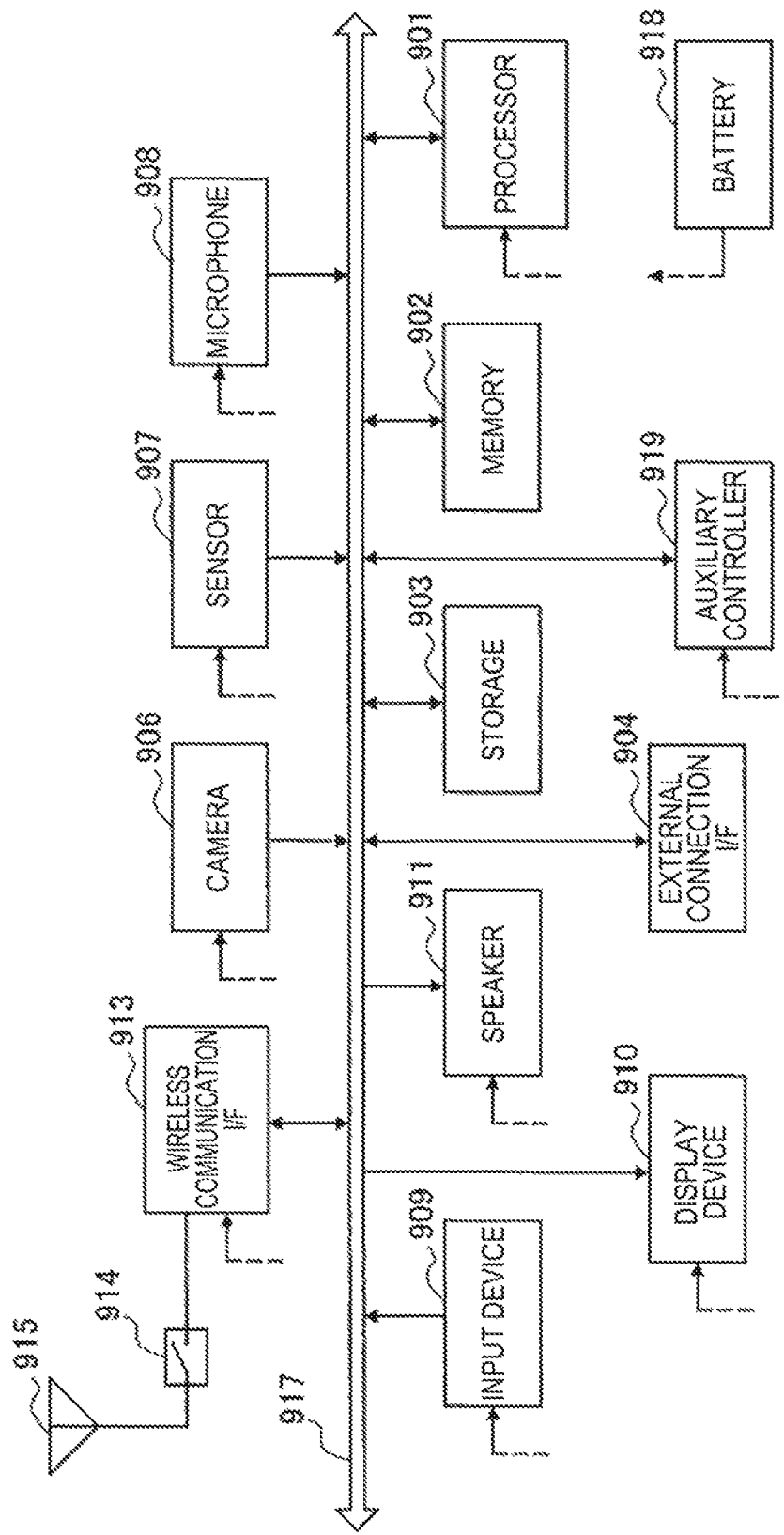
FIG. 31 is a block diagram illustrating an example of a schematic configuration of a smartphone.

FIG. 31 is a block diagram showing an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on a chip (SoC), and controls functions of an application layer and another layer of the smartphone 900. The memory 902 includes a random access memory (RAM) and a read only memory (ROM), and stores a program that is executed by the processor 901, and data. The storage 903 may include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 913 supports one or more of wireless LAN standards such as IEEE 802.11a, 11b, 11g, 11n, 11ac, and 11ad to execute wireless communication. The wireless communication interface 913 can communicate with another device via a wireless LAN access point in an infrastructure mode. In addition, the wireless communication interface 913 can directly communicate with another device in an ad hoc mode or a direct communication mode such as Wi-Fi direct, or the like. In the Wi-Fi Direct, unlike the ad-hoc mode, one of two terminals operates as an access point, but communication is performed directly between the terminals. The wireless communication interface 913 can typically include a baseband processor, a radio frequency (RF) circuit, and a power amplifier. The wireless communication interface 913 may be a one-chip module in which a memory which stores a communication control program, a processor which executes the program and a relevant circuit are integrated. The wireless communication interface 913 may support other kinds of wireless communication schemes such as a near field wireless communication scheme, a proximity wireless communication scheme or a cellular communication scheme in addition to the wireless LAN scheme. The antenna switch 914 switches connection destinations of the antenna 915 between a plurality of circuits (for example, circuits for different wireless communication schemes) included in the wireless communication interface 913. The antenna 915 has a single or a plurality of antenna elements (for example, a plurality of antenna elements which constitute a MIMO antenna), which are used by the wireless communication interface 913 for transmission and reception of radio signals. Further, a function of a wireless communication interface for establishing a connection with a public line based on specifications such as IEEE 802.16 or 3GPP (for example, W-CDMA, GSM, WiMAX, WiMAX2, LTE, or LTE-A) to perform communication with the public line may be provided.

It should be noted that the smartphone 900 is not limited to the example of FIG. 31 and may include a plurality of antennas (for example, an antenna for a wireless LAN, an antenna for the proximity wireless communication scheme, or an antenna for a public line communication, etc.). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to blocks of the smartphone 900 illustrated in FIG. 31 via feeder lines, which are partially shown as dashed lines in the figure. The auxiliary controller 919 operates a minimum necessary function of the smartphone 900, for example, in a sleep mode.

In the smartphone 900 shown in FIG. 31, the control unit 140 described using FIG. 3, and the control unit 270 described using FIG. 4 may be implemented by the wireless communication interface 913. In addition, at least some of these functions may be implemented by the processor 901 or the auxiliary controller 919.

The smartphone 900 may operate as a wireless access point (software AP) by executing an access point function at an application level through the processor 901. Further, the wireless communication interface 913 may have a wireless access point function.

[3-2. Second Application Example]

FIG. 32 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports one or more of wireless LAN standards such as IEEE 802.11a, 11b, 11g, 11n, 11ac, and 11ad to execute wireless communication. The wireless communication interface 933 can communicate with another device via a wireless LAN access point in an infrastructure mode. In addition, the wireless communication interface 933 can directly communicate with another device in an ad hoc mode or a direct communication mode such as Wi-Fi Direct. The wireless communication interface 933 can typically include a baseband processor, an RF circuit, and a power amplifier. The wireless communication interface 933 may be a one-chip module in which a memory which stores a communication control program, a processor which executes the program and a relevant circuit are integrated. The wireless communication interface 933 may support other kinds of wireless communication schemes such as a near field wireless communication scheme, a proximity wireless communication scheme or a cellular communication scheme in addition to the wireless LAN scheme. The antenna switch 934 switches connection destinations of the antenna 935 between a plurality of circuits included in the wireless communication interface 933. The antenna 935 has a single or a plurality of antenna elements, which are used by the wireless communication interface 933 for transmission and reception of radio signals.

In addition, the car navigation device 920 may include a plurality of antennas, not limited to the example of FIG. 32. In that case, the antenna switches 934 may be omitted from the configuration of the car navigation device 920.

The battery 938 supplies power to blocks of the car navigation device 920 illustrated in FIG. 32 via feeder lines that are partially shown as dashed lines in the figure. The battery 938 accumulates power supplied form the vehicle.

In the car navigation device 920 illustrated in FIG. 32, the control unit 140 described using FIG. 3 and the control unit 270 described using FIG. 4 may be implemented by the wireless communication interface 933. At least a part of the functions may also be implemented by the processor 921.

Note that the technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

In addition, the above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

Also, the processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disc), a memory card, and a Blu-ray disc (registered trademark) can be used.

Effects described in the present description are just examples, the effects are not limited, and there may be other effects.

Additionally, the present technology may also be configured as below.

(1)

An information processing device including:

a wireless communication unit that performs media transmission to another information processing device; and a control unit that performs control to exchange information for deciding a communication path for performing the media transmission to a first information processing device and a second information processing device or a data transmission format used when the media transmission is performed in a device discovery process or a capability checking process in a case where the media transmission is newly performed to the second information processing device during the media transmission to the first information processing device.

(2)

The information processing device according to (1), in which the control unit performs control to exchange, as the information, at least one of a type of a data transmission format used by the first information processing device for the media transmission, whether the first information processing device permits switching to the data transmission format usable by the second information processing device, and the number of HDCP encryption keys usable by the information processing device.

(3)

The information processing device according to (1) or (2), in which the control unit provides, to a user, notification information regarding a connection process for newly performing the media transmission to the second information processing device in the capability checking process.

(4)

The information processing device according to (3), in which the control unit differently manages image information corresponding to a target of the media transmission and the notification information.

(5)

The information processing device according to any of (1) to (4), in which the control unit determines whether the media transmission to the second information processing device can be performed on the basis of the exchanged information and does not perform a connection process for the second information processing device in a case where it is determined that the media transmission to the second information processing device cannot be performed.

(6)

The information processing device according to (5), in which, in the case where it is determined that the media transmission to the second information processing device cannot be performed, the control unit provides notification information for notification of the fact to the user.

(7)

The information processing device according to any of (1) to (6), in which, in a case where a first data transmission format used by the first information processing device is switched to a second data transmission format usable by the second information processing device in the device discovery process or the capability checking process, the control unit switches a data transmission format used by the first information processing device to the second data transmission format and then sets the second data transmission format as a data transmission format used by the second information processing device.

(8)

The information processing device according to any of (1) to (7), in which the control unit acquires a wireless communication scheme used for the media transmission to the first information processing device and decides the communication path and the data transmission format on the basis of the acquired wireless communication scheme and the exchanged information.

(9)

The information processing device according to (8), in which, in a case where the first information processing device uses a wireless communication scheme in an infrastructure mode, the control unit sets a wireless communication scheme in a TDLS mode or a P2P mode as wireless communication schemes of the first information processing device and the second information processing device.

(10)

The information processing device according to any of (1) to (9), in which the control unit decides the communication path and the data transmission format on the basis of the exchanged information, at least one of capability of the information processing device regarding an encoding process and the number of processes that can be performed, and at least one of capability of the information processing device regarding HDCP encryption key processing and the number of processes that can be performed.

(11)

The information processing device according to any of (1) to (5), in which the control unit determines whether the media transmission to the first information processing device and the second information processing device can be performed on the basis of the exchanged information and switches a counterpart device to which the media transmission is performed from the first information processing device to the second information processing device in a case where it is determined that the media transmission to the first information processing device and the second information processing device cannot be performed.

(12)

The information processing device according to (11), in which, in a case where the counterpart device to which the media transmission is performed is switched from the first information processing device to the second information processing device, the control unit performs a process of disconnecting from the first information processing device after completing a parameter setting process for the second information processing device.

(13)

The information processing device according to (11) or (12), in which, in a case where the counterpart device to which the media transmission is performed is switched from the first information processing device to the second information processing device, the control unit provides notification information for notification of the fact to a user.

(14)

The information processing device according to any of (1) to (13), in which the wireless communication unit performs the media transmission to the other information processing devices in accordance with wireless fidelity (Wi-Fi) CERTIFIED Miracast specifications.

(15)

An information processing method including: performing control to exchange information for deciding a communication path for performing media transmission to a first information processing device and a second information processing device or a data transmission format used in a case where the media transmission is performed in a device discovery process or a capability checking process when the media transmission is newly performed to the second information processing device during the media transmission to the first information processing device.

(16)

A program for causing a computer to perform control to exchange information for deciding a communication path for performing media transmission to a first information processing device and a second information processing device or a data transmission format used when the media transmission is performed in a device discovery process or a capability checking process in a case where the media transmission is newly performed to the second information processing device during the media transmission to the first information processing device.

Further, the present technology may also be configured as below.

(C1)

An information processing device including:

a wireless communication unit that performs media transmission to another information processing device; and a control unit that performs control to, in a case where a first data transmission format used by the first information processing device is switched to a second data transmission format usable by the second information processing device in a device discovery process or a capability checking process, switch a data transmission format used by the first information processing device to the second data transmission format and then set the second data transmission format as a data transmission format used by the second information processing device in a case where the media transmission is newly performed to the second information processing device during the media transmission to the first information processing device.

(C2)

An information processing device comprising:

a wireless communication unit that performs media transmission to another information processing device; and a control unit that performs control to exchange information for deciding a communication path for performing the media transmission to a first information processing device and a second information processing device or a data transmission format used when the media transmission is performed in a device discovery process in a case where the media transmission is newly performed to the second information processing device during the media transmission to the first information processing device, and not perform a connection process for the second information processing device in the case where it is determined on the basis of the exchanged information that the media transmission to the second information processing device cannot be performed.

(C3)

An information processing device including:

a wireless communication unit that performs media transmission to another information processing device; and a control unit that acquires a wireless communication scheme used for the media transmission to a first information processing device, exchanges information for deciding a communication path for performing the media transmission to the first information processing device and a second information processing device or a data transmission format used when the media transmission is performed in a device discovery process or a capability checking process, and performs control of deciding the communication path and the data transmission format on the basis of the acquired wireless communication scheme and the exchanged information, when the media transmission is newly performed to the second information processing device during the media transmission to the first information processing device.

(C4)

An information processing device including:

a wireless communication unit that performs media transmission to another information processing device; and a control unit that performs control to exchange information for deciding a communication path for performing the media transmission to a first information processing device and a second information processing device or a data transmission format used when the media transmission is performed in a device discovery process or a capability checking process in a case where the media transmission is newly performed to the second information processing device during the media transmission to the first information processing device, and decide the communication path and the data transmission format on the basis of the exchanged information, at least one of capability of the information processing device regarding an encoding process and the number of processes that can be performed, and at least one of capability of the information processing device regarding HDCP encryption key processing and the number of processes that can be performed.

(C5)

An information processing device including:

a wireless communication unit that performs media transmission to another information processing device; and a control unit that exchanges information for deciding a communication path for performing the media transmission to a first information processing device and a second information processing device or a data transmission format used when the media transmission is performed in a device discovery process or a capability checking process when the media transmission is newly performed to the second information processing device during the media transmission to the first information processing device and, when it is determined that the media transmission cannot be performed to the first information processing device and the second information processing device on the basis of the exchanged information, performs control of switching a counterpart device for which the media transmission is performed from the first information processing device to the second information processing device by performing a process of disconnecting from the first information processing device after terminating a parameter setting process for the second information processing device.

(C6)

The information processing device according to any of (C1) to (C5), in which the wireless communication unit performs the media transmission to the other information processing devices in accordance with wireless fidelity (Wi-Fi) CERTIFIED Miracast specifications.

REFERENCE SIGNS LIST 10, 61 to 63 communication system
41 source device
42, 43 sink device
100 source device (information processing device)
110 antenna
120 wireless communication unit
130 control signal reception unit
140 control unit
150 image and audio signal generation unit
160 image and audio compression unit
170 stream transmission unit
180 operation reception unit
190 display unit
200 first sink device (information processing device)
210 antenna
220 wireless communication unit
230 stream reception unit
240 image and audio decompression unit
250 image and audio output unit
251 display unit
252 sound output unit
260 user information acquisition unit
270 control unit
280 control signal transmission unit
290 management information retention unit
301 display unit
500 access point
900 smartphone
901 processor
902 memory
903 storage
904 external connection interface
906 camera
907 sensor
908 microphone
909 input device
910 display device
911 speaker
913 wireless communication interface
914 antenna switch
915 antenna
917 bus
918 battery
919 auxiliary controller
920 car navigation device
921 processor
922 memory
924 GPS module
925 sensor
926 data interface
927 content player
928 storage medium interface
929 input device
930 display device
931 speaker
933 wireless communication interface
934 antenna switch
935 antenna
938 battery
941 in-vehicle network
942 vehicle module

The invention claimed is:

1. An information processing device, comprising:
a wireless communication circuit configured to execute media transmission to a plurality of information processing devices; and
a control circuit configured to:
control exchange of information to determine:
a communication path to execute the media transmission to a first information processing device and a second information processing device, wherein the communication path is determined based on the exchange of the information with the first information processing device and the second information processing device, and the information indicates a number of sink devices concurrently connectable to the information processing device, and
a data transmission format for the media transmission in one of a device discovery process or a capability checking process in a case where the media transmission is newly executed to the second information processing device during the media transmission to the first information processing device, wherein the data transmission format is determined based on the exchange of the information with the second information processing device;
determine, based on the exchanged information, whether the first information processing device permits a switch of the data transmission format for the media transmission to the first information processing device;
switch, in a case that the first information processing device permits the switch of the data transmission format, the data transmission format for the media transmission to the first information processing device from a first data transmission format used by the first information processing device to a second data transmission format usable by the second information processing device;
execute the media transmission to the first information processing device and the second information processing device in different formats, in a case the first information processing device does not permit the switch of the data transmission format; and
determine one of the first information processing device or the second information processing device as a connection target for the media transmission based on priority levels associated with the first information processing device and the second information processing device, wherein the priority levels correspond to sizes of display units of the first information processing device and the second information processing device.

2. The information processing device according to claim 1, wherein the control circuit is further configured to:
control the exchange, as the information, of at least one of:
a type of the data transmission format used by the first information processing device for the media transmission,
whether the first information processing device permits the switch to the second data transmission format usable by the second information processing device, or
a number of high-bandwidth digital content protection (HDCP) encryption keys usable by the information processing device.

3. The information processing device according to claim 1, wherein the control circuit is further configured to output notification information regarding a connection process for the execution of the media transmission to the second information processing device in the capability checking process.

4. The information processing device according to claim 3, wherein the control circuit is further configured to differently manage image information corresponding to the connection target of the media transmission and the notification information.

5. The information processing device according to claim 1, wherein the control circuit is further configured to:
determine that the media transmission to the second information processing device is executable based on the exchanged information; and
not execute a connection process for the second information processing device based on a determination that the media transmission to the second information processing device is not executable.

6. The information processing device according to claim 5, wherein the control circuit is further configured to output a notification based on the determination that the media transmission to the second information processing device is not executable.

7. The information processing device according to claim 1, wherein, in a case where the first data transmission format used by the first information processing device is switched to the second data transmission format usable by the second information processing device in the device discovery process or the capability checking process, the control circuit is further configured to
set the second data transmission format as the data transmission format used by the second information processing device.

8. The information processing device according to claim 1, wherein the control circuit is further configured to:
acquire a wireless communication scheme used for the media transmission to the first information processing device; and
determine the communication path and the data transmission format based on the acquired wireless communication scheme and the exchanged information.

9. The information processing device according to claim 8, wherein, in a case where the first information processing device uses the wireless communication scheme in an infrastructure mode, the control circuit is further configured to set the wireless communication scheme in one of a tunnel direct link setup (TDLS) mode or a peer-to-peer (P2P) mode as wireless communication schemes of the first information processing device and the second information processing device.

10. The information processing device according to claim 8, wherein the control circuit is further configured to:
output a notification for change of the wireless communication scheme; and
display a type of the data transmission format for the media transmission.

11. The information processing device according to claim 1, wherein the control circuit is further configured to determine the communication path and the data transmission format based on:
the exchanged information,
at least one of a capability of the information processing device regarding an encoding process or a number of processes; and
at least one of a capability of the information processing device regarding a high-bandwidth digital content protection (HDCP) encryption key process or the number of processes.

12. The information processing device according to claim 1, wherein the control circuit is further configured to:
determine whether the media transmission to both the first information processing device and the second information processing device is executable based on the exchanged information; and
switch a counterpart device to which the media transmission is executed from the first information processing device to the second information processing device in a case where the media transmission to both the first information processing device and the second information processing device is not executable.

13. The information processing device according to claim 12, wherein, in a case where the counterpart device to which the media transmission is executed is switched from the first information processing device to the second information processing device, the control circuit is further configured to disconnect from the first information processing device after completion of a parameter setting process for the second information processing device.

14. The information processing device according to claim 12, wherein the control circuit is further configured to output a notification in a case where the counterpart device to which the media transmission is executed is switched from the first information processing device to the second information processing device.

15. The information processing device according to claim 1, wherein the wireless communication circuit is further configured to execute the media transmission to the plurality of information processing devices in accordance with wireless fidelity (Wi-Fi) CERTIFIED Miracast specifications.

16. The information processing device according to claim 1, wherein the control circuit is further configured to switch the data transmission format based on:
similarity of data to be transmitted to the first information processing device and the second information processing device; and
a determination that the second information processing device is incompatible with the first data transmission format.

17. The information processing device according to claim 1, wherein the switch of the data transmission format comprises at least one of switch of resolution, switch of an image compression scheme, switch of picture quality, image on/off, audio on/off, switch of sound quality, or switch of an audio compression scheme.

18. An information processing method, comprising:
    in an information processing device:
        controlling exchange of information to determine:
            a communication path to execute media transmission to a first information processing device and a second information processing device, wherein the communication path is determined based on the exchange of the information with the first information processing device and the second information processing device, and the information indicates a number of sink devices concurrently connectable to the information processing device, and
            a data transmission format for the media transmission in one of a device discovery process or a capability checking process in a case where the media transmission is newly executed to the second information processing device during the media transmission to the first information processing device, wherein the data transmission format is determined based on the exchange of the information with the second information processing device;
        determining, based on the exchanged information, whether the first information processing device permits a switch of the data transmission format for the media transmission to the first information processing device;
        switching, a case that the first information processing device permits the switch of the data transmission format, the data transmission format for the media transmission to the first information processing device from a first data transmission format used by the first information processing device to a second data transmission format usable by the second information processing device;
        executing the media transmission to the first information processing device and the second information processing device in different formats, in a case the first information processing device does not permit the switch of the data transmission format; and
        determining one of the first information processing device or the second information processing device as a connection target for the media transmission based on priority levels associated with the first information processing device and the second information processing device,
            wherein the priority levels correspond to sizes of display units of the first information processing device and the second information processing device.

19. A non-transitory computer-readable medium having stored thereon, computer-executable instructions which, when executed by a processor of an information processing device, cause the processor to execute operations, the operations comprising:
    controlling exchange of information to determine:
        a communication path to execute media transmission to a first information processing device and a second information processing device, wherein the communication path is determined based on the exchange of the information with the first information processing device and the second information processing device, and the information indicates a number of sink devices concurrently connectable to the information processing device, and
        a data transmission format for the media transmission in one of a device discovery process or a capability checking process in a case where the media transmission is newly executed to the second information processing device during the media transmission to the first information processing device, wherein the data transmission format is determined based on the exchange of the information with the second information processing device;
    determining, based on the exchanged information, whether the first information processing device permits a switch of the data transmission format for the media transmission to the first information processing device;
    switching, in a case the first information processing device permits the switch of the data transmission format, the data transmission format for the media transmission to the first information processing device from a first data transmission format used by the first information processing device to a second data transmission format usable by the second information processing device;
    executing the media transmission to the first information processing device and the second information processing device in different formats, in a case the first information processing device does not permit the switch of the data transmission format; and
    determining one of the first information processing device or the second information processing device as a connection target for the media transmission based on priority levels associated with the first information processing device and the second information processing device,
    wherein the priority levels correspond to sizes of display units of the first information processing device and the second information processing device.

* * * * *